United States Patent
Muroyama et al.

(10) Patent No.: US 6,991,949 B2
(45) Date of Patent: Jan. 31, 2006

(54) MANUFACTURING METHOD OF AN ELECTRON EMITTING APPARATUS

(75) Inventors: Masakazu Muroyama, Kanagawa (JP); Takao Yagi, Kanagawa (JP); Kouji Inoue, Kanagawa (JP); Ichiro Saito, Kanagawa (JP)

(73) Assignee: Sony Corporation, (JP)

( * ) Notice: Subject to any disclaimer, the term of this patent is extended or adjusted under 35 U.S.C. 154(b) by 11 days.

(21) Appl. No.: 10/475,586

(22) PCT Filed: Apr. 9, 2002

(86) PCT No.: PCT/JP02/03528

§ 371 (c)(1),
(2), (4) Date: Oct. 23, 2003

(87) PCT Pub. No.: WO02/091417

PCT Pub. Date: Nov. 14, 2002

(65) Prior Publication Data

US 2004/0108515 A1    Jun. 10, 2004

(30) Foreign Application Priority Data

Apr. 25, 2001 (JP) .............................. 2001-127361
Mar. 25, 2002 (JP) .............................. 2002-83898

(51) Int. Cl.
*H01L 21/00* (2006.01)
(52) U.S. Cl. .......................................... 438/20; 445/24
(58) Field of Classification Search ................ 438/20; 445/24, 51
See application file for complete search history.

(56) References Cited

U.S. PATENT DOCUMENTS

| 6,350,488 | B1 * | 2/2002 | Lee et al. ................. 427/249.1 |
| 6,440,761 | B1 * | 8/2002 | Choi ............................ 438/20 |
| 6,514,113 | B1 * | 2/2003 | Lee et al. ..................... 445/50 |
| 6,555,402 | B2 * | 4/2003 | Wells et al. .................. 438/20 |
| 6,770,497 | B2 * | 8/2004 | Ihm ............................ 438/20 |
| 6,774,548 | B2 * | 8/2004 | Fran et al. .................. 313/309 |
| 2002/0193040 | A1 * | 12/2002 | Zhou ............................ 445/51 |
| 2003/0132393 | A1 * | 7/2003 | Dimitrijevic et al. ..... 250/423 F |
| 2003/0143398 | A1 * | 7/2003 | Ohki et al. ................. 428/398 |

FOREIGN PATENT DOCUMENTS

JP     2-247938     10/1990

(Continued)

OTHER PUBLICATIONS

International Search Report dated Jul. 16, 2002.

(Continued)

*Primary Examiner*—Tuan H. Nguyen
(74) *Attorney, Agent, or Firm*—Rader, Fishman & Grauer PLLC; Ronald P. Kananen

(57) ABSTRACT

A cold cathode field emission device comprising a cathode electrode 11 formed on a supporting member 10, a gate electrode 13 which is formed above the cathode electrode 11 and has an opening portion 14, and an electron emitting portion 15 formed on a surface of a portion of the cathode electrode 11 which portion is positioned in a bottom portion of the opening portion 14, said electron emitting portion 15 comprising a carbon-group-material layer 23, and said carbon-group-material layer 23 being a layer formed from a hydrocarbon gas and a fluorine-containing hydrocarbon gas.

68 Claims, 19 Drawing Sheets

FOREIGN PATENT DOCUMENTS

| | | |
|---|---|---|
| JP | 5-310443 | 11/1993 |
| JP | 7-292459 | 11/1995 |
| JP | 8-195165 | 7/1996 |
| JP | 2000-86216 | 3/2000 |
| JP | 2000-311578 | 11/2000 |
| JP | 2000-340098 | 12/2000 |
| WO | WO 97/18577 | 5/1997 |

OTHER PUBLICATIONS

JPO Written Opinion.
PCT Written Opinion.
International Preliminary Examination Report with translation.

* cited by examiner

[STEP-100]

[STEP-110]

[STEP-110] CONTINUED

[STEP-120]

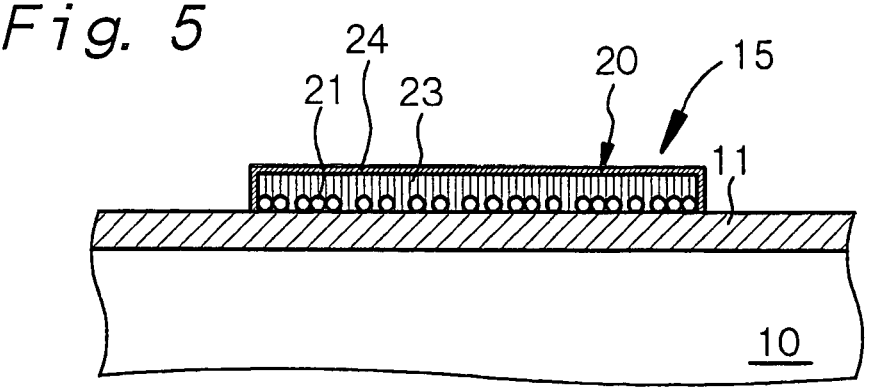
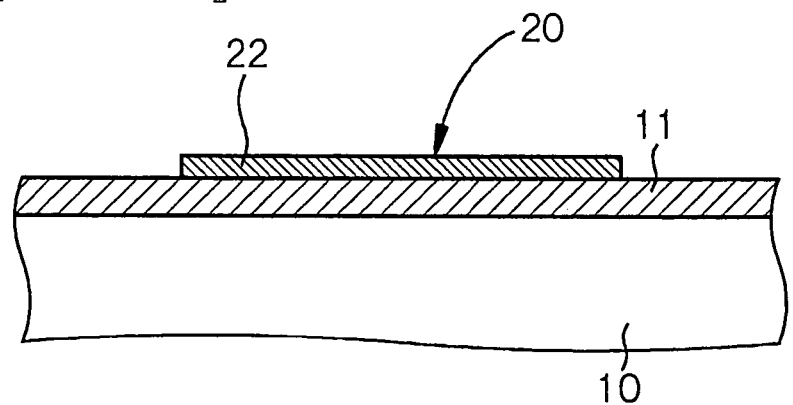
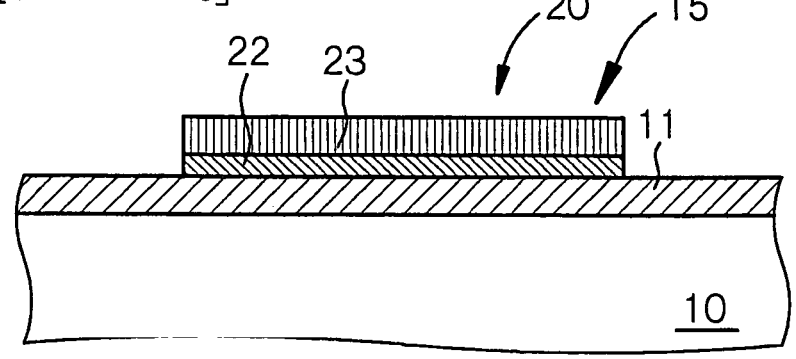

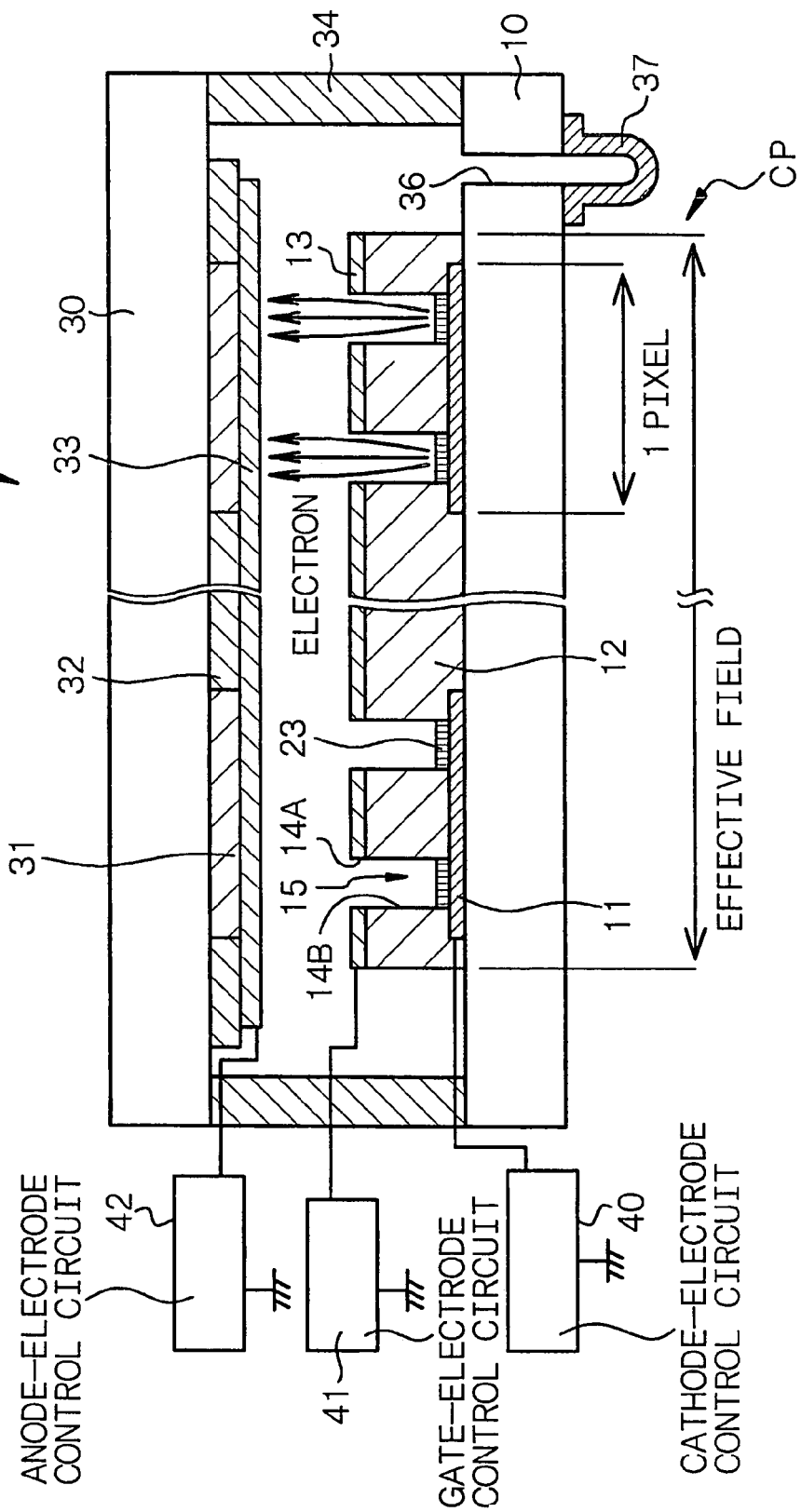

[STEP-520]

[STEP-530]

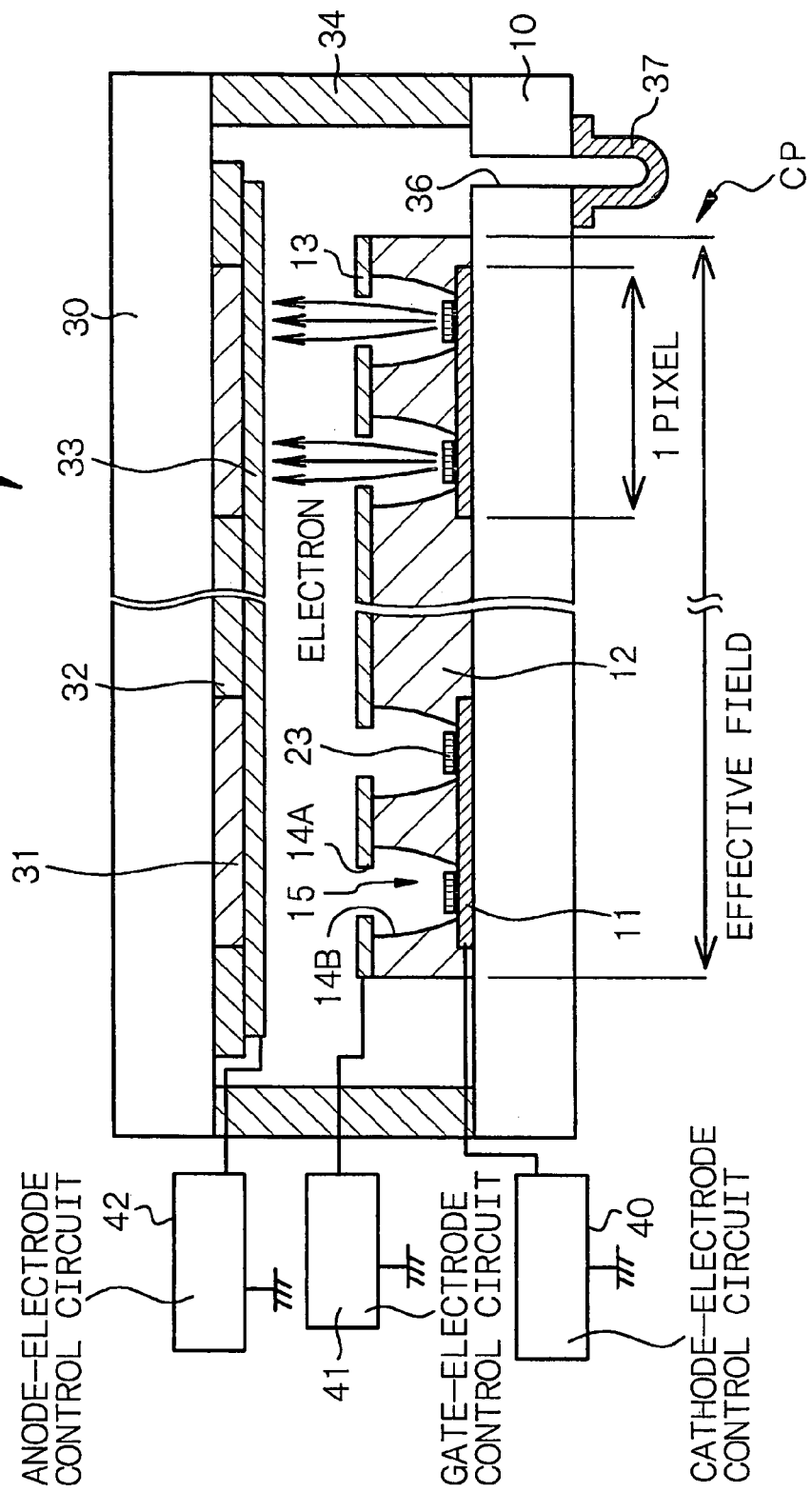

[STEP-800]

[STEP-830]

[STEP-840]

[STEP-840] CONTINUED

[STEP-850]

[STEP-850]

[STEP-860]

[STEP-1110]

[STEP-1120]

[STEP-1710]

[STEP-1720]

[STEP-1730]

[STEP-1830]

[STEP-1910]

[STEP-1930]

[STEP-1940]

[STEP-1950]

US 6,991,949 B2

MANUFACTURING METHOD OF AN ELECTRON EMITTING APPARATUS

TECHNICAL FIELD

The present invention relates to an electron emitting apparatus for emitting electrons from a carbon-group-material layer and a manufacturing method thereof, a cold cathode field emission device having an electron emitting portion comprising a carbon-group-material layer and a manufacturing method thereof, and a cold cathode field emission display provided with such cold cathode field emission devices and a manufacturing method thereof.

BACKGROUND ART

In the fields of displays for use in television receivers and information terminals, studies have been made for replacing conventionally mainstream cathode ray tubes (CRT) with flat-panel displays which are to comply with demands for a decrease in thickness, a decrease in weight, a larger screen and a high fineness. Such flat panel displays include a liquid crystal display (LCD), an electroluminescence display (ELD), a plasma display panel (PDP) and a cold cathode field emission display (FED). Of these, a liquid crystal display is widely used as a display for an information terminal. For applying the liquid crystal display to a floor-type television receiver, however, it still has problems to be solved concerning a higher brightness and an increase in size. In contrast, a cold cathode field emission display uses cold cathode field emission devices (to be sometimes referred to as "field emission device" hereinafter) capable of emitting electrons from a solid into a vacuum on the basis of a quantum tunnel effect without relying on thermal excitation, and it is of great interest from the viewpoints of a high brightness and a low power consumption.

FIGS. 20 and 21 shows a cold cathode field emission display to which the field emission devices are applied (to be sometimes referred to as "display" hereinafter). FIG. 20 is a schematic partial end view of the display, and FIG. 21 is a schematic partial perspective view of the display when a cathode panel CP and an anode panel AP are disassembled.

The field emission device shown in these drawings is a so-called Spindt type field emission device having a conical electron emitting portion. Such a field emission device comprises a cathode electrode 111 formed on a supporting member 110, an insulating layer 112 formed on the supporting member 110 and the cathode electrode 111, a gate electrode 113 formed on the insulating layer 112, an opening portion 114 formed in the gate electrode 113 and the insulating layer 112, and a conical electron emitting portion 115 formed on the cathode electrode 111 positioned in a bottom portion of the opening portion 114. Generally, the cathode electrode 111 and the gate electrode 113 are formed in the form of a stripe each in directions in which projection images of these two electrodes cross each other at right angles. Generally, a plurality of field emission devices are arranged in a region (corresponding to one pixel, and the region will be called an "overlapped region" or an "electron emitting region" hereinafter) where the projection images of the above two electrodes overlap. Further, generally, such electron emitting regions are arranged in the form of a matrix within an effective field (which works as an actual display portion) of a cathode panel CP.

An anode panel AP comprises a substrate 30, a phosphor layer 31 (31R, 31B and 31G) which is formed on the substrate 30 and has a predetermined pattern, and an anode electrode 33 formed thereon. One pixel is constituted of a group of the field emission devices formed in the overlapped region of the cathode electrode 111 and the gate electrode 113 on the cathode panel side and the phosphor layer 31 which is opposed to the above group of the field emission devices and is on the anode panel side. In the effective field, such pixels are arranged on the order of hundreds of thousands to several millions. On the substrate 30 between one phosphor layer 31 and another phosphor layer 31, a black matrix 32 is formed.

The anode panel AP and the cathode panel CP are arranged such that the electron emitting regions and the phosphor layers are opposed to each other, and the anode panel AP and the cathode panel CP are bonded to each other in their circumferential portions through a frame 34, whereby the display is produced. In an ineffective field (ineffective field of the cathode panel CP in the example shown in the drawings) which surrounds the effective field and where a peripheral-circuit for selecting pixels is formed, a through-hole 36 for vacuuming is provided, and a tip tube 37 is connected to the through-hole 36 and sealed after vacuuming. That is, a space surrounded by the anode panel AP, the cathode panel CP and the frame 34 is in a vacuum state.

A relatively negative voltage is applied to the cathode electrode 111 from an cathode-electrode control circuit 40, a relatively positive voltage is applied to the gate electrode 113 from a gate-electrode control circuit 41, and a positive voltage having a higher level than the voltage applied to the gate electrode 113 is applied to the anode electrode 33 from the anode-electrode control circuit 42. When such a display is used for displaying on its screen, a scanning signal is inputted to the cathode electrode 111 from the cathode-electrode control circuit 40, and a video signal is inputted to the gate electrode 113 from the gate-electrode control circuit 41. Due to an electric field generated when a voltage is applied between the cathode electrode 111 and the gate electrode 113, electrons are emitted from the electron emitting portion 115 on the basis of a quantum tunnel effect, and the electrons are attracted toward the anode electrode 33 and collide with the phosphor layer 31. As a result, the phosphor layer 31 is excited to emit light, and a desired image can be obtained. That is, the working of the display is controlled, in principle, by a voltage applied to the gate electrode 113 and a voltage applied to the electron emitting portion 115 through the cathode electrode 111.

In the above display constitution, it is effective to sharpen the top end portion of the electron emitting portion for attaining a large current of emitted electrons at a low driving voltage, and from this viewpoint, the electron emitting portion 115 of the above Spindt type field emission device can be said to have excellent performances. However, the formation of the conical electron emitting portion 115 requires advanced processing techniques, and with an increase in the area of the effective field, it is beginning to be difficult to form the electron emitting portions 115 uniformly all over the effective field since the number of the electron emitting portions 115 totals up to tens of millions in some cases.

There has been therefore proposed a so-called flat-surface type field emission device which uses a flat electron emitting portion exposed in a bottom portion of an opening portion without using the conical electron emitting portion. The electron emitting portion of the flat-surface type field emission device is formed on a cathode electrode, and it is composed of a material having a lower work function than a material constituting the cathode electrode for achieving a high current of emitted electrons even if the electron emitting portion is flat. In recent years, it has been proposed to use various types of carbon materials such as diamond-like carbon (DLC) as the above material.

That is, for example, in Lecture No. 2p-H-6 on page 631 of preprints of No. 60 Applied Physics Society Lectures (1999), there is disclosed a flat-surface-structured electron emitter obtained by scratch-processing a surface of a titanium thin film formed on a quartz substrate by an electron beam deposition method, with a diamond powder, then patterning the titanium thin film to form a several μm gap in a central portion, and then, forming a non-doped diamond thin film on the titanium thin film. In Lecture No. 2p-H-11 on page 632 of preprints of No. 60 Applied Physics Society Lectures (1999), there is disclosed a method in which a carbon nano-tube is formed on a quartz glass provided with a metal cross line.

The value of a voltage (threshold voltage) at which electrons begin to be emitted from an electron emitting portion can be decreases by usage of various carbon-containing materials including diamond-like carbon. However, a gas or gaseous substance released from various members constituting the cathode electrode and the display adheres to, or is adsorbed on, the electron emitting portion, and as a result, the electron emitting portion is deteriorated in properties, which is known, for example, in the literature of MRS 2000 Spring Meeting, Preprints Q1.3/R1.3, page 264 "SURFACE MODIFICATION OF Si FIELD EMITTER ARRAYS FOR VACUUM SEALING". The above literature reports that the formation of a carbon thin film on the surface of a silicon-based electron emitting portion can inhibit the adherence and adsorption of the gas or gaseous substance to/on the electron emitting portion.

However, the above literature does not suggest any means of overcoming the problem of adherence and adsorption of a gas or gaseous substance to/on the electron emitting portion made from a carbon-containing material.

It is therefore an object of the present invention to provide an electron emitting apparatus and a cold cathode field emission device that can overcome the problem that a gas or gaseous substance released from various members constituting, for example, a cold cathode field emission display adheres to, or is adsorbed on, an electron emitting portion to cause the electron emitting portion to deteriorate in properties, manufacturing methods of these, and a cold cathode field emission display to which the above cold cathode field emission device is incorporated and a manufacturing method thereof.

DISCLOSURE OF THE INVENTION

An electron emitting apparatus according to a first aspect of the present invention for achieving the above object is constituted of an electron emitting portion formed on an electrically conductive layer, the electron emitting portion comprising a carbon-group-material layer, and the carbon-group-material layer being a layer formed from a hydrocarbon gas and a fluorine-containing hydrocarbon gas.

In the electron emitting apparatus according to the first aspect of the present invention, preferably, a selective-growth region is formed between the electrically conductive layer and the carbon-group-material layer, from the viewpoint that the carbon-group-material layer is formed reliably in a predetermined region of the electrically conductive layer and is not formed in an unnecessary portion.

An electron emitting apparatus according to a second aspect of the present invention for achieving the above object is constituted of an electron emitting portion formed on an electrically conductive layer, the electron emitting portion comprising a carbon-group-material layer and a fluoride-carbide-containing thin film formed on the surface of the carbon-group-material layer, and the fluoride-carbide-containing thin film being a film formed from a fluorine-containing hydrocarbon gas.

An electron emitting apparatus according to a third aspect of the present invention for achieving the above object is constituted of an electron emitting portion formed on an electrically conductive layer, the electron emitting portion comprising a carbon-group-material layer, and the carbon-group-material layer having a surface terminated (modified) with fluorine atoms.

In the electron emitting apparatus according to the third aspect of the present invention, preferably, the termination (modification) of the surface of the carbon-group-material layer with fluorine atoms is carried out with a fluorine-containing hydrocarbon gas.

In the electron emitting apparatus according to the second or third aspect of the present invention, there may be employed a constitution in which the carbon-group-material layer is a layer formed from a hydrocarbon gas. The above constitution will be referred to as "electron emitting apparatus according to the second-A aspect of the present invention" or "electron emitting apparatus according to the third-A aspect of the present invention" for convenience sake. In these cases, preferably, a selective-growth region is formed between the electrically conductive layer and the carbon-group-material layer, from the viewpoint that the carbon-group-material layer is formed reliably in a predetermined region of the electrically conductive layer and is not formed in an unnecessary portion.

Alternatively, in the electron emitting apparatus according to the second or third aspect of the present invention, there may be employed a constitution in which the carbon-group-material layer is formed of carbon-nano-tube structures. The above constitution will be referred to as "electron emitting apparatus according to the second-B aspect of the present invention" or "electron emitting apparatus according to the third-B aspect of the present invention" for convenience sake.

The cold cathode field emission device according to any one of the first to third aspects of the present invention for achieving the above object is a cold cathode field emission device for constituting a so-called "two-electrodes" type cold cathode field emission display, and comprises;

(a) a cathode electrode formed on a supporting member, and (b) an electron emitting portion formed on the cathode electrode.

The cold cathode field emission device according to any one of fourth to sixth aspects of the present invention is a cold cathode field emission device for constituting a so-called "three-electrodes" type cold cathode field emission, and comprises;

(a) a cathode electrode formed on a supporting member, (b) a gate electrode which is formed above the cathode electrode and has an opening portion, and (c) an electron emitting portion formed in a portion of the cathode electrode which portion is positioned in a bottom portion of the opening portion.

In the cold cathode field emission device according to the first or fourth aspect of the present invention, the electron emitting portion comprises a carbon-group-material layer, and the carbon-group-material layer is a layer formed from a hydrocarbon gas and a fluorine-containing hydrocarbon gas.

Further, in the cold cathode field emission device according to the second or fifth aspect of the present invention, the electron emitting portion comprises a carbon-group-material layer and a fluoride-carbide-containing thin film formed on the surface of the carbon-group-material layer, and the fluoride-carbide-containing thin film is a film formed from a fluorine-containing hydrocarbon gas.

In the cold cathode field emission device according to the third or sixth aspect of the present invention, the electron emitting portion comprises a carbon-group-material layer, and the carbon-group-material layer has a surface terminated (modified) with fluorine atoms.

The cold cathode field emission display according to any one of the first to third aspects of the present invention is a so-called "two-electrodes" type cold cathode field emission display, and has a plurality of pixels, each pixel being constituted of a cold cathode field emission device, an anode electrode and a phosphor layer, said anode electrode and said phosphor layer being formed on a substrate so as to face the cold cathode field emission device, and the cold cathode field emission device comprising;

(a) a cathode electrode formed a supporting member, and (b) an electron emitting portion formed on the cathode electrode.

The cold cathode field emission display according to any one of the fourth to sixth aspects of the present invention is a so-called "three-electrodes" type cold cathode field emission display, and has a plurality of pixels, each pixel being constituted of a cold cathode field emission device, an anode electrode and a phosphor layer, said anode electrode and said phosphor layer being formed on a substrate so as to face the cold cathode field emission device, and the cold cathode field emission device comprising;

(a) a cathode electrode formed on a supporting member, (b) a gate electrode which is formed above the cathode electrode and has an opening portion, and (c) an electron emitting portion formed on a portion of the cathode electrode which portion is positioned in a bottom portion of the opening portion.

In the cold cathode field emission display according to the first or fourth aspect of the present invention, the electron emitting portion comprises a carbon-group-material layer, and the carbon-group-material layer is a layer formed from a hydrocarbon gas and a fluorine-containing hydrocarbon gas.

In the cold cathode field emission display according to the second or fifth aspect of the present invention, the electron emitting portion comprises a carbon-group-material layer and a fluoride-carbide-containing thin film formed on the surface of the carbon-group-material layer, and the fluoride-carbide-containing thin film is a film formed from a fluorine-containing hydrocarbon gas.

In the cold cathode field emission display according to the third or sixth aspect of the present invention, the electron emitting portion comprises a carbon-group-material layer, and the carbon-group-material layer has a surface terminated (modified) with fluorine atoms.

In the cold cathode field emission devices according to the third and sixth aspects of the present invention, or in the cold cathode field emission displays according to the third and sixth aspects of the present invention, desirably, the termination (modification) of the surface of the carbon-group-material layer with fluorine atoms is carried out with a fluorine-containing hydrocarbon gas.

In the cold cathode field emission device according to any one of the second, third, fifth and sixth aspects of the present invention, or in the cold cathode field emission display according to any one of the second, third, fifth and sixth aspects of the present invention, desirably, the carbon-group-material layer is a layer formed from a hydrocarbon gas. The above constitution will be referred to as "cold cathode field emission device according to the second-A, third-A, fifth-A or sixth-A aspect of the present invention" or "cold cathode field emission display according to the second-A, third-A, fifth-A or sixth-A aspect of the present invention" for convenience sake.

In the cold cathode field emission device according to any one of the second, third, fifth and sixth aspects of the present invention, or in the cold cathode field emission display according to any one of the second, third, fifth or sixth aspects of the present invention, desirably, the carbon-group-material layer is formed of carbon-nano-tube structures. The above constitution will be referred to as "cold cathode field emission device according to the second-B, third-B, fifth-B or sixth-B aspect of the present invention" or "the cold cathode field emission display according to the second-B, third-B, fifth-B or sixth-B aspect of the present invention" for convenience sake.

In the cold cathode field emission device according to any one of the first, second-A, third-A, fourth, fifth-A and sixth-A aspects of the present invention, or in the cold cathode field emission display according to any one of the first, second-A, third-A, fourth, fifth-A and sixth-A aspects of the present invention, desirably, a selective-growth region is formed between the cathode electrode and the carbon-group-material layer, from the viewpoint that the carbon-group-material layer is formed reliably in a predetermined region of the cathode electrode and is not formed in an unnecessary portion.

In the cold cathode field emission device according to any one of fourth to sixth aspects of the present invention, or in the cold cathode field emission display according to any one of the fourth to sixth aspects of the present invention, it is desirable to employ a constitution in which an insulating layer is formed on the supporting member and the cathode electrode, and a second opening portion communicating with the opening portion (to be sometimes referred to as "first opening portion" for convenience sake hereinafter) made through the gate electrode is made through the insulating layer. However, the present invention shall not be limited to the above constitution, and there may be employed a structure in which a metal layer (for example, a sheet or striped-shape material made of a metal) constituting the gate electrode having the first opening portion is spread and supported above the electron emitting portion through and with a gate electrode supporting member.

The manufacturing method of an electron emitting apparatus according to a first aspect of the present invention for achieving the above object comprises the step of forming an electron emitting portion comprising a carbon-group-material layer, on an electrically conductive layer, from a hydrocarbon gas and a fluorine-containing hydrocarbon gas.

The manufacturing method of an electron emitting apparatus according to a second aspect of the present invention for achieving the present invention comprises the steps of;

(A) forming a carbon-group-material layer on an electrically conductive layer, and (B) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer.

The manufacturing method of an electron emitting apparatus according to a third aspect of the present invention for achieving the present invention comprises the steps of;

(A) forming a carbon-group-material layer on an electrically conductive layer, and (B) terminating (modifying) the surface of the carbon-group-material layer with a fluorine-containing hydrocarbon gas, thereby to obtain an electron emitting portion comprising the carbon-group-material layer whose surface is terminated (modified) with fluorine atoms.

In the manufacturing method of an electron emitting portion according to the second or third aspect of the present invention, the carbon-group-material layer is preferably formed on the electrically conductive layer from a hydrocarbon gas in the above step (A). The above constitution will be referred to as "manufacturing method of an electron emitting apparatus according to the second-A aspect of the present invention" or "manufacturing method of an electron emitting apparatus according to the third-A aspect of the present invention" for convenience sake.

Alternatively, in the manufacturing method of an electron emitting apparatus according to the second or third aspect of the present invention, it is preferred to employ a constitution in which a dispersion of carbon-nano-tube structures in a binder material is applied onto the electrically conductive layer and then the binder material is fired or cured to form the carbon-group-material layer in the step (A). More specifically, the carbon-nano-tube structures are dispersed in an organic binder material such as an epoxy resin or acrylic resin or in an inorganic binder material such as water glass, the resultant dispersion is, for example, applied onto a predetermined region of the electrically conductive layer, then, the solvent is removed, and the binder material is fired or cured. As an application method, for example, a screen printing method can be employed. The above constitution will be referred to as "manufacturing method of an electron emitting apparatus according to the second-B of the present invention" or "manufacturing method of an electron emitting apparatus according to the third-B of the present invention" for convenience sake.

Alternatively, in the manufacturing method of an electron emitting apparatus according to the second or third aspect of the present invention, it is preferred to employ a constitution in which a metal compound solution in which the carbon-nano-tube structures are dispersed is applied onto the electrically conductive layer, and then the metal compound is fired, to form the carbon-group-material layer in the above step (A). The above constitution will be referred to as "manufacturing method of an electron emitting apparatus according to the second-C aspect of the present invention" or "manufacturing method of an electron emitting apparatus according to the third-C aspect of the present invention".

In the manufacturing method of an electron emitting apparatus according to any one of the first, second-A and third-A aspects of the present invention, it is preferred to further provide the step of forming a selective-growth region on the electrically conductive layer before the formation of the carbon-group-material layer, from the viewpoint that the carbon-group-material layer is formed reliably in a predetermined of the electrically conductive layer and is not formed in an unnecessary portion.

The manufacturing method of a cold cathode field emission device according to a first aspect of the present invention for achieving the above object is a manufacturing method of a cold cathode field emission device for constituting a so-called "two-electrodes" type cold cathode field emission display, and comprises the steps of;

(A) forming a cathode electrode on a supporting member, and (B) forming an electron emitting portion on the cathode electrode, in which the electron emitting portion comprises a carbon-group-material layer, and the step of forming the electron emitting portion comprises the step of forming the carbon-group-material layer from a hydrocarbon gas and a fluorine-containing hydrocarbon gas.

The manufacturing method of a cold cathode field emission display according to a first aspect of the present invention for achieving the above object is a manufacturing method of a so-called "two-electrodes" type cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, and (B) forming an electron emitting portion on the cathode electrode, thereby to form the cold cathode field emission device, in which the electron emitting portion comprises a carbon-group-material layer, and the step of forming the electron emitting portion comprises the step of forming the carbon-group-material layer from a hydrocarbon gas and a fluorine-containing hydrocarbon gas.

In the manufacturing method of a cold cathode field emission device according to the first aspect of the present invention, or in the manufacturing method of a cold cathode field emission display according to the first aspect of the present invention, preferably, interposed between the step (A) and the step (B) is the step of forming a selective-growth region on the cathode electrode, and the step (B) is carried out by forming the electron emitting portion on the selective-growth region in place of forming the electron emitting portion on the cathode electrode, from the viewpoint that the carbon-group-material layer is formed reliably in a predetermined region of the cathode electrode and is not formed in an unnecessary portion. The above constitution will be referred to as "manufacturing method of a cold cathode field emission device according to the first (1) aspect of the present invention" or "manufacturing method of a cold cathode field emission display according to the first (1) aspect of the present invention" for convenience sake.

The manufacturing method of a cold cathode field emission device according to a second aspect of the present invention for achieving the above object is a manufacturing method of a cold cathode field emission device for constituting a so-called "two-electrodes" type cold cathode field emission display, and comprises the steps of;

(A) forming a cathode electrode on a supporting member, (B) forming a carbon-group-material layer on the cathode electrode, and (C) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer.

The manufacturing method of a cold cathode field emission display according to a second aspect of the present invention for achieving the above object is a manufacturing method of a so-called "two-electrodes" type cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming a carbon-group-material layer on the cathode electrode, and (C) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer, whereby the cold cathode field emission device is formed.

The manufacturing method of a cold cathode field emission device according to a third aspect of the present invention for achieving the above object is a manufacturing method of a cold cathode field emission device for constituting a so-called "two-electrodes" type cold cathode field emission display, and comprises the steps of;

(A) forming a cathode electrode on a supporting member, (B) forming a carbon-group-material layer on the cathode electrode, and (C) terminating (modifying) the surface of the carbon-group-material layer with a fluorine-containing hydrocarbon gas, thereby to obtain an electron emitting portion comprising the carbon-group-material layer having the surface terminated (modified) with fluorine atoms.

The manufacturing method of a cold cathode field emission display according to a third aspect of the present invention for achieving the above object is a manufacturing method of a so-called "two-electrodes" type cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming a carbon-group-material layer on the cathode electrode, and (C) terminating (modifying) the surface of the carbon-group-material layer with a fluorine-containing hydrocarbon gas, thereby to obtain an electron emitting portion comprising the carbon-group-material layer having the surface terminated (modified) with fluorine atoms, whereby the cold cathode field emission device is formed.

In the manufacturing method of a cold cathode field emission device according to the second or third aspect of the present invention, or in the manufacturing method of a cold cathode field emission display according to the second or third aspect of the present invention, it is preferred to form the carbon-group-material layer on the cathode electrode from a hydrocarbon gas in the above step (B). The above constitution will be referred to as "manufacturing method of a cold cathode field emission device according to the second-A or third-A aspect of the present invention" or "manufacturing method of a cold cathode field emission display according to the second-A or third-A aspect of the present invention" for convenience sake. In this case, preferably, interposed between the above steps (A) and (B) is the step of forming a selective-growth region on the cathode electrode, and in the above (B), the electron emitting portion is formed on the selective-growth region in place of forming the electron emitting portion on the cathode electrode, from the viewpoint that the carbon-group-material layer is formed reliably in a predetermined region of the cathode electrode and is not formed in an unnecessary portion. The above constitution will be referred to as "manufacturing method of a cold cathode field emission device according to the second-A(1) aspect or third-A(1) aspect of the present invention" or "manufacturing method of a cold cathode field emission display according to the second-A(1) aspect or third-A(1) aspect of the present invention" for convenience sake.

Alternatively, in the manufacturing method of a cold cathode field emission device according to the second or third aspect of the present invention, in the manufacturing method of a cold cathode field emission device according to the fifth, sixth, eighth or ninth aspect of the present invention which will be described later, in the manufacturing method of a cold cathode field emission display according to the second or third aspect of the present invention, or in the manufacturing method of a cold cathode field emission display according to the fifth, sixth, eighth or ninth aspect of the present invention which will be described later, there may be employed a constitution in which a dispersion of carbon nano-tube structures in a binder material is applied onto the cathode electrode and the binder material is fired or cured to form the carbon-group-material layer in the step of forming the electron emitting portion. More specifically, the carbon nano-tube structures are dispersed in an organic binder material such as an epoxy resin or acrylic resin or in an inorganic binder material such as water glass, the resultant dispersion is, for example, applied onto a predetermined region of the cathode electrode, and then the solvent is removed and the binder material is fired or cured. As an application method, for example, a screen printing method can be employed.

The above constitution will be referred to as "manufacturing method of a cold cathode field emission device according to the second-B, third-B, fifth-B, sixth-B, eighth-B or ninth-B aspect of the present invention" or "manufacturing method of a cold cathode field emission display according to the second-B, third-B, fifth-B, sixth-B, eighth-B or ninth-B aspect of the present invention" for convenience sake.

Alternatively, in the manufacturing method of a cold cathode field emission device according to the second or third aspect of the present invention, in the manufacturing method of a cold cathode field emission device according to the fifth, sixth, eighth or ninth aspect of the present invention which will be described later, in the manufacturing method of a cold cathode field emission display according to the second or third aspect of the present invention, or in the manufacturing method of a cold cathode field emission display according to fifth, sixth, eighth or ninth aspect of the present invention which will be described later, there may be employed a constitution in which a metal compound solution in which the carbon nano-tube structures are dispersed is applied onto the cathode electrode and then the metal compound is fired, to form the carbon-group-material layer in the step of forming the electron emitting portion.

The above constitution will be referred to as "manufacturing method of a cold cathode field emission device according to the second-C, third-C, fifth-C, sixth-C, eighth-C or ninth-C aspect of the present invention" or "manufacturing method of a cold cathode field emission display according to the second-C, third-C, fifth-C, sixth-C, eighth-C or ninth-C aspect of the present invention" for convenience sake.

The manufacturing method of a cold cathode field emission device according to any one of the fourth to sixth aspects of the present invention is a manufacturing method of a cold cathode field emission device for constituting a so-called "three-electrodes" type cold cathode field emission display, and comprises the steps of;

(A) forming a cathode electrode on a supporting member, (B) forming an insulating layer on the supporting member and the cathode electrode, (C) forming a gate electrode having an opening portion on the insulating layer, (D) forming a second opening portion through the insulating layer, said second opening portion communicating with the opening portion formed through the gate electrode, thereby to expose the cathode electrode in a bottom portion of the second opening portion, and (E) forming an electron emitting portion on the cathode electrode exposed in the bottom portion of the second opening portion.

The manufacturing method of a cold cathode field emission display according to any one of the fourth to sixth aspects of the present invention for achieving the above object is a manufacturing method of a so-called "three-electrodes" type cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming an insulating layer on the supporting member and the cathode electrode, (C) forming a gate electrode having an opening portion on the insulating layer, (D) forming a second opening portion through the insulating layer, said second opening portion communicating with the opening portion formed through the gate electrode, thereby to expose the cathode electrode in a bottom portion of the second opening portion, and (E) forming an electron emitting portion on the cathode electrode exposed in the bottom portion of the second opening portion, whereby the cold cathode field emission device is formed.

Further, the manufacturing method of a cold cathode field emission device according to any one of the seventh to ninth aspects of the present invention for achieving the above object is a manufacturing method of a cold cathode field emission device for constituting a so-called "three-electrodes" type cold cathode field emission display, and comprises the steps of;

(A) forming a cathode electrode on a supporting member, (B) forming an electron emitting portion on the cathode electrode, and (C) forming a gate electrode having an opening portion above the electron emitting portion.

The manufacturing method of a cold cathode field emission display according to any one of the seventh to ninth aspects of the present invention for achieving the above object is a manufacturing method of a so-called "three-electrodes" type cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming an electron emitting portion on the cathode electrode, and (C) forming a gate electrode having an opening portion above the electron emitting portion, whereby the cold cathode field emission device is formed.

In the manufacturing method of a cold cathode field emission device according to the fourth or seventh aspect of the present invention, or in the manufacturing method of a cold cathode field emission display according to fourth or seventh aspect of the present invention, the electron emitting portion comprises a carbon-group-material layer, and the step of forming the electron emitting portion comprises the step of forming the carbon-group-material layer from a hydrocarbon gas and a fluorine-containing hydrocarbon gas.

In the manufacturing method of a cold cathode field emission device according to the fifth or eighth aspect of the present invention, or in the manufacturing method of a cold cathode field emission display according to the fifth or eighth aspect of the present invention, the electron emitting portion comprises a carbon-group-material layer and a fluoride-carbide-containing thin film formed on the surface of the carbon-group-material layer, and the step of forming the electron emitting portion comprises the step of forming the fluoride-carbide-containing thin film on the surface of the formed carbon-group-material layer from a fluorine-containing hydrocarbon gas.

Further, in the manufacturing method of a cold cathode field emission device according to the sixth or ninth aspect of the present invention, or in the manufacturing method of a cold cathode field emission display according to the sixth or ninth aspect of the present invention, the electron emitting portion comprises a carbon-group-material layer, and the step of forming the electron emitting portion comprises the step of terminating (modifying) the surface of the formed carbon-group-material layer with a fluorine-containing hydrocarbon gas.

In the manufacturing method of an electron emitting apparatus according to the third aspect of the present invention, in the manufacturing method of a cold cathode field emission device according to any one of the third, sixth and ninth aspects of the present invention, or in the manufacturing method of a cold cathode field emission display according to any one of the third, sixth and ninth aspects of the present invention, the termination (modification) of the surface of the carbon-group-material layer with fluorine atoms is preferably carried out with a fluorine-containing hydrocarbon gas.

In the manufacturing method of a cold cathode field emission device according to any one of the seventh to ninth aspects of the present invention, or in the manufacturing method of a cold cathode field emission display according to any one of the seventh to ninth aspects of the present invention, there may be employed a constitution in which the step (B) is followed by forming an insulating layer on the entire surface, and the step (C) is followed by forming a second opening portion through the insulating layer, said second opening portion communicating with the opening portion formed through the gate electrode, thereby to expose the carbon-group-material layer in a bottom portion of the second opening portion.

In the manufacturing method of a cold cathode field emission device according to any one of the fifth, sixth, eighth and ninth aspects of the present invention, or in the manufacturing method of a cold cathode field emission display according to any one of the fifth, sixth, eighth and ninth aspects of the present invention, preferably, the carbon-group-material layer is formed from a hydrocarbon gas in the step of forming the electron emitting portion. The above constitution will be referred to as "manufacturing method of a cold cathode field emission device according to the fifth-A, sixth-A, eighth-A or ninth-A aspect of the present invention" or "manufacturing method of a cold cathode field emission display according to the fifth-A, sixth-A, eighth-A or ninth-A aspect of the present invention" for convenience sake.

Alternatively, in the manufacturing method of a cold cathode field emission device according to any one of the fourth, fifth-A and sixth-A aspects of the present invention, or in the manufacturing method of a cold cathode field emission display according to any one of the fourth, fifth-A and sixth-A aspects of the present invention, there may be also employed a constitution in which interposed between the step (A) and the step (B) is the step of forming a selective-growth region on the cathode electrode, an insulating layer is formed on the supporting member, the selective-growth region and the cathode electrode in the step (B), a second opening portion is formed through the insulating layer in the step (D), said second opening portion communicating with the opening portion formed through the gate electrode, thereby to expose the selective-growth region in the bottom portion of the second opening portion, and the electron emitting portion is formed on the selective-growth region exposed in the bottom portion of the second opening portion in the step (E).

The above constitution will be referred to as "manufacturing method of a cold cathode field emission device according to the fourth (1), fifth-A(1) or sixth-A(1) aspect of the present invention" or "manufacturing method of a cold cathode field emission display according to the fourth (1), fifth-A(1) or sixth-A(1) aspect of the present invention" for convenience sake.

Alternatively, in the manufacturing method of a cold cathode field emission device according to any one of the fourth, fifth-A and sixth-A aspects of the present invention, or in the manufacturing method of a cold cathode field emission display according to any one of the fourth, fifth-A and sixth-A aspects of the present invention, there may be employed a constitution in which interposed between the step (D) and the step (E) is the step of forming a selective-growth region on the cathode electrode exposed in the bottom portion of the second opening portion, and the electron emitting portion is formed on the selective-growth region in the step (E) in place of forming the electron emitting portion on the cathode electrode exposed in the bottom portion of the second opening portion.

The above constitution will be referred to as "manufacturing method of a cold cathode field emission device according to the fourth (2), fifth-A(2) or sixth-A(2) aspect of the present invention" or "manufacturing method of a cold cathode field emission display according to the fourth (2), fifth-A(2) or sixth-A(2) aspect of the present invention" for convenience sake.

In the manufacturing method of a cold cathode field emission device according to any one of the seventh, eighth-A and ninth-A aspects of the present invention, or in the manufacturing method of a cold cathode field emission display according to any one of the seventh, eighth-A and ninth-A aspects of the present invention, there may be employed a constitution in which interposed between the step (A) and the step (B) is the step of forming a selective-growth region on the cathode electrode, and the electron emitting portion is formed on the selective-growth region in the step (B) in place of forming the electron emitting portion on the cathode electrode.

The above constitution will be referred to as "manufacturing method of a cold cathode field emission device according to the seventh (1), eighth-A(1) or ninth-A(1) aspect of the present invention" or "manufacturing method of a cold cathode field emission display according to the seventh (1), eighth-A(1) or ninth-A(1) aspect of the present invention" for convenience sake.

In the electron emitting apparatus or in the manufacturing method thereof in the present invention, in the cold cathode field emission device or in the manufacturing method thereof in the present invention, and in the cold cathode field emission display or in the manufacturing method thereof in the present invention, including embodiments according to various aspects of the present invention (all of these will be sometimes generally referred to as "the present invention"), the hydrocarbon gas as a raw material for forming the carbon-group-material layer includes hydrocarbon gases such as methane ($CH_4$), ethane ($C_2H_6$), propane ($C_3H_8$), butane ($C_4H_{10}$), ethylene ($C_2H_4$), acetylene ($C_2H_2$), mixtures of these gases, and mixtures of these hydrocarbon gases with hydrogen gas. Further, there may be used a gas prepared by gasifying methanol, ethanol, acetone, benzene, toluene, xylene or the like, or mixtures of these gasified gases with hydrogen. Further, for stabilizing discharging and for promoting plasma dissociation, a rare gas such as helium (He), argon (Ar) or the like may be introduced.

The fluorine-containing hydrocarbon gas is selected from perfluorocarbons. Specifically, the fluorine-containing hydrocarbon gas includes saturated fluorine-containing hydrocarbon gases such as $CF_4$ gas, $C_2F_6$ gas and $C_3F_8$ gas, and unsaturated fluorine-containing hydrocarbon gases such as $C_3F_4$ gas and $C_4F_8$ gas. Further, hydrogen- and fluorine-containing hydrocarbon gases may be used, and specific examples thereof include $CH_3F$ gas and $CH_2F_2$ gas. Generally, with an increase in the content of a fluorine component constituting the fluorine-containing hydrocarbon gas, the deposition of a fluoride-carbide-containing thin film ($CF_x$ thin film) from the fluorine-containing hydrocarbon gas comes to be more difficult. That is, for forming a fluoridecarbide-containing thin film, it is preferred to use a fluorine-containing hydrocarbon gas whose fluorine component content constituting the fluorine-containing hydrocarbon gas is small. For terminating (modifying) the surface of the carbon-group-material layer with fluorine atoms, it is preferred to use a fluorine-containing hydrocarbon gas whose fluorine component content constituting the fluorine-containing hydrocarbon gas is large.

In the present invention, the carbon-group-material layer can be constituted from a graphite thin film, an amorphous carbon thin film, a diamond-like carbon thin film, a fullerene thin film, carbon nano-tubes or carbon-nano-fibers. When the carbon-group-material layer is formed from a hydrocarbon gas, the method of forming the carbon-group-material layer includes CVD methods such as a microwave plasma method, a transformer-coupled plasma method, an inductively coupled plasma method, an electron cyclotron resonance plasma method, an RF plasma method, a helicon wave plasma CVD method and a capacitively coupled plasma CVD method, and a CVD method using a diode parallel plate plasma enhanced CVD system. The form of the thus-formed carbon-group-material layer not only includes the form of a thin film and a plate but also includes a carbon whisker, a carbon nano-tube and a carbon nano-fiber. Specifically, the above form includes nano-crystal diamond, nano-crystal graphite, a carbon nano-tube, a carbon nano-fiber and a carbon sheet. Under some forming conditions, the thus-formed carbon-group-material layer has the form of a cone.

Specifically, the carbon nano-tube structure includes a carbon nano-tube and a carbon nano-fiber. More specifically, the electron-emitting portion may be constituted of carbon nano-tubes, it may be constituted of carbon nano-fibers, or it may be constituted of a mixture of carbon nano-tubes with carbon nano-fibers. Macroscopically, the carbon nano-tube and carbon nano-fiber may have the form of a powder or a thin film. The carbon nano-tube structure constituted of the carbon nano-tube and carbon nano-fiber can be produced or formed by a known PVD method as an arc discharge method and a laser abrasion method; and any one of various CVD methods such as a plasma CVD method, a laser CVD method, a thermal CVD method, a gaseous phase synthetic method and a gaseous phase growth method.

In the manufacturing method of an electron emitting apparatus according to any one of the second-C and third-C aspects of the present invention, the manufacturing method of a cold cathode field emission device according to any one of the second-C, third-C, fifth-C, sixth-C, eighth-C and ninth-C aspects of the present invention, and the manufacturing method of a cold cathode field emission display according to any one of the second-C, third-C, fifth-C, sixth-C, eighth-C and ninth-C aspects of the present invention, the carbon nano-tube structures are fixed to the surface of the cathode electrode or the electrically conductive layer with a matrix containing metal atoms derived from the metal compound. The matrix is preferably constituted of an electrically conductive metal oxide. More specifically, it is preferably constituted of tin oxide, indium oxide, indium-tin oxide, zinc oxide, antimony oxide or antimony-tin oxide. After the firing, there can be obtained a state where part of each carbon nano-tube structure is embedded in the matrix, or there can be obtained a state where the entire portion of each carbon nano-tube is embedded in the matrix. The matrix preferably has a volume resistivity of $1 \times 10^{-9}$ $\Omega \cdot m$ to $5 \times 10^{-6}$ $\Omega \cdot m$.

The metal compound for constituting the metal compound solution includes, for example, an organometal compound, an organic acid metal compound and metal salts (for example, chloride, nitrate and acetate). The organic acid metal compound solution is, for example, a solution prepared by dissolving an organic tin compound, an organic indium compound, an organic zinc compound or an organic antimony compound in an acid (for example, hydrochloric acid, nitric acid or sulfuric acid) and diluting the resultant solution with an organic solvent (for example, toluene, butyl acetate or isopropyl alcohol). Further, the organic metal compound solution is, for example, a solution prepared by dissolving an organic tin compound, an organic indium compound, an organic zinc compound or an organic antimony compound in an organic solvent (for example, toluene, butyl acetate or isopropyl alcohol). When the amount of the solution is 100 parts by weight, the solution preferably has a composition containing 0.001 to 20 parts by weight of the carbon nano-tube structures and 0.1 to 10 parts by weight of the metal compound. The solution may contain a dispersing agent and a surfactant. From the viewpoint of increasing the thickness of the matrix, an additive such as carbon black or the like may be added to the metal compound solution. In some cases, the organic solvent may be replaced with water.

The method for applying, onto the cathode electrode or the electrically conductive layer, the metal compound solution in which the carbon nano-tube structures are dispersed includes a spray method, a spin coating method, a dipping method, a die quarter method and a screen printing method. Of these, a spray method is preferred in view of easiness in application.

There may be employed a constitution in which the metal compound solution in which the carbon nano-tube structures are dispersed is applied onto the cathode electrode or the electrically conductive layer, the metal compound solution is dried to form a metal compound layer, then, an unnecessary portion of the metal compound layer on the cathode electrode or the electrically conductive layer is removed, and then the metal compound is fired. Otherwise, an unnecessary portion of the metal compound layer on the cathode electrode or the electrically conductive layer may be removed after the metal compound is fired. Otherwise, the metal compound solution may be applied only onto a desired region of the cathode electrode or the electrically conductive layer.

The temperature for firing the metal compound is preferably, for example, a temperature at which the metal salt is oxidized to form a metal oxide having electric conductivity, or a temperature at which the organometal compound or an organic acid metal compound is decomposed to form a matrix (for example, a metal oxide having electric conductivity) containing metal atoms constituting the organometal compound or the organic acid metal compound. For example, the above temperature is preferably at least 300° C. The upper limit of the firing temperature can be a temperature at which elements constituting the electron emitting apparatus, the field emission device or the cathode panel do not suffer any thermal damage and the like.

In the manufacturing method of an electron emitting apparatus according to any one of the second-B, third-B, second-C and third-C aspects of the present invention, in the manufacturing method of an cold cathode field emission device according to any one of the second-B, third-B, fifth-B, sixth-B, eighth-B and ninth-B aspects of the present invention, in the manufacturing method of an cold cathode field emission display according to any one of the second-B, third-B, fifth-B, sixth-B, eighth-B and ninth-B aspects of the present invention, in the manufacturing method of an cold cathode field emission device according to any one of the second-C, third-C, fifth-C, sixth-C, eighth-C and ninth-C aspects of the present invention, and in the manufacturing method of an cold cathode field emission display according to any one of the second-C, third-C, fifth-C, sixth-C, eighth-C and ninth-C aspects of the present invention, it is preferred to carry out a kind of an activation treatment (washing treatment) of the surface of the carbon-group-material layer after the forming of the carbon-group-material layer, since the efficiency of emission of electrons from the electron-emitting portion is further improved. The above activation treatment includes a plasma treatment in an atmosphere containing a gas such as hydrogen gas, ammonia gas, helium gas, argon gas, neon gas, methane gas, ethylene gas, acetylene gas or nitrogen gas.

In the electron emitting apparatus according to any one of the first to third aspects of the present invention in which the selective-growth region is formed, in the cold cathode field emission device according to any one of the first to sixth aspects of the present invention in which the selective-growth region is formed, and in the cold cathode field emission display according to any one of the first to sixth aspects of the present invention in which the selective-growth region is formed, desirably, the selective-growth region is formed in a manner in which metal particles adhere onto the surface of the electrically conductive layer or the cathode electrode or in which a metal thin film or an organometal compound thin film is formed on the surface of the electrically conductive layer or the cathode electrode.

In the cold cathode field emission device according to any one of the fourth to sixth aspects of the present invention in which the selective-growth region is formed, and in the cold cathode field emission display according to any one of the fourth to sixth aspects of the present invention in which the selective-growth region is formed, the selective-growth region may be formed in that portion of the cathode electrode which is positioned in a bottom portion of the opening portion, or the selective-growth region may be also formed so as to extend from that portion of the cathode electrode which is positioned in a bottom portion of the opening portion to a surface of that portion of the cathode electrode which is different from the cathode electrode portion in the bottom portion of the opening portion. Further, the selective-growth region may be formed on the entire surface or part of the surface of that portion of the cathode electrode that is positioned in the bottom portion of the opening portion.

In the manufacturing method of an cold cathode field emission device according to any one of the fourth (2), fifth-A(2) and sixth-A(2) aspects of the present invention, and in the manufacturing method of an cold cathode field emission display according to any one of the fourth (2), fifth-A(2) and sixth-A(2) aspects of the present invention, the step of forming a selective-growth region on the surface of the cathode electrode (to be referred to as "the step of forming the selective-growth region" hereinafter) can be the step of forming a mask layer on the cathode electrode in a state where the surface of the cathode electrode is exposed in a central portion of the bottom portion of the second opening portion (i.e., forming a mask layer at least on a side wall of the second opening portion), and then allowing metal particles to adhere onto, or forming a metal thin layer or an organometallic compound thin layer on, the mask layer and the exposed surface of the cathode electrode.

The above mask layer can be formed, for example, by a method in which a resist material layer or a hard mask material layer is formed on the entire surface and making a hole in a portion of the resist material layer or the hard mask material layer which portion is positioned in the central portion of the bottom portion of the second opening portion by lithography. In a state where the mask layer covers part of the cathode electrode which part is positioned in the bottom portion of the second opening portion, the side wall of the second opening portion, the side wall of the first opening portion, the insulating layer and the gate electrode, the selective-growth region is formed on the surface of the cathode electrode which surface is positioned in the central portion of the bottom portion of the second opening portion. Therefore, short-circuiting between the cathode electrode and the gate electrode through the metal particles or the metal thin layer can be reliably prevented. In some cases, the mask layer may cover the gate electrode alone. Otherwise, the mask layer may cover only the gate electrode in the vicinity of the first opening portion, or the mask layer may cover the gate electrode in the vicinity of the first opening portion and the side walls of the first and second opening portions. In these cases, a carbon-group-material layer may be formed on the gate electrode depending upon an electrically conductive material constituting the gate electrode. However, electrons are not emitted when the above carbon-group-material layer is not placed in a high-intensity electric field. It is preferred to remove the mask layer before the formation of the carbon-group-material layer on the selective-growth region.

The step of forming the selective-growth region preferably comprises the step of allowing metal particles to adhere onto, or forming a metal thin film or an organometal compound thin film on, the portion of the cathode electrode where the selective-growth region is to be formed, thereby to obtain the selective-growth region formed by allowing metal particles to adhere onto, or forming a metal thin film or an organometal compound thin film on, the surface of the portion of the cathode electrode.

Otherwise, for making more reliable the selective-growth of the carbon-group-material layer on the selective-growth region, after the metal particles are allowed to adhere onto, or the metal thin layer or the organometallic compound thin layer is formed on, the surface of the cathode electrode, it is preferred to remove a metal oxide (so-called natural oxide film) on the surface of each metal particle or on the surface of the metal thin layer or the organometallic compound thin layer. The metal oxide on the surface of each metal particle or on the surface of the metal thin layer or the organometallic compound thin layer is preferably removed, for example, by plasma reduction treatment based on, in a hydrogen gas atmosphere, a microwave plasma method, a transformer-coupled plasma method, an inductively coupled plasma method, an electron cyclotron resonance plasma method or an RF plasma method; by sputtering in an argon gas atmosphere; or by washing, for example, with an acid such as hydrofluoric acid or a base. Preferably, the step of removing the metal oxide on the surface of each metal particle or on the surface of the metal thin layer or the organometallic compound thin layer is carried out immediately before the formation of the carbon-group-material layer on the selective-growth region. In the production of the electron emitting apparatus of the present invention, further, the above-explained various steps can be applied to the portion of the electrically conductive layer in which portion the selective-growth region is to be formed. "The portion of the electrically conductive layer in which portion the selective-growth region is to be formed" will be sometimes simply referred to as "electrically conductive layer portion", and "the portion of the cathode electrode in which portion the selective-growth region is to be formed" will be sometimes simply referred to as "cathode electrode portion", hereinafter.

The method for allowing the metal particles to adhere onto the surface of the electrically conductive layer portion or the cathode electrode portion includes, for example, a method in which, in a state where a region other than the region where the selective-growth region is to be formed in the electrically conductive layer or the cathode electrode is covered with a proper material (for example, a mask layer), a layer composed of a solvent and the metal particles is formed on the surface of the electrically conductive layer portion or the cathode electrode portion, and then, the solvent is removed while retaining the metal particles. Alternatively, the step of allowing the metal particles to adhere onto the surface of the electrically conductive layer portion or the cathode electrode portion includes, for example, a method in which, in a state where a region other than the region where the selective-growth region is to be formed in the electrically conductive layer or the cathode electrode is covered with a proper material (for example, a mask layer), metal compound particles containing metal atoms constituting the metal particles are allowed to adhere onto the surface of the electrically conductive layer or the cathode electrode, and then the metal compound. particles are heated to decompose them, whereby there is obtained the selective-growth region constituted of the portion of the electrically conductive layer or the cathode electrode which portion has the surface onto which the metal particles adhere. In the above method, specifically, a layer composed of a solvent and metal compound particles is formed on the electrically conductive layer portion or the cathode electrode portion, and the solvent is removed while retaining the metal compound particles. The above metal compound particles are preferably composed of at least one material selected from the group consisting of halides (for example, iodides, chlorides, bromides, etc.), oxides and hydroxides of the metal and organic metal for constituting the metal particles. In the above methods, the material (for example, mask layer) covering the region other than the region where the selective-growth region is to be formed in the electrically conductive layer or the cathode electrode is removed at a proper stage.

Although differing depending upon materials for constituting the metal thin layer, the method for forming the metal thin layer on the electrically conductive layer portion or the cathode electrode portion is selected, for example, from a plating method such as an electroplating method and an electroless plating method, a chemical vapor deposition method (CVD method) including an MOCVD method, a physical vapor deposition method (PVD method) and a method of pyrolyzing an organometallic compound, in a state where a region other than the region where the selective-growth region is to be formed in the electrically conductive layer or the cathode electrode is covered with a proper material. The physical vapor deposition method includes (a) vacuum deposition methods such as an electron beam heating method, a resistance heating method and a flash deposition method, (b) a plasma deposition method, (c) sputtering methods such as a bipolar sputtering method, a DC sputtering method, a DC magnetron sputtering method, a high-frequency sputtering method, a magnetron sputtering method, an ion beam sputtering method and a bias sputtering method, and (d) ion plating methods such as a DC (direct current) method, an RF method, a multi-cathode method, an activating reaction method, an electric field deposition method, a high-frequency ion plating method and a reactive ion-plating method.

Preferably, the metal particles or the metal thin layer for forming the selective-growth region are/is composed of at least one metal selected from the group consisting of molybdenum (Mo), nickel (Ni), titanium (Ti), chromium (Cr), cobalt (Co), tungsten (W), zirconium (Zr), tantalum (Ta), iron (Fe), copper (Cu), platinum (Pt), zinc (Zn), cadmium (Cd), germanium (Ge), tin (Sn), lead (Pb), bismuth (Bi), silver (Ag), gold (Au), indium (In) and thallium (Tl).

The organometallic compound thin layer constituting the selective-growth region can be formed from an organometallic compound containing at least one element selected from the group consisting of zinc (Zn), tin (Sn), aluminum (Al), lead (Pb), nickel (Ni) and cobalt (Co). Further, it is preferably composed of a complex compound. Examples of the ligand constituting the above complex compound include acetylacetone, hexafluoroacetylacetone, dipivaloylmethane and cyclopentadienyl. The organometallic compound thin layer may contain part of a decomposition product from an organometallic compound.

The step of forming the organometallic compound thin layer on the electrically conductive layer portion or the cathode electrode portion can be the step of forming a layer composed of an organometallic compound solution on the electrically conductive layer portion or the cathode electrode portion, or the step of sublimating an organometallic compound to deposit it on the electrically conductive layer portion or the cathode electrode portion. In these cases, the organometallic compound thin layer constituting the selective-growth region is preferably composed of an organometallic compound containing at least one element selected from the group consisting of zinc (Zn), tin (Sn), aluminum (Al), lead (Pb), nickel (Ni) and cobalt (Co). Further, it is preferably composed of a complex compound. Examples of the ligand constituting the above complex compound include acetylacetone, hexafluoroacetylacetone, dipivaloylmethane and cyclopentadienyl. The organometallic compound thin layer may contain part of a decomposition product from an organometallic compound.

In the manufacturing method of a cold cathode field emission device according to any one of the fourth to ninth aspects of the present invention, or in the manufacturing method of a cold cathode field emission display according to any one of the fourth to ninth aspects of the present invention, the method of forming a gate electrode having a first opening portion on the insulating layer includes, for example, a method in which an electrically conductive material layer for constituting the gate electrode is formed on the insulating layer; then, a patterned first mask material layer is formed on the electrically conductive material layer; the electrically conductive material layer is etched with using the above first mask material layer as an etching mask, to pattern the electrically conductive material layer; the first mask material layer is removed; then, a patterned second mask material layer is formed on the electrically conductive material layer and the insulating layer; and the electrically conductive material layer is etched with using the above second mask material layer as an etching mask, to form the first opening portion. Alternatively, there may be employed a method in which the gate electrode having the first opening portion is directly formed by a screen printing method. In these cases, the method of forming the second opening portion, communicating with the first opening portion formed through the gate electrode, in the insulating layer can be a method in which the insulating layer is etched with using the second mask material layer as an etching mask, or can be a method in which the insulating layer is etched with using the first opening portion formed through the gate electrode as an etching mask. The first opening portion and the second opening portion have the relationship of a one-to-one correspondence. That is, one second opening portion is formed for one first opening portion.

In the manufacturing method of a cold cathode field emission device according to any one of the seventh to ninth aspects of the present invention, or in the manufacturing method of a cold cathode field emission display according to any one of the seventh to ninth aspects of the present invention, the step of forming the gate electrode having the opening portion above the carbon-group-material layer or the step of forming the gate electrode having the opening portion above the selective-growth region may comprise the steps of forming a stripe-shaped gate electrode supporting member composed of an insulating material on the supporting member and arranging the gate electrode composed of a stripe-shaped or sheet-shaped metal layer having a plurality of opening portions formed therein, above the carbon-group-material layer or the selective-growth region such that the metal layer is in contact with top surfaces of the gate electrode supporting members.

When the cold cathode field emission display is so-called "three-electrodes" type, generally, the cathode electrode has an outer form of a stripe, and the gate electrode also has an outer form of a stripe. The cathode electrode in the form of a stripe extends in one direction, and the gate electrode in the form of a stripe extends in another direction. Preferably, a projection image of the cathode electrode in the form of a stripe and a projection image of the gate electrode in the form of a stripe cross each other at right angles. In a region where projection images of these two electrodes overlap (the region corresponding to one pixel and being an electron emitting region where the cathode electrode and the gate electrode overlap), one selective-growth region or a plurality of selective-growth regions are positioned. In the effective field of the cathode panel (a region which works as an actual display portion), further, such electron emitting regions are arranged in the form of a two-dimensional matrix.

When the cold cathode field emission display is of a so-called "two-electrodes" type, the cathode electrode has the outer form of a stripe, and the anode electrode also has the outer form of a stripe. Alternatively, the cathode electrode has an outer so as to correspond to one pixel, and the anode electrode is shaped in the form of one sheet covering an effective field.

The plan form of the first or second opening portion (form obtained by cutting the first or second opening portion with an imaginary plane in parallel with the cathode electrode) may be any form such as a circle, an oval, a rectangle, a polygon, a rounded rectangle or a rounded polygon. As described above, the first opening portion can be formed, for example, by isotropic etching or by a combination of anisotropic etching and isotropic etching. The first opening portion can be directly formed depending upon the forming method of the gate electrode. The second opening portion can also be formed, for example, by isotropic etching or by a combination of anisotropic etching and isotropic etching.

It is sufficient that the carbon-group-material layer should be formed on the surface of the portion of the cathode electrode which portion is positioned in the bottom portion of the second opening portion. The carbon-group-material layer may be formed so as to extend from the portion of the cathode electrode which portion is positioned in the bottom portion of the second opening portion to a surface of a portion of the cathode electrode which portion is located in other than the bottom portion of the second opening portion. Further, the carbon-group-material layer may be formed on the entirety of the surface of the portion of the cathode electrode which portion is positioned in the bottom portion of the second opening portion, or it may be formed in part of the above portion.

In the present invention, there may be employed a constitution in which the electrically conductive layer or the cathode electrode is constituted of one layer of an electrically conductive material layer or is constituted of a three layers of a lower electrically conductive material layer, a resistance layer formed on the lower electrically conductive material layer, and an upper electrically conductive material layer formed on the resistance layer. In the latter case, the selective-growth region is formed on the upper electrically conductive material layer. When the resistance layer is formed, uniform electron-emitting properties of the electron emitting portions can be attained. The material for constituting a resistance layer includes carbon-containing materials such as silicon carbide (SiC) and SiCN; SiN; semiconductor materials such as amorphous silicon and the like; and refractory metal oxides such as ruthenium oxide ($RuO_2$), tantalum oxide and tantalum nitride. The resistance layer can be formed by a sputtering method, a CVD method or a screen-printing method. The resistance value of the resistance layer is approximately $1\times10^5$ to $1\times10^7$ Ω, preferably several MΩ.

When the cold cathode field emission display is a so-called "three-electrodes" type, there may be employed a constitution in which a second insulating layer is further formed on the gate electrode and the insulating layer and a focus electrode is formed on the second insulating layer. Otherwise, the focus electrode may be formed above the gate electrode. The above focus electrode is provided for converging the pass of electrons which are emitted through the opening portion and attracted toward the anode electrode so that the brightness can be improved and that an optical crosstalk among neighboring pixels can be prevented. The focus electrode is effective particularly for a so-called high-voltage type cold cathode field emission display in which the anode electrode and the cathode electrode have a potential difference on the order of several kilovolts and have a relatively large distance from one to the other. A relatively negative voltage is applied to the focus electrode from a focus-electrode control circuit. It is not necessarily required to provide the focus electrode per cold cathode field emission device. For example, the focus electrode may be extended in a predetermined direction in which the cold cathode field emission devices are arranged, so that a common focusing effect can be exerted on a plurality of the cold cathode field emission devices.

In the manufacturing method of a cold cathode field emission display according to any one of the first to ninth aspects of the present invention, the bonding of the substrate and the supporting member in their circumferential portions may be carried out with an adhesive layer or with a frame made of an insulating rigid material such as glass or ceramic and an adhesive layer. When the frame and the adhesive layer are used in combination, the facing distance between the substrate and the supporting member can be adjusted to be longer by properly determining the height of the frame than that obtained when the adhesive layer alone is used. While a frit glass is generally used as a material for the adhesive layer, a so-called low-melting-point metal material having a melting point of approximately 120 to 400° C. may be used. The low-melting-point metal material includes In (indium; melting point 157° C.); an indium-gold low-melting-point alloy; tin (Sn)-containing high-temperature solders such as $Sn_{80}Ag_{20}$ (melting point 220 to 370° C.) and $Sn_{95}Cu_5$ (melting point 227 to 370° C.); lead (Pb)-containing high-temperature solders such as $Pb_{97.5}Ag_{2.5}$ (melting point 304° C.), $Pb_{94.5}Ag_{5.5}$ (melting point 304–365° C.) and $Pb_{97.5}Ag_{1.5}Sn_{1.0}$ (melting point 309° C.); zinc (Zn)-containing high-temperature solders such as $Zn_{95}Al_5$ (melting point 380° C.); tin-lead-containing standard solders such as $Sn_5Pb_{95}$ (melting point 300–314° C.) and $Sn_2Pb_{98}$ (melting point 316–322° C.); and brazing materials such as $Au_{88}Ga_{12}$ (melting point 381° C.) (all of the above parenthesized values show atomic %).

When three members of the substrate, the supporting member and the frame are bonded, these three members may be bonded at the same time, or one of the substrate and the supporting member may be bonded to the frame at a first stage and then the other of the substrate and the supporting member may be bonded to the frame at a second stage. When bonding of the three members or bonding at the second stage is carried out in a high-vacuum atmosphere, a space surrounded by the substrate, the supporting member, the frame and the adhesive layer comes to be a vacuum space upon bonding. Otherwise, after the three members are bonded, the space surrounded by the substrate, the supporting member and the frame may be vacuumed to obtain a vacuum space. When the vacuuming is carried out after the bonding, the pressure in an atmosphere during the bonding may be any one of atmospheric pressure and reduced pressure, and the gas constituting the atmosphere may be ambient atmosphere or an inert gas containing nitrogen gas or a gas (for example, Ar gas) coming under the group O of the periodic table.

When the vacuuming is carried out after the bonding, the vacuuming can be carried out through a tip tube pre-connected to the substrate and/or the supporting member. Typically, the tip tube is formed of a glass tube and is bonded to a circumference of a through-hole formed in an ineffective field of the substrate and/or the supporting member (i.e., a field other than the effective field which works as a display portion) with a frit glass or the above low-melting-point metal material. After the space reaches a predetermined vacuum degree, the tip tube is sealed by thermal fusion. It is preferred to heat and then temperature-decrease the cold cathode field emission display as a whole before the sealing, since residual gas can be released into the space, and the residual gas can be removed out of the space by vacuuming.

The supporting member for constituting the cathode electrode may be any supporting member so long as it has a surface constituted of an insulating member. The supporting member includes a glass substrate, a glass substrate having an insulating film formed on its surface, a quartz substrate, a quartz substrate having an insulating film formed on its surface and a semiconductor substrate having an insulating film formed on its surface. From the viewpoint that the production cost is decreased, it is preferred to use a glass substrate or a glass substrate having an insulating film formed on its surface. Examples of the glass substrate include high-distortion glass, soda glass ($Na_2O \cdot CaO \cdot SiO_2$), borosilicate glass ($Na_2O \cdot B_2O_3 \cdot SiO_2$), forsterite ($2MgO \cdot SiO_2$) and lead glass ($Na_2O \cdot PbO \cdot SiO_2$). The substrate for constituting the anode panel can have the same constitution as that of the above supporting member. In the electron emitting apparatus of the present invention, it is required to form the electrically conductive layer on the supporting member. Such a supporting member can be selected from the insulating materials or the same supporting members that are used for constituting the above cathode panel.

In the electron emitting apparatus according to any one of the first, second-A and third-A aspects of the present invention, in the cold cathode field emission device and the manufacturing method thereof according to any one of the first, second-A, third-A, fourth, fifth-A and sixth-A aspects of the present invention, in the cold cathode field emission display and the manufacturing method thereof according to any one of the first, second-A, third-A, fourth, fifth-A and sixth-A aspects of the present invention, or in the manufacturing method of a cold cathode field emission device or in a cold cathode field emission display according to any one of the seventh, eighth-A and ninth-A aspects of the present invention, it is preferred to constitute the electrically conductive layer or the cathode electrode from copper (Cu), silver (Ag) or gold (Au), from the viewpoint that the resistance of the electrically conductive layer or the cathode electrode is decreased and that the carbon-group-material layer is reliably formed from a hydrocarbon gas without forming the selective-growth region.

When the selective-growth region is provided or the carbon-group-material layer is constituted of carbon-nano tube structure, the material for constituting an electrically conductive layer and a cathode electrode can be selected from metals such as tungsten (W), niobium (Nb), tantalum (Ta), titanium (Ti), molybdenum (Mo), chromium (Cr), aluminum (Al), copper (Cu), gold (Au), silver (Ag) and the like; alloys and compounds containing these metal elements (for example, nitrides such as TiN and suicides such as $WSi_2$, $MoSi_2$, $TiSi_2$ and $TaSi_2$); semiconductors such as silicon (Si); carbon thin film such as diamond; and indium-tin oxide (ITO). Although not specially limited, the thickness of the cathode electrode is approximately 0.05 to 0.5 $\mu m$, preferably 0.1 to 0.3 $\mu m$.

The material for constituting the gate electrode includes at least one metal selected from the group consisting of tungsten (W), niobium (Nb), tantalum (Ta), titanium (Ti), molybdenum (Mo), chromium (Cr), aluminum (Al), copper (Cu), gold (Au), silver (Ag), nickel (Ni), cobalt (Co), zirconium (Zr), iron (Fe), platinum (Pt) and zinc (Zn); alloys or compounds containing these metal elements (for example, nitrides such as TiN and silicides such as $WSi_2$, $MoSi_2$, $TiSi_2$ and $TaSi_2$); semiconductors such as silicon (Si); and electrically conductive metal oxides such as ITO (indium-tin oxide), indium oxide and zinc oxide.

The method for forming the cathode electrode and the gate electrode includes a combination of deposition methods such as an electron beam deposition method, a hot filament deposition method, a sputtering method, a CVD method or an ion plating method with an etching method; a screen-printing method; a plating method; and a lift-off method. When a screen-printing method or a plating method is employed, the cathode electrodes and the gate electrodes in the form of stripes can be directly formed.

As a material for constituting an insulating layer and a second insulating layer, $SiO_2$-containing material such as $SiO_2$, BPSG, PSG, BSG, AsSG, PbSG, SiON and spin on glass (SOG), low melting-point glass and a glass paste, SiN, an insulating resin such as polyimide and the like can be used alone or in combination. The insulating layer and the second insulating layer can be formed by a known method such as a CVD method, an application method, a sputtering method or a screen printing method.

The material for the anode electrode can be selected depending upon the constitution of the cold cathode field emission display. When the cold cathode field emission display is a transmission type (the substrate corresponds to a display portion) and when the anode electrode and the phosphor layer are stacked on the substrate in this order, not only the substrate on which the anode electrode is formed but also the anode electrode itself are required to be transparent, and a transparent electrically conductive material such as ITO (indium-tin oxide) is used. When the cold cathode field emission display is a reflection type (the supporting member corresponds to a display portion), or when the cold cathode field emission is a transmission type but when the phosphor layer and the anode electrode are stacked on the substrate in this order (the anode electrode works as a metal back film as well), not only ITO can be used, but also the material can be selected from those materials which are discussed with regard to the cathode electrode, the gate electrode and the focus electrode, and preferably, can be selected from aluminum (Al) or chromium (Cr). When the anode electrode is constituted of aluminum (Al) or chromium (Cr), the specific thickness of the anode electrode is $3 \times 10^{-8}$ m (30 nm) to $1.5 \times 10^{-7}$ m (150 nm), preferably $5 \times 10^{-8}$ m (50 nm) to $1 \times 10^{-7}$ m (100 nm). The anode electrode can be formed by a vapor deposition method or a sputtering method.

The phosphor material for the phosphor layer can be selected from a fast-electron-excitation type phosphor material or a slow-electron-excitation type phosphor material. When the cold cathode field emission display is a monochrome display, it is not required to pattern the phosphor layer. When the cold cathode field emission display is a color display, preferably, the phosphor layers corresponding to three primary colors of red (R), green (G) and blue (B) patterned in the form of stripes or dots are alternately arranged. A black matrix may be filled in a gap between one patterned phosphor layer and another phosphor layer for improving a display screen in contrast.

Examples of the constitution of the anode electrode and the phosphor layer include (1) a constitution in which the anode electrode is formed on the substrate and the phosphor layer is formed on the anode electrode and (2) a constitution in which the phosphor layer is formed on the substrate and the anode electrode is formed on the phosphor layer. In the above constitution (1), a so-called metal back film may be formed on the phosphor layer. In the above constitution (2), the metal back layer may be formed on the anode electrode.

Further, the anode panel is preferably provided with a plurality of ribs for preventing the occurrence of a so-called optical crosstalk (color mixing) that is caused when electrons recoiling from the phosphor layer or secondary electrons emitted from the phosphor layer enter another phosphor layer, or for preventing the collision of electrons with other phosphor layer when electrons recoiling from the phosphor layer or secondary electrons emitted from the phosphor layer enter other phosphor layer over the rib.

The form of the ribs includes the form of a lattice (grilles), that is, a form in which the rib corresponding to one pixel surrounds the phosphor layer having a plan form of a nearly rectangle (or dot-shaped), and a stripe or band-like form that extends in parallel with opposite two sides of a rectangular or stripe-shaped phosphor layer. When the rib(s) have the form of a lattice, the rib may have a form in which the rib continuously or discontinuously surrounds four sides of one phosphor layer. When the rib(s) has the form of a stripe, the stripe may be continuous or discontinuous. The formed ribs may be polished to flatten the top surface of each rib.

For improving the contrast of display images, preferably, a black matrix that absorbs light from the phosphor layer is formed between one phosphor layer and another adjacent phosphor layer and between the rib and the substrate. As a material for constituting the black matrix, it is preferred to select a material that absorbs at least 99% of light from the phosphor layer. The above material includes carbon, a thin metal film (made, for example, of chromium, nickel, aluminum, molybdenum and an alloy of these), a metal oxide (for example, chromium oxide), metal nitride (for example, chromium nitride), a heat-resistant organic resin, a glass paste, and a glass paste containing a black pigment or electrically conductive particles of silver or the like. Specific examples thereof include a photosensitive polyimide resin, chromium oxide and a chromium oxide/chromium stacked film. Concerning the chromium oxide/chromium stacked film, the chromium film is to be in contact with the substrate.

The electron emitting apparatus of the present invention can be not only applied to the electron emitting portion of a cold cathode field emission device but also incorporated into various electron beam sources typified by an electron beam source in an electron gun incorporated into a cathode ray tube, and a fluorescence display tube.

In the electron emitting apparatus according to any one of the first to third aspects of the present invention, in the cold cathode field emission device according to any one of the first to third aspects of the present invention, or in the cold cathode field emission display according to any one of the first to third aspects of the present invention, it is sufficient to bring the carbon-group-material layer in a proper electric field (for example, an electric field having an intensity of about $10^7$ volt/m) for allowing the carbon-group-material layer to emit electrons. In the cold cathode field emission device or in the cold cathode field emission display according to any one of the fourth to sixth aspects of the present invention, electrons are emitted from the electron emitting portion comprising the carbon-group-material layer on the basis of an electric field (for example, an electric field having an intensity of about $10^7$ volt/m) caused by applying voltages to the cathode electrode and the gate electrode. And, these electrons collide with the phosphor layer to give an image.

In the present invention, the carbon-group-material layer is formed from a hydrocarbon gas and a fluorine-containing hydrocarbon gas, or the fluoride-carbide-containing thin film is formed on the surface of the carbon-group-material layer, or the surface of the carbon-group-material layer is terminated (modified) with fluorine atoms. Therefore, the electron emitting portion exhibits a kind of water repellency, and the adherence or adsorption of a gas or gaseous substance released from various members constituting the cathode electrode or the cold cathode field emission display, particularly, water to/on the electron emitting portion (specifically, the carbon-group-material layer) can be inhibited. As a result, the deterioration of properties of the electron emitting portion can be prevented. Further, since the electron emitting portion comprises the carbon-group-material layer, there can be obtained a cold cathode field emission device having high electron emission efficiency.

In the present invention, further, when the electron emitting portion comprising the carbon-group-material layer is formed on the selective-growth region, a kind of catalytic reaction on the surface of the selective-growth region can be counted on. As a result, nucleation at an initial growth stage of the carbon-group-material layer smoothly proceeds, and the nucleation promotes the growth of the carbon-group-material layer that follows, so that the electron emitting portion comprising the carbon-group-material layer can be formed on the predetermined portion of the electrically conductive layer or the cathode electrode. Further, it is not required to carry out the patterning of the carbon-group-material layer for bringing the carbon-group-material layer into a predetermined form. Furthermore, when the electron emitting portion comprising the carbon-group-material layer is formed on that portion of the cathode electrode which is positioned in the bottom portion of the opening portion and is constituted of a material having a function as a kind of catalyst, it is not required to carry out the patterning of the carbon-group-material layer for bringing the carbon-group-material layer into a predetermined form. Moreover, when the electron emitting portion is constituted of the carbon-nano-tube structures, the electron emitting portion can be easily formed.

BRIEF DESCRIPTION OF THE DRAWINGS

FIG. 5 is a schematic partial cross-sectional view of an electron emitting apparatus of Example 2.

FIGS. 6A and 6B are schematic partial cross-sectional views of a supporting member, etc., for explaining the manufacturing method of an electron emitting apparatus of Example 4.

FIG. 7 is a schematic partial end view of a cold cathode field emission display of Example 5.

FIG. 9 is a schematic partial end view of a cold cathode field emission display of Example 8.

FIG. 10C, are schematic partial end views of the supporting member, etc., for explaining the manufacturing method of the cold cathode field emission device of Example 8.

FIG. 14B, is a schematic partial end view of the supporting member, etc., for explaining the cold cathode field emission device of Example 17.

FIG. 17B, are schematic partial end views of a supporting member, etc., for explaining the cold cathode field emission device of Example 19 or 20.

BEST MODE FOR CARRYING OUT THE INVENTION

The present invention will be explained on the basis of Examples with reference to drawings.

EXAMPLE 1

Example 1 is concerned with the electron emitting apparatus according to the first aspect of the present invention and the manufacturing method thereof, the cold cathode field emission device (to be called "field emission device" for short hereinafter) according to the first aspect of the present invention, the cold cathode field emission display (to be called "display" for short hereinafter) according to the first aspect, the manufacturing method of a field emission device according to the first aspect (more specifically, first (1) aspect), and the manufacturing method of a display according to the first aspect (more specifically, first (1) aspect). Incidentally, displays in Examples 1 to 4 are so-called "two-electrodes" type displays.

Figure 1:
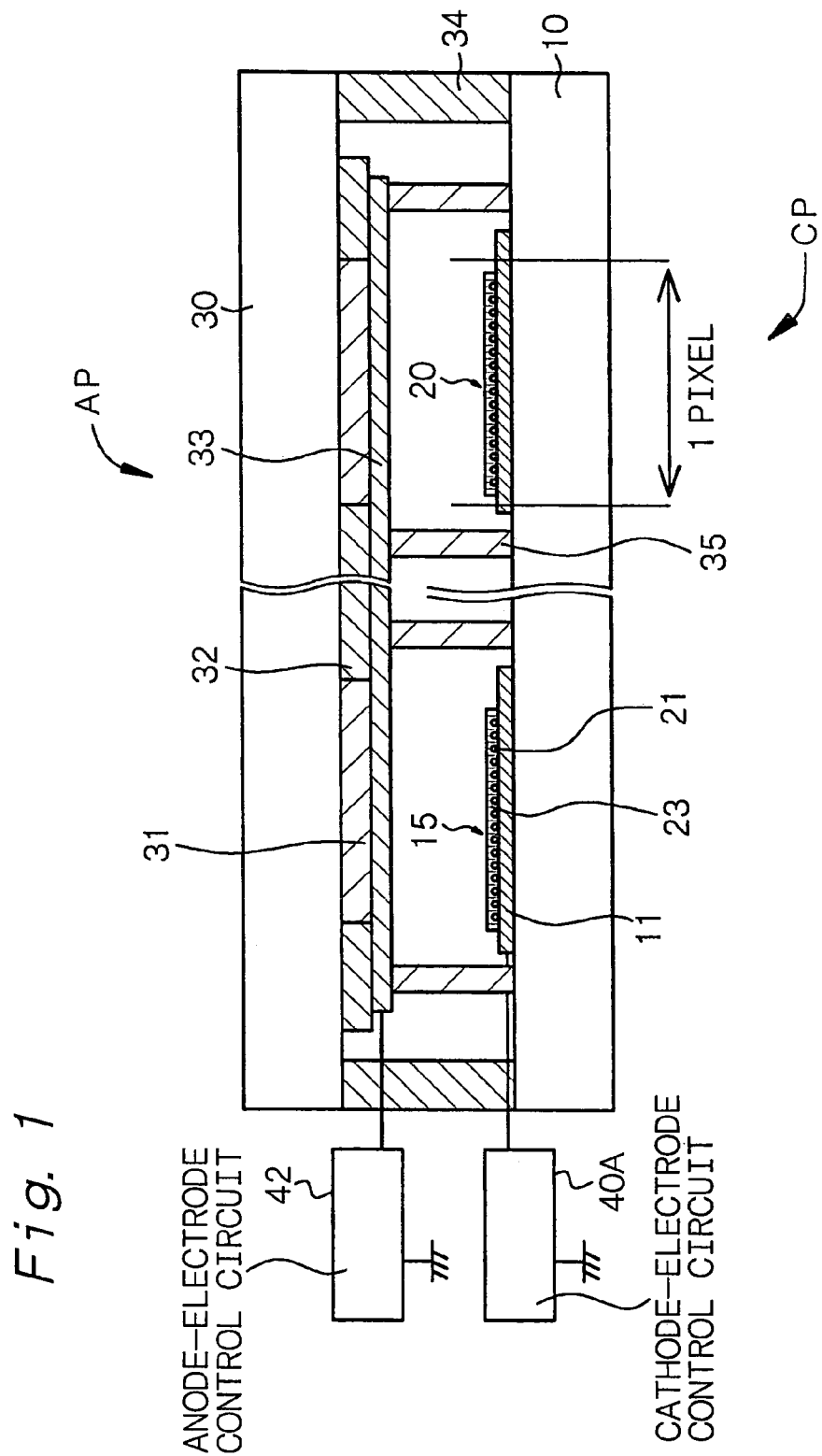
FIG. 1 is a schematic partial cross-sectional view of a cold cathode field emission display of Example 1.
Figure 2:
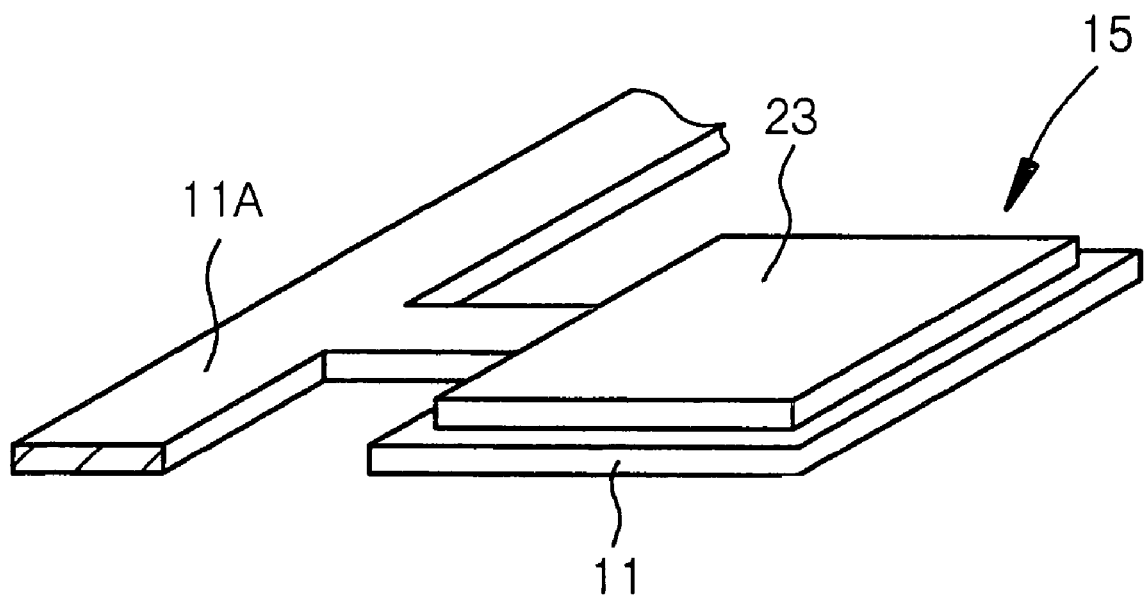
FIG. 2 is a schematic perspective view of one electron emitting region in the cold cathode field emission display of Example 1.
Figure 3A:
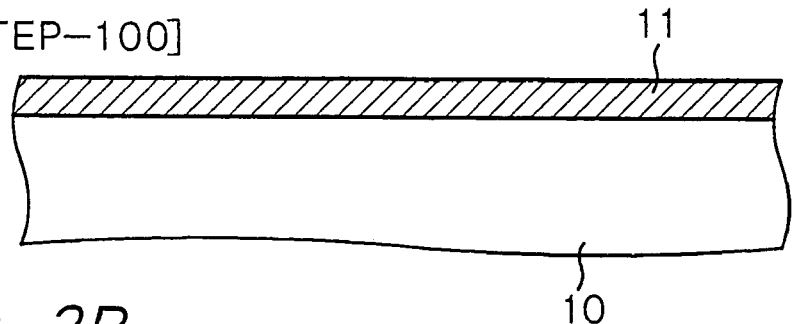
FIGS. 3A to 3D are schematic partial cross-sectional views of a supporting member, etc., for explaining the manufacturing method of an electron emitting apparatus of Example 1.
Figure 3B:
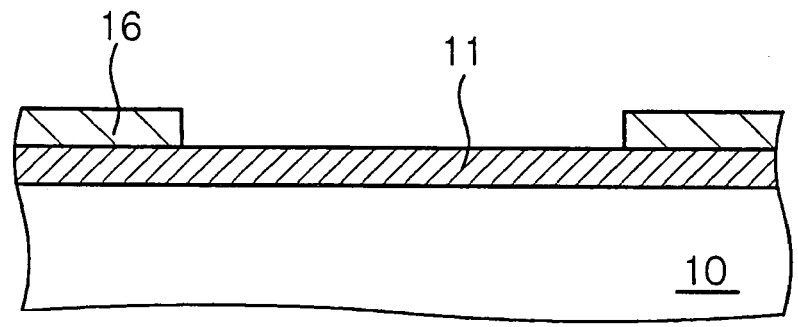
Figure 3C:
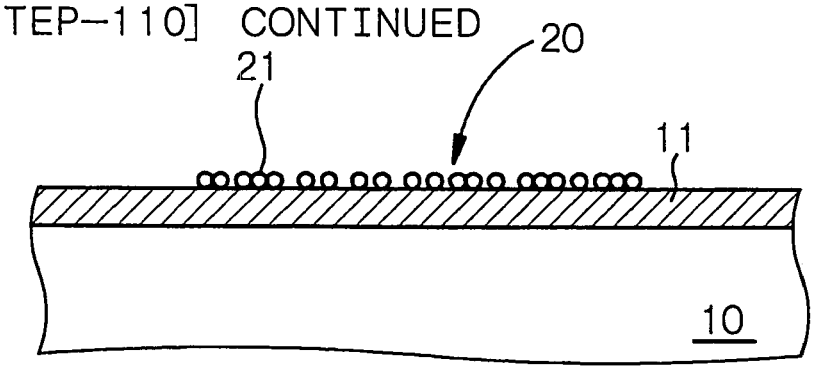
Figure 3D:
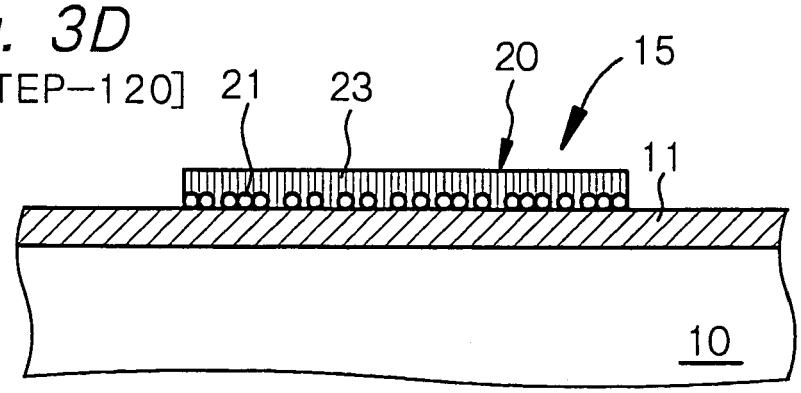
Figure 4A:
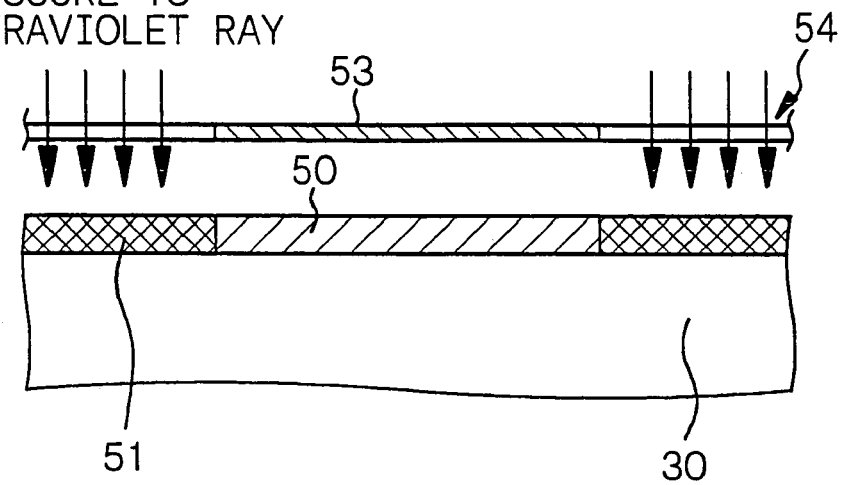
FIGS. 4A to 4D are schematic partial cross-sectional views of a substrate, etc., for explaining the manufacturing method of an anode panel in the cold cathode field emission display of Example 1.
Figure 4B:
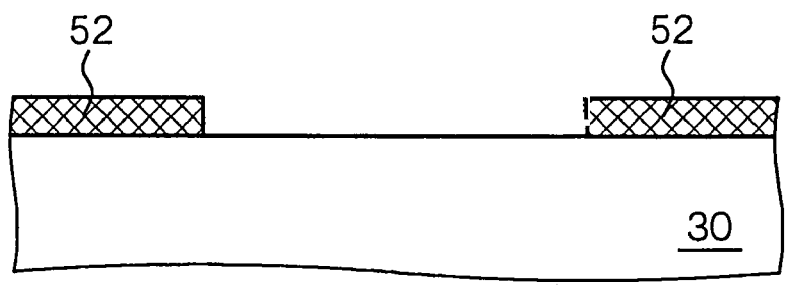
Figure 4C:
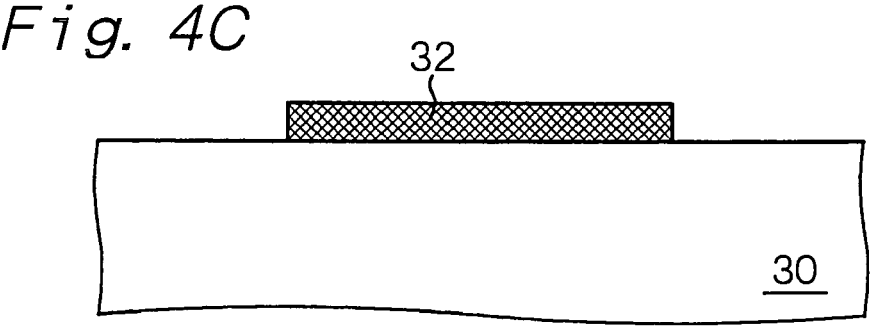
Figure 4D:
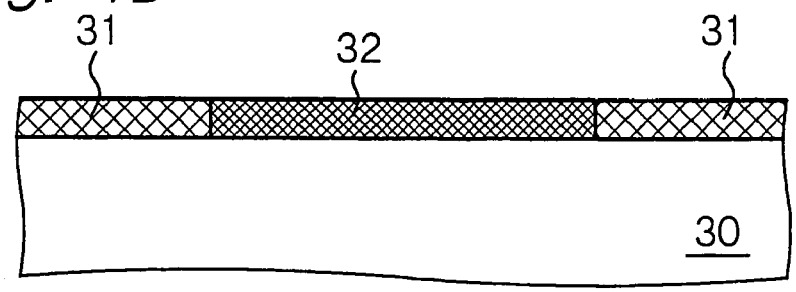

FIG. 1 shows a schematic partial cross-sectional view of the display of Example 1, FIG. 2 shows a schematic perspective view of one field emission device or one electron emitting apparatus, and FIG. 3D shows a schematic partial cross-sectional view of one field emission device or one electron emitting apparatus.

The electron emitting apparatus or field emission device in Example 1 comprises a cathode electrode (electrically conductive layer) 11 having a selective-growth region 20 formed on its surface, and an electron emitting portion 15 comprising a carbon-group-material layer 23 formed on the selective-growth region 20. The selective-growth region 20 is constituted of metal particles 21 adhering to the surface of the cathode electrode (electrically conductive layer) 11. Further, the carbon-group-material layer 23 is a layer formed from a hydrocarbon gas (specifically, $CH_4$) and a fluorine-containing hydrocarbon gas (specifically, $CF_4$).

The display of Example 1 has a cathode panel CP having an effective field where a large number of the above electron emitting apparatus or the field emission devices are formed in the form of a two-dimensional matrix and an anode panel AP, and the display has a plurality of pixels. The cathode panel CP and the anode panel AP are bonded to each other through a frame 34 in their circumferential portions. Further, the cathode panel CP has a vacuuming through-hole (not shown) in its ineffective field, and a tip tube (not shown) which is to be sealed after vacuuming is connected to the through-hole. The frame 34 is made of ceramic or glass and has a height, for example, of 1.0 mm. In some cases, an adhesive layer alone may be used in place of the frame 34.

The anode panel AP comprises a substrate 30, a phosphor layer 31 formed on the substrate 30 and formed in a predetermined pattern and an anode electrode 33 composed, for example, of one sheet-shaped aluminum thin film covering the entire surface of the effective field. A black matrix 32 is formed on the substrate 30 between one phosphor layer 31 and another phosphor layer 31. The black matrix 32 may be omitted. When it is intended to produce a monochrome display, the phosphor layer 31 is not required to be in a predetermined pattern. Further, an anode electrode composed of a transparent electrically conductive film of ITO or the like may be formed between the substrate 30 and the phosphor layer 31. Otherwise, the anode panel AP may be constituted of the anode electrode 33 composed of a transparent electrically conductive film provided on the substrate 30, the phosphor layer 31 and the black matrix 32 both formed on the anode electrode 32, and a light reflection electrically conductive film which is composed of aluminum, is formed on the phosphor layer 31 and the black matrix 32 and is electrically connected to the anode electrode 33.

Each pixel is constituted of the cathode electrode 11 having a rectangular form, the electron emitting portion 15 formed thereon and the phosphor layer 31 arranged in the effective field of the anode panel AP so as to face the electron emitting apparatus or the field emission device. In the effective field, such pixels are arranged on the order, for example, of hundreds of thousands to several millions.

Further, spacers 35 as auxiliary means are disposed between the cathode panel CP and the anode panel AP for maintaining a constant distance between these two panels, and the spacers 35 are disposed in regular intervals in the effective field. The form of the spacers 35 is not limited to a columnar form, and the spacers 35 may have a spherical form or may be ribs in the form of a stripe. It is not required to arrange the spacers 35 in four corners of each overlap region of the anode electrode and the cathode electrode. The spacers 35 may be more sparsely arranged, or the arrangement thereof may be irregular.

In the display, the voltage to be applied to the cathode electrode 11 is controlled in the unit of one pixel. When viewed as a plan view, the cathode electrode 11 has a nearly rectangular form as is schematically shown in FIG. 2, and each cathode electrode 11 is connected to a cathode-electrode control circuit 40A through a wiring 11A and a switching element (not shown) formed, for example, of a TFT or a transistor. Further, the anode electrode 33 is connected to an anode-electrode control circuit 42. When a voltage higher than a threshold voltage is applied to each cathode electrode 11, electrons are emitted from the electron emitting portion 15 on the basis of a quantum tunnel effect due to an electric field generated by the anode electrode 33, and the electrons are attracted toward the anode electrode 33 and collide with the phosphor layer 31. The brightness is controlled on the basis of a voltage applied to the cathode electrode 11.

The manufacturing method of the electron emitting apparatus, the field emission device and the display in Example 1 will be explained with reference to FIGS. 3A to 3D and FIGS. 4A to 4D hereinafter. Example 1 used nickel (Ni) as a material for constituting the selective-growth region 20. For simplification of drawings, FIGS. 3A to 3D shows one electron emitting portion (electron emitting apparatus) or a constituent thereof alone on the cathode electrode (electrically conductive layer) 11.

[Step-100]

First, an electrically conductive material layer for a cathode electrode is formed on the supporting member 10 made, for example, of a glass substrate. Then, the electrically conductive material layer is patterned by known lithography and a reactive ion etching method (RIE method), to form the rectangular cathode electrode (electrically conductive layer) 11 on the supporting member 10 (see FIG. 3A). At the same time, a wiring 11A (see FIG. 2) connected to the cathode electrode (electrically conductive layer) 11 is formed on the supporting member 10. The electrically conductive material layer is composed, for example, of an approximately 0.2 $\mu$m thick aluminum (Al) layer formed by a sputtering method.

[Step-110]

Then, the selective-growth region 20 is formed on the surface of the cathode electrode (electrically conductive layer) 11. Specifically, a resist material layer is first formed on the entire surface by a spin coating method, and then a mask layer 16 composed of the mask material layer is formed by lithography so as to expose a surface of a portion of the cathode electrode (electrically conductive layer) 11 in which portion the selective-growth region 20 is to be formed, that is, a surface of the cathode electrode portion (see FIG. 3B). Then, metal particles are allowed to adhere onto the mask layer 16 and the exposed surface of the cathode electrode (electrically conductive layer) 11. Specifically, a dispersion prepared by dispersing nickel (Ni) fine particles in a polysiloxane solution (using isopropyl alcohol as a solvent) is applied to the entire surface by a spin coating method, to form a layer composed of the solvent and the metal particles on the cathode electrode portion. Then, the mask layer 16 is removed, and the solvent is removed by heating the above layer up to approximately 400° C., to retain the metal particles 21 on the exposed surface of the cathode electrode (electrically conductive layer) 11, whereby the selective-growth region 20 can be obtained (see FIG. 3C). The polysiloxane works to fix the metal particles 21 to the exposed surface of the cathode electrode (electrically conductive layer) 11 (so-called adhesive function).

[Step-120]

Then, the electron emitting portion 15 comprising the carbon-group-material layer 23 is formed on the cathode electrode (electrically conductive layer) 11 from a hydrocarbon gas and a fluorine-containing hydrocarbon gas. In Example 1, specifically, a carbon-group-material layer 23 having a thickness of approximately 0.2 $\mu$m is formed on the selective-growth region 20 from a hydrocarbon gas and a fluorine-containing hydrocarbon gas, to obtain the electron emitting portion 15. FIG. 3D shows the thus-formed state. The following Table 1 shows a forming condition of the carbon-group-material layer 23 on the basis of a microwave plasma CVD method. Under the forming condition of a conventional carbon-group-material layer, a forming temperature of approximately 900° C. is required. In Example 1, the forming temperature of 500° C. was sufficient for stable formation. The carbon-group-material layer does not grow on the cathode electrode (electrically conductive layer) 11 made of aluminum and the wiring 11A made of aluminum.

TABLE 1

| [Forming condition of carbon-group-material layer] | |
| --- | --- |
| Gas used | $CH_4/H_2/CF_4$ = 100/10/10 SCCM |
| Pressure | 1.3 × 10³ Pa |
| Microwave power | 500 W (13.56 MHz) |
| Forming temperature | 500° C. |

Under the forming condition of the carbon-group-material layer shown in Table 1, microscopically, a relatively porous carbon nano-tube is formed, and at the same time, a fluoride-carbide-containing substance ($CF_x$) is taken into the carbon nano-tube. Macroscopically, the carbon-group-material layer 23 is formed, and the carbon-group-material layer 23 as a whole exhibits a kind of water repellency.

[Step-130]

Then, a display is assembled. Specifically, the anode panel AP and the cathode panel CP are arranged such that the phosphor layer 31 and the electron emitting apparatus (or field emission device) face each other, and the anode panel AP and the cathode panel CP (more specifically, the substrate 30 and the supporting member 10) are bonded to each other in their circumferential portions through the frame 34. In the bonding, a frit glass is applied to bonding portions of the frame 34 and the anode panel AP and bonding portions of the frame 34 and the cathode panel CP. Then, the anode panel AP, the cathode panel CP and the frame 34 are attached. The frit glass is pre-calcined or pre-sintered to be dried, and then fully calcined or sintered at approximately 450° C. for 10 to 30 minutes. Then, a space surrounded by the anode panel AP, the cathode panel CP, the frame 34 and the frit glass is vacuumed through a through-hole (not shown) and a tip tube (not shown), and when the space comes to have a pressure of approximately $10^{-4}$ Pa, the tip tube is sealed by thermal fusion. In the above manner, the space surrounded by the anode panel AP, the cathode panel CP and the frame 34 can be vacuumed. Then, wiring to external circuits is carried out to complete the display.

One example of method of preparing the anode panel AP in the display shown in FIG. 1 will be explained with reference to FIGS. 4A to 4D. First, a light-emitting crystal particle composition is prepared. For this purpose, for example, a dispersing agent is dispersed in pure water, and the mixture is stirred with a homo-mixer at 3000 rpm for 1 minute. Then, the light-emitting crystal particles are poured into the dispersion of the dispersing agent and pure water, and the mixture is stirred with a homo-mixer at 5000 rpm for 5 minutes. Then, for example, polyvinyl alcohol and ammonium bichromate are added, and the resultant mixture is fully stirred and filtered.

In the preparation of the anode panel AP, a photosensitive coating 50 is formed (applied) on the entire surface of a substrate 30 made, for example, of glass. Then, the photosensitive coating 50 formed on the substrate 30 is exposed to ultraviolet ray which is radiated from a light source (not shown) and passes through openings 54 formed in a mask 53, to form a light-exposed region 51 (see FIG. 4A). Then, the photosensitive coating 50 is selectively removed by development, to retain a remaining photosensitive coating portion (exposed and developed photosensitive coating) 52 on the substrate 30 (see FIG. 4B). Then, a carbon agent (carbon slurry) is applied to the entire surface, dried and calcined or sintered, and then, the remaining photosensitive coating portion 52 and the carbon agent thereon are removed by a lift-off method, whereby a black matrix 32 composed of the carbon agent is formed on the exposed substrate 30, and at the same time, the remaining photosensitive coating portion 52 is removed (see FIG. 4C). Then, phosphor layers 31 of red, green and blue are formed on the exposed substrate 30 (see FIG. 4D). Specifically, the light-emitting crystal particle compositions prepared from the light-emitting crystal particles (phosphor particles) are used. For example, a red photosensitive light-emitting crystal particle composition (phosphor slurry) is applied to the entire surface, followed by exposure to ultraviolet ray and development. Then, a green photosensitive light-emitting crystal particle composition (phosphor slurry) is applied to the entire surface, followed by exposure to ultraviolet ray and development. Further, a blue photosensitive light-emitting crystal particle composition (phosphor slurry) is applied to the entire surface, followed by exposure to ultraviolet ray and development. Then, the anode electrode 33 composed of an approximately 0.07 $\mu$m thick aluminum thin film is formed on the phosphor layers 31 and the black matrix 32 by a sputtering method. Alternatively, each phosphor layer 31 can be also formed by a screen-printing method or the like.

In the display having the above constitution, the electron emitting portion of each electron emitting apparatus comprises the flat carbon-group-material layer 23 having a low work function, and the fabrication thereof does not require such complicated and advanced fabrication techniques as have been required concerning the conventional Spindt type field emission device. Moreover, the etching of the carbon-group-material layer 23 is no longer required. When the area of the effective field of a display increases and when the number of electron emitting portions to be formed increases accordingly to a great extent, the electron emission efficiency of the electron emitting portions can be rendered uniform throughout the entire region of the effective field, and there can be realized a display which is remarkably free of non-uniformity in brightness and has high image quality.

The pressure inside the display was adjusted to $1\times10^{-5}$ Pa (mainly, nitrogen gas was present), the $H_2O$ partial pressure was set at $1\times10^{-6}$ Pa, and the display was measured for electron emission properties. In addition, a display was manufactured by forming a carbon-group-material layer without using $CF_4$ under the forming condition of the carbon-group-material layer shown in Table 1, and the display was used as Comparative Example. As a result, the deterioration of properties of the electron emitting portion of the display of Example 1 was remarkably small as compared with the counterpart of the display of Comparative Example.

EXAMPLE 2

Example 2 is concerned with the electron emitting apparatus according to the second aspect (more specifically, second-A aspect) of the present invention and the manufacturing method thereof, the field emission device according to the second aspect (more specifically, second-A aspect), the manufacturing method of a field emission device according to the second aspect (more specifically, second-A and second-A(1) aspects), the display according to the second aspect (more specifically, second-A aspect), and the manufacturing method of a display according to the second aspect (more specifically, second-A and second-A(1) aspects).

Since the display of Example 2 can have the same structure as that of the display of Example 1, the detailed explanation thereof is omitted. FIG. 5 shows a schematic partial cross-sectional view of one electron emitting apparatus or field emission device. The schematic partial cross-sectional view of the display of Example 2 and the schematic perspective view of one field emission device or one electron emitting portion are as shown in FIGS. 1 and 2.

The electron emitting apparatus or field emission device in Example 2 also comprises a cathode electrode (electrically conductive layer) 11 having a selective-growth region 20 formed on its surface, and an electron emitting portion 15 formed on the selective-growth region 20. The selective-growth region 20 is constituted of metal particles 21 adhering to the surface of the cathode electrode (electrically conductive layer) 11. Further, the electron emitting portion comprises a carbon-group-material layer 23 and a fluoridecarbide-containing thin film ($CF_x$ thin film) 24 formed on the surface of the carbon-group-material layer. The carbon-group-material layer 23 is formed from a hydrocarbon gas (specifically, $CH_4$), and the fluoride-carbide-containing thin film 24 is formed from a fluorine-containing hydrocarbon gas (specifically, $CH_2F_2$).

The manufacturing method of the electron emitting apparatus, the field emission device and the display in Example 2 will be explained below. Example 2 used zinc (Zn) as a material for constituting the selective-growth region 20.

[Step-200]
A cathode electrode (electrically conductive layer) 11 made of aluminum (Al) and a wiring 11A made of aluminum (Al) are formed on a supporting member 10 made, for example, of a glass substrate in the same manner as in [Step-100] of Example 1

[Step-210]
Then, a selective-growth region 20 is formed on the surface of the cathode electrode (electrically conductive layer) 11 in the same manner as in [Step-110] of Example 1. However, Example 2 used a solution of fine zinc (Zn) particles dispersed in a polysiloxane solution (using isopropyl alcohol as a solvent).

[Step-220]
Then, the carbon-group-material layer is formed on the cathode electrode (electrically conductive layer) 11 from a hydrocarbon gas. In Example 2, specifically, a carbon-group-material layer 23 having a thickness of approximately 0.2 μm is formed on the selective-growth region 20 from a hydrocarbon gas. Table 2 shows a forming condition of the carbon-group-material layer 23 based on a microwave plasma CVD method. Under the forming condition of a conventional carbon-group-material layer, a forming temperature of approximately 900° C. is required. In Example 2, the forming temperature of 500° C. was sufficient for stable formation. The carbon-group-material layer does not grow on the cathode electrode (electrically conductive layer) 11 made of aluminum and the wiring 11A made of aluminum.

TABLE 2

[Forming condition of carbon-group-material layer]

| | |
|---|---|
| Gas used | $CH_4/H_2$ = 100/10 SCCM |
| Pressure | $1.3 \times 10^3$ Pa |
| Microwave power | 500 W (13.56 MHz) |
| Forming temperature | 400° C. |

[Step-230]
Then, a fluoride-carbide-containing thin film ($CF_x$ thin film) 24 is formed on the surface of the carbon-group-material layer 23 from a fluorine-containing hydrocarbon gas, thereby to obtain an electron emitting portion 15 comprising the carbon-group-material layer 23 and the fluoride-carbide-containing thin film 24 formed on the surface of the carbon-group-material layer 23. The following Table 3 shows a forming condition of the fluoride-carbide-containing thin film ($CF_x$ thin film) 24 based on a microwave plasma CVD method.

TABLE 3

[Forming condition of fluoride-carbide-containing thin film]

| | |
|---|---|
| Gas used | $CH_2F_2$ = 100 SCCM |
| Pressure | $1.3 \times 10^3$ Pa |

TABLE 3-continued

[Forming condition of fluoride-carbide-containing thin film]

| | |
|---|---|
| Microwave power | 500 W (13.56 MHz) |
| Forming temperature | 400° C. |

Under the forming condition of the fluoride-carbide-containing thin film ($CF_x$ thin film) 24 shown in Table 3, the fluoride-carbide-containing thin film ($CF_x$ thin film) 24 is formed on the surface of the carbon nano-tube, and the electron emitting portion 15 as a whole exhibits a kind of water repellency.

[Step-240]
Then, a display is assembled in the same manner as in [Step-130] of Example 1.

The pressure inside the display was adjusted to $1 \times 10^{-5}$ Pa (mainly, nitrogen gas was present), the $H_2O$ partial pressure was set at $1 \times 10^{-6}$ Pa, and the display was measured for electron emission properties. In addition, a display was similarly manufactured without [Step-230] and used as Comparative Example. As a result, the deterioration of properties of the electron emitting portion of the display of Example 2 was remarkably small as compared with the counterpart of the display of Comparative Example.

EXAMPLE 3

Example 3 is concerned with the electron emitting apparatus according to the third aspect (more specifically, third-A aspect) of the present invention and the manufacturing method thereof, the field emission device according to the third aspect (more specifically, third-A aspect), the manufacturing method of a field emission device according to the third aspect (more specifically, the third-A and third-A(1) aspects), the display according to the third aspect (more specifically, third-A aspect), and the manufacturing method of a display according to the third aspect (more specifically, the third-A aspect and third-A(1) aspect).

The electron emitting apparatus, the field emission device and the display in Example 3 can have the same constitutions as those in Example 1, so that the detailed explanations thereof are omitted. The schematic partial cross-sectional view of the display and the schematic perspective view and the schematic partial cross-sectional view of one field emission device or one electron emitting apparatus in Example 3 are as shown in FIG. 1, FIG. 2 and FIG. 3D.

The electron emitting apparatus or field emission device in Example 3 also comprises a cathode electrode (electrically conductive layer) 11 having a selective-growth region 20 formed on its surface, and an electron emitting portion 15 formed on the selective-growth region 20. The selective-growth region 20 is constituted of metal particles 21 adhering to the surface of the cathode electrode (electrically conductive layer) 11. The electron emitting portion comprises a carbon-group-material layer 23. The carbon-group-material layer 23 is a layer formed from a hydrocarbon gas (specifically, $CH_4$). The surface of the carbon-group-material layer 23 is terminated (modified) with fluorine atoms. That is, C—H bonds present in the surface of the carbon-group-material layer 23 are replaced with C—F bonds, and the carbon-group-material layer 23 as a whole therefore exhibits a kind of water repellency.

The manufacturing method of the electron emitting apparatus, the field emission device and the display in Example 3 will be explained below. Example 3 used aluminum (Al)

for the cathode electrode (electrically conductive layer) 11 and used a cobalt-nickel alloy as a material for constituting the selective-growth region 20.

[Step-300]

First, the cathode electrode (electrically conductive layer) 11 made of aluminum (Al) and a wiring 11A made of aluminum (Al) are formed on a supporting member 10 made, for example, of a glass substrate in the same manner as in [Step-100] in Example 1.

[Step-310]

Then, the selective-growth region 20 is formed on the surface of the cathode electrode (electrically conductive layer) 11 in the same manner as in [Step-110] in Example 1. However, Example 3 used a solution of cobalt-nickel alloy (Co—Ni alloy) fine particles dispersed in a polysiloxane solution (using isopropyl alcohol as a solvent).

[Step-320]

Then, a carbon-group-material layer is formed on the cathode electrode (electrically conductive layer) 11 from a hydrocarbon gas. In Example 3, specifically, a carbon-group-material layer 23 having a thickness of approximately 0.2 μm is formed on the selective-growth region 20 from a hydrocarbon gas. The following Table 4 shows a forming condition of the carbon-group-material layer 23 based on an ICP-CVD method. Under the forming condition of a conventional carbon-group-material layer, a forming temperature of approximately 900° C. is required. In Example 3, the forming temperature of 400° C. was sufficient for stable formation. The carbon-group-material layer does not grow on the cathode electrode (electrically conductive layer) 11 made of aluminum and the wiring 11A made of aluminum.

TABLE 4

[Forming condition of carbon-group-material layer]

| | |
|---|---|
| Gas used | $CH_4/H_2$ = 100/10 SCCM |
| Pressure | $1.3 \times 10^3$ Pa |
| Microwave power | 500 W (13.56 MHz) |
| Forming temperature | 400° C. |

[Step-330]

Then, the surface of the carbon-group-material layer 23 is terminated (modified) with a fluorine-containing hydrocarbon gas, thereby to obtain an electron emitting portion 15 comprising the carbon-group-material layer 23 whose surface is terminated (modified) with fluorine atoms. The following Table 5 shows a termination (modification) condition of the carbon-group-material layer 23 based on an ICP-CVD method.

TABLE 5

[Termination condition of surface of carbon-group-material layer]

| | |
|---|---|
| Gas used | $CF_4$ = 100 SCCM |
| Pressure | $1.3 \times 10^3$ Pa |
| ICP power | 500 W (13.56 MHz) |
| Forming temperature | 400° C. |

Under the termination (modification) condition of the carbon-group-material layer shown in Table 5, $CF_4$ gas is used unlike the forming condition of the fluoride-carbide-containing thin film (CF, thin film) 24 shown in Table 3, so that the content of the fluorine component constituting the fluorine-containing hydrocarbon gas is high and that the deposition of the fluoride-carbide-containing thin film ($CF_x$ thin film) based on the fluorine-containing hydrocarbon gas is hence difficult. The surface of the carbon nano-tube is terminated (modified) with fluorine atoms, that is, C—H bonds are replaced with C—F bonds, so that the carbon-group-material layer 23 as a whole exhibits a kind of water repellency.

[Step-340]

Then, a display is assembled in the same manner as in [Step-130] in Example 1.

The pressure inside the display was adjusted to $1 \times 10^{-5}$ Pa (mainly, nitrogen gas was present), the $H_2O$ partial pressure was set at $1 \times 10^{-6}$ Pa, and the dis was measured for electron emission properties. In addition, a display was similarly manufactured without [Step-330] and used as Comparative Example. As a result, the deterioration of properties of the electron emitting portion of the display of Example 3 was remarkably small as compared with the counterpart of the display of Comparative Example.

EXAMPLE 4

Example 4 are concerned with variants of the electron emitting apparatus, the field emission device and the display and the manufacturing methods of them, explained in Example 1. In the manufacturing method explained in Example 1, the metal particles 21 were allowed to adhere onto the cathode electrode portion. In Example 4, the step of forming a selective-growth region comprises the step of forming a metal thin film made of titanium (Ti) on the basis of a sputtering method. The manufacturing method of the electron emitting apparatus, the field emission device and the display in Example 4 will be explained below with reference to FIGS. 6A and 6B. For simplification of drawings, FIGS. 6A and 6B show one electron emitting portion (electron emitting apparatus) on a cathode electrode (electrically conductive layer) 11 or their constituting elements alone.

[Step-400]

First, a cathode electrode (electrically conductive layer) 11 is formed on a supporting member 10 made, for example, of a glass substrate in the same manner as in [Step-100] in Example 1. Then, a resist material layer is formed on the entire surface by a spin coating method, and a lithographical method is applied to form a mask layer (made of the resist material layer) where the surface of the cathode electrode portion is exposed.

[Step-410]

Then, a metal thin film 22 is formed on the mask layer including the exposed surface of the cathode electrode (electrically conductive layer) 11 by a sputtering method under a condition shown in Table 6. Then, the mask layer is removed (see FIG. 6A). In this manner, a selective-growth region 20 comprising the metal thin film 22 formed on the cathode electrode portion can be obtained.

TABLE 6

[Forming condition of metal thin film]

| | |
|---|---|
| Target | Ti |
| Process gas | Ar = 100 SCCM |
| DC power | 4 kW |
| Pressure | 0.4 Pa |
| Supporting member heating temperature | 150° C. |
| Film thickness | 30 nm |

[Step-420]

Then, a carbon-group-material layer 23 having a thickness of approximately 0.2 μm is formed on the selective-growth region 20 in the same manner as in [Step-120] in Example 1, to obtain an electron emitting portion (see FIG. 6B). Then, a display is assembled in the same manner as in [Step-130] in Example 1.

When [Step-220] and [Step-230] in Example 2 are carried out in [Step-420], the electron emitting apparatus or the display according to the second aspect of the present invention can be obtained.

Alternatively, when [Step-320] and [Step-330] in Example 3 are carried out, the electron emitting apparatus or the display according to the third aspect of the present invention can be obtained.

EXAMPLE 5

Example 5 is concerned with the electron emitting apparatus according to the first aspect of the present invention, the field emission device and the manufacturing method thereof according to the fourth aspect of the present invention, and the display and the manufacturing method thereof according to the fourth aspect of the present invention. Displays in Examples 5 to 20 are so-called "three-electrodes" type displays.

Figure 8A:
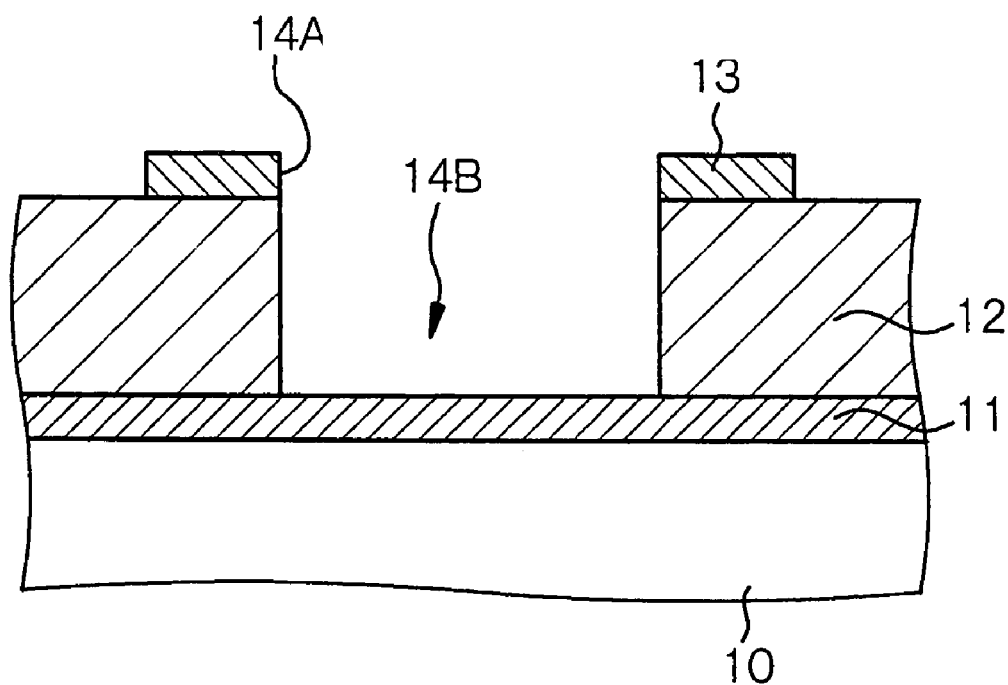
FIGS. 8A and 8B are schematic partial end views of the supporting member, etc., for explaining the manufacturing method of a cold cathode field emission device of Example 5.
Figure 8B:
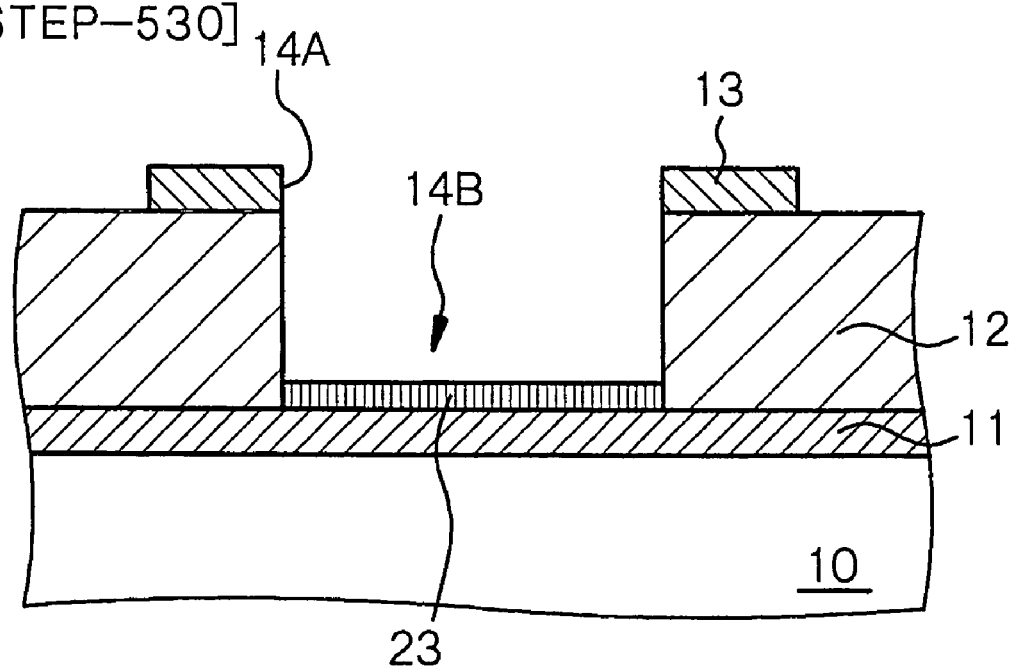
Figure 21:
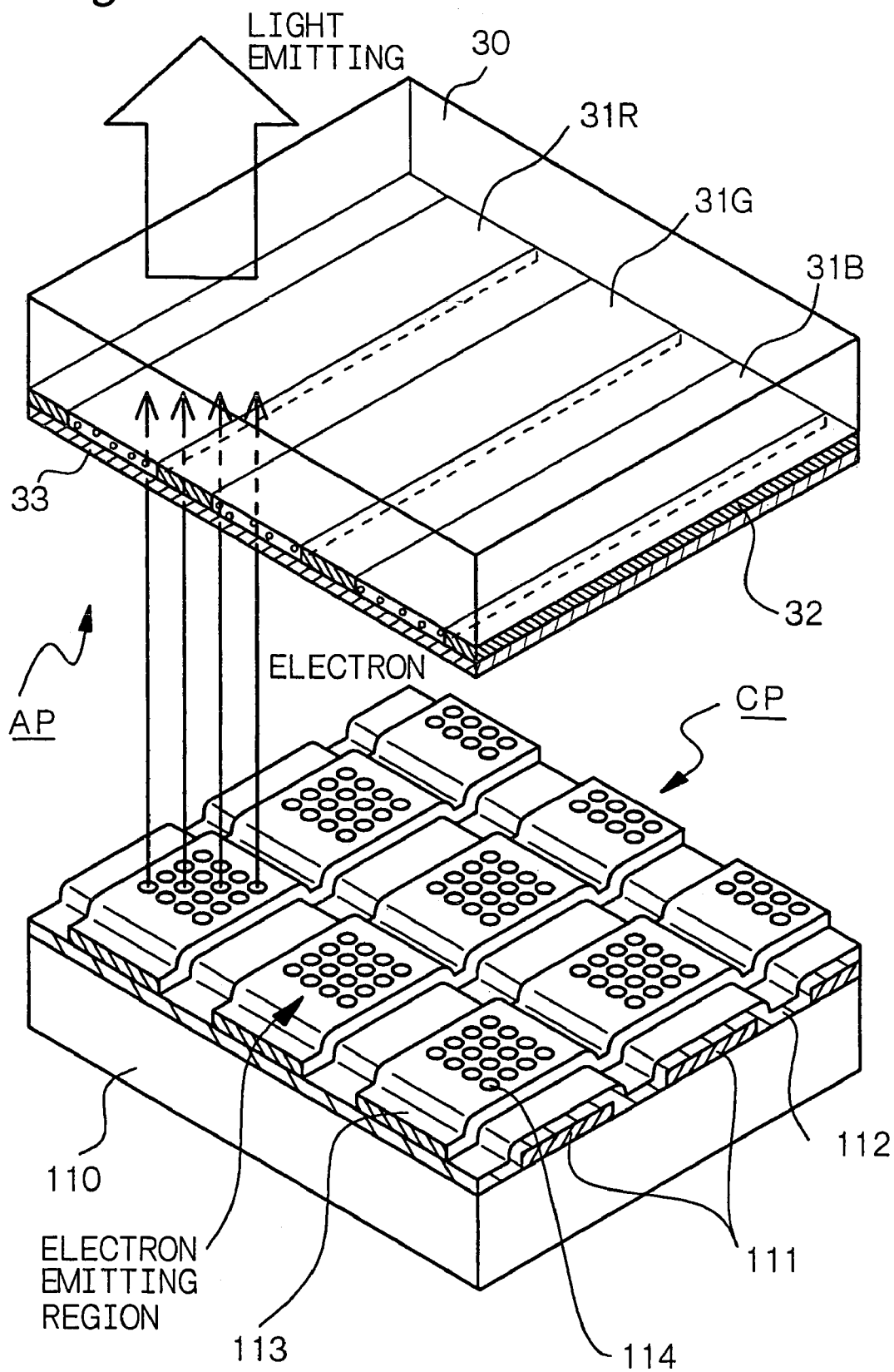
FIG. 21 is a schematic partial perspective view of a cold cathode field emission display when a cathode panel and an anode panel are separated.

FIG. 7 shows a schematic partial end view of the display of Example 5, and FIG. 8B shows a basic constitution of the field emission device or electron emitting apparatus. The schematic partial perspective view obtained when a cathode panel CP and an anode panel AP are separated is substantially as shown in FIG. 21.

The field emission device or the electron emitting apparatus of Example 5 has a cathode electrode (corresponding to an electrically conductive layer) 11 formed on a supporting member 10 and a gate electrode 13 which is formed above the cathode electrode 11 and has an opening portion (first opening portion 14A). The field emission device or the electron emitting apparatus further has an electron emitting portion 15 comprising a carbon-group-material layer 23 formed on a surface of a portion of a cathode electrode 11 which portion is positioned in a bottom portion of the first opening portion 14A. An insulating layer 12 is formed on the supporting member 10 and the cathode electrode 11, and a second opening portion 14B communicating with the first opening portion 14A formed in the gate electrode 13 is formed in the insulating layer 12. In Example 5, the cathode electrode (electrically conductive layer) 11 is composed of copper (Cu).

The display of Example 5 is also constituted of a cathode panel CP having a number of electron emitting regions, provided with the above-mentioned field emission devices and formed in an effective field in the form of a two-dimensional matrix and an anode panel AP, and the display has a plurality of pixels. The cathode panel CP and the anode panel AP are bonded to each other in their circumferential portions through a frame 34. Further, a through-hole 36 for vacuuming is formed in an ineffective field of the cathode panel CP, and a tip tube 37 which is to be sealed after vacuuming is connected to the through-hole 36. The frame 34 is made of ceramic and has a height, for example, of 1.0 mm. In some cases, an adhesive layer alone may be used in place of the frame 34.

The anode panel AP can have the same structure as that explained in Example 1, so that a detailed explanation thereof is omitted.

Each pixel is constituted of the cathode electrode 11 having the form of a stripe, the electron emitting portion 15 formed thereon and a phosphor layer 31 arranged in the effective field of the anode panel AP so as to face the field emission device. In the effective field, such pixels are arranged on the order of hundreds of thousands to several millions.

A relatively negative voltage is applied to the cathode electrode 11 from a cathode-electrode control circuit 40, a relatively positive voltage is applied to the gate electrode 13 from a gate-electrode control circuit 41, and a higher positive voltage than the voltage to the gate electrode 13 is applied to the anode electrode 33 from an anode-electrode control circuit 42. When such a display is used for displaying, for example, a scanning signal is inputted to the cathode electrode 11 from the cathode-electrode control circuit 40, and a video signal is inputted to the gate electrode 13 from the gate-electrode control circuit 41. Alternatively, it may be employed the constitution in which the video signal is inputted to the cathode electrode 11 from the cathode-electrode control circuit 40, and the scanning signal is inputted to the gate electrode 13 from the gate-electrode control circuit 41. Electrons are emitted from the electron emitting portion 15 on the basis of a quantum tunnel effect due to an electric filed generated when a voltage is applied between the cathode electrode 11 and the gate electrode 13, and the electrons are attracted toward the anode electrode 33 and collide with the phosphor layer 31. As a result, the phosphor layer 31 is excited to emit light, and a desired image can be obtained.

The manufacturing method of the electron emitting apparatus, the field emission device and the display in Example 5 will be explained below with reference to FIGS. 8A and 8B. For simplification of drawings, FIGS. 8A and 8B show one electron emitting portion in an overlapping region of a cathode electrode 11 and a gate electrode 13 or their constituting elements alone.

[Step-500]

First, an electrically conductive material layer for a cathode electrode is formed on the supporting member 10 made, for example, of a glass substrate. Then, the electrically conductive material layer is patterned by known lithography and a known RIE method, to form the cathode electrode (electrically conductive layer) 11 having the form of a stripe on the supporting member 10. The cathode electrode (electrically conductive layer) 11 in the form of a stripe extends leftward and rightward on the paper surface of the drawing. The electrically conductive material layer is composed, for example, of an approximately 0.2 μm thick copper (Cu) layer formed by a sputtering method.

[Step-510]

Then, the insulating layer 12 is formed on the supporting member 10 and the cathode electrode 11. Specifically, the insulating layer 12 having a thickness of approximately 1 μm is formed on the entire surface, for example, by a CVD method using TEOS (tetraethoxysilane) as a source gas. Table 7 shows one example of a condition of forming the insulating layer 12.

TABLE 7

| (Condition of forming insulating layer) | |
|---|---|
| TEOS flow rate | 800 SCCM |
| O$_2$ flow rate | 600 SCCM |
| Pressure | 1.1 kPa |

TABLE 7-continued (Condition of forming insulating layer)

| | |
|---|---|
| RF power | 0.7 kW (13.56 MHz) |
| Film forming temperature | 400° C. |

[step-520]

Then, the gate electrode 13 having the first opening portion 14A is formed on the insulating layer 12. Specifically, an electrically conductive material layer composed of aluminum (Al) for a gate electrode is formed on the insulating layer 12 by a sputtering method, and then a first mask material layer (not shown) patterned is formed on the electrically conductive material layer. The electrically conductive material layer is etched with using the first mask material layer as an etching mask to pattern the electrically conductive material layer in the form of a stripe, and then the first mask material layer is removed. Then, a second mask material layer (not shown) patterned is formed on the electrically conductive material layer and the insulating layer 12, and the electrically conductive material layer is etched with using the second mask material layer as an etching mask. In this manner, the gate electrode 13 having the first opening portion 14A can be formed on the insulating layer 12. The gate electrode 13 in the form of a stripe extends in a direction (for example, direction perpendicular to the paper surface of the drawing) different from the direction of the cathode electrode 11. Thereafter, the second opening portion 14B communicating with the first opening portion 14A formed in the gate electrode 13 is formed in the insulating layer 12. Specifically, the insulating layer 12 is etched by an RIE method using the second mask material layer as an etching mask, and then the second mask material layer is removed. In this manner, a structure shown in FIG. 8A can be obtained. Table 8 shows a condition of etching the insulating layer 12. In Example 5, the first opening portion 14A and the second opening portion 14B has a one-to-one correspondence relationship. That is, one second opening portion 14B is formed per first opening portion 14A. When viewed as a plan view, the first and the second opening portions 14A and 14B have the form of a circle having a diameter of 1 to 30 μm. It is sufficient to form the opening portions 14A and 14B in the quantity of approximately 1 to 3000 per pixel.

TABLE 8

(Condition of etching insulating layer)

| | |
|---|---|
| Etching apparatus | Parallel plate reactive ion etching system |
| C₄F₈ flow rate | 30 SCCM |
| CO flow rate | 70 SCCM |
| Ar flow rate | 300 SCCM |
| Pressure | 7.3 Pa |
| RF power | 1.3 kW (13.56 MHz) |
| Etching temperature | room temperature |

[Step-530]

Then, the electron emitting portion 15 comprising the carbon-group-material layer 23 is formed on the surface of a portion of the cathode electrode 11 which portion is positioned in a bottom portion of the opening portions 14A and 14B. The cathode electrode 11 is composed of a copper (Cu) which works as a kind of catalyst. Specifically, the carbon-group-material layer 23 having a thickness of approximately 0.2 μm is formed on the portion of the cathode electrode 11 to obtain the electron emitting portion 15 in the same manner as in [Step-120] in Example 1. FIG. 8B shows the thus-obtained state. A condition of forming the carbon-group-material layer 23 according to a microwave plasma CVD method may be the same condition as that shown in Table 1. Since the gate electrode 13 is formed of aluminum (Al), no carbon-group-material layer is formed on the gate electrode 13.

[Step-540]

A display is assembled in the same manner as in [Step-130] in Example 1.

In Example 5, the electron emitting portion 15 comprising the carbon-group-material layer 23 is formed on the portion of the cathode electrode 11 which portion is positioned in the bottom portion of the opening portions 14A and 14B and the cathode electrode 11 is composed of a material which works as a kind of a catalyst, so that it is no longer necessary to pattern the carbon-group-material layer 23 to bring it into a desired form.

Even when the copper (Cu) is replaced with silver (Ag) or gold (Au) to constitute the cathode electrode or the electrically conductive layer, these metals work as a kind of catalyst, and the electron emitting portion 15 comprising the carbon-group-material layer 23 can be formed on the cathode electrode 11.

EXAMPLE 6

Example 6 is a variant of Example 5. In the manufacturing method of an electron emitting apparatus, the manufacturing method of a field emission device and the manufacturing method of a display explained in Example 5, the surface of the cathode electrode 11 is naturally oxidized, so that it is sometimes difficult to form the carbon-group-material layer 23. In Example 6, the metal oxide (so-called natural oxide film) is removed from the surface of the cathode electrode portion. The metal oxide on the surface of the cathode electrode portion can be removed by plasma reduction treatment or washing.

The electron emitting apparatus, the field emission device and the display to be produced in Example 6 or Example 7 to be described later are structurally the same as those in Example 5, so that detailed explanations thereof are omitted. The manufacturing method of an electron emitting apparatus, the manufacturing method of a field emission device and the manufacturing method of a display in Example 6 will be explained below.

[Step-600]

First, in the same manner as in [Step-500] to [Step-520] in Example 5, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-610]

Then, the metal oxide (natural oxide film) on the surface of the portion of the cathode electrode 11 which portion is exposed in the bottom portion of the opening portions 14A and 14B is removed by plasma reduction treatment (microwave plasma treatment) under a condition shown in Table 9. Otherwise, the metal oxide (natural oxide film) on the exposed surface of the cathode electrode portion can be removed, for example, with a 50% hydrofluoric acid aqueous solution/pure water mixture having a 50% hydrofluoric acid aqueous solution:pure water mixing ratio of 1:49 (volume ratio).

TABLE 9

| Gas used | $H_2$ = 100 SCCM |
| --- | --- |
| Pressure | $1.3 \times 10^3$ Pa |
| Microwave power | 600 W (13.56 MHz) |
| Treating temperature | 400° C. |

[Step-620]

Then, the carbon-group-material layer 23 having a thickness of approximately 0.2 μm is formed on the portion of the cathode electrode 11 which portion is exposed in the bottom portion of the opening portions 14A and 14B, to obtain the electron emitting portion 15 in the same manner as in [Step-120] in Example 1. A condition of forming the carbon-group-material layer 23 according to a microwave plasma CVD method may be the same condition as that shown in Table 1.

[Step-630]

Then, the display is assembled in the same manner as in [Step-130] in Example 1.

In Example 6, the metal oxide (natural oxide film) on the portion of the cathode electrode 11 which portion is exposed in the bottom portion of the opening portions 14A and 14B is removed, and then the carbon-group-material layer is formed on the cathode electrode portion, so that the carbon-group-material layer having more excellent properties can be formed.

EXAMPLE 7

Example 7 is also a variant of Example 5. In Example 7, a convexo-concave shape is formed in the portion of the cathode electrode 11 which portion is exposed in the bottom portion of the opening portions 14A and 14B. Protrusions are therefore formed in the carbon-group-material layer formed thereon. As a result, a field emission device having high electron emission efficiency can be obtained. The manufacturing method of a field emission device and the manufacturing method of a display in Example 7 will be explained below.

[Step-700]

First, in the same manner as in [Step-500] to [Step-520] in Example 5, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-710]

Then, the surface of the portion of the cathode electrode 11 which portion is positioned in the bottom portion of the opening portions 14A and 14B is etched to form a convexo-concave shape. Table 10 shows a condition of the above etching.

TABLE 10

| Etching solution | 1% hydrochloric acid aqueous solution |
| --- | --- |
| Treatment time period | 5 minutes |

[Step-720]

Then, a step similar to [Step-530] in Example 5 is carried out to form an electron emitting portion 15 comprising a carbon-group-material layer 23 on the portion of the cathode electrode 11 which portion is positioned in the bottom portion of the opening portions 14A and 14B. Specifically, the carbon-group-material layer 23 having a thickness of approximately 0.2 μm is formed on the portion of the cathode electrode 11 to obtain the electron emitting portion 15 in the same manner as in [Step-120] in Example 1. A condition of forming the carbon-group-material layer 23 according to a microwave plasma CVD method may be the same condition as that shown in Table 1.

[Step-730]

Then, the display is assembled in the same manner as in [Step-130] in Example 1.

The step of forming the convexo-concave shape on the portion of the cathode electrode 11 which portion is exposed in the bottom portion of the opening portions 14A and 14B, explained in Example 7, can be applied to Example 6. Further, the removal of the metal oxide (natural oxide film) explained in Example 6 can be applied to Example 7.

When [Step-220] and [Step-230] are carried out in the step of forming the carbon-group-material layer or the electron emitting portion in Examples 5 to 7 explained above, the electron emitting apparatus according to the second aspect of the present invention, the field emission device according to the fifth-A aspect of the present invention and the display according to the fifth-A aspect of the present invention can be obtained, and it comes to mean that the manufacturing method of a field emission device according to the fifth-A aspect of the present invention and the manufacturing method of a display according to the fifth-A aspect of the present invention are carried out.

Further, when [Step-320] and [Step-330] in Example 3 are carried out in the step of forming the carbon-group-material layer or the electron emitting portion in Examples 5 to 7 explained above, the electron emitting apparatus according to the third aspect of the present invention, the field emission device according to the sixth-A aspect of the present invention and the display according to the sixth-A aspect of the present invention can be obtained, and it comes to mean that the manufacturing method of a field emission device according to the sixth-A aspect of the present invention and the manufacturing method of a display according to the sixth-A aspect of the present invention are carried out.

EXAMPLE 8

Example 8 is concerned with the electron emitting apparatus having a selective-growth region according to the first aspect of the present invention, the field emission device having a selective-growth region according to the fourth aspect of the present invention, the display having a selective-growth region according to the fourth aspect of the present invention, the manufacturing method of a field emission device according to the fourth (2) aspect of the present invention including the step of forming a selective-growth region, and the manufacturing method of a display according to the fourth (2) aspect of the present invention including the step of forming a selective-growth region.

Figure 12A:
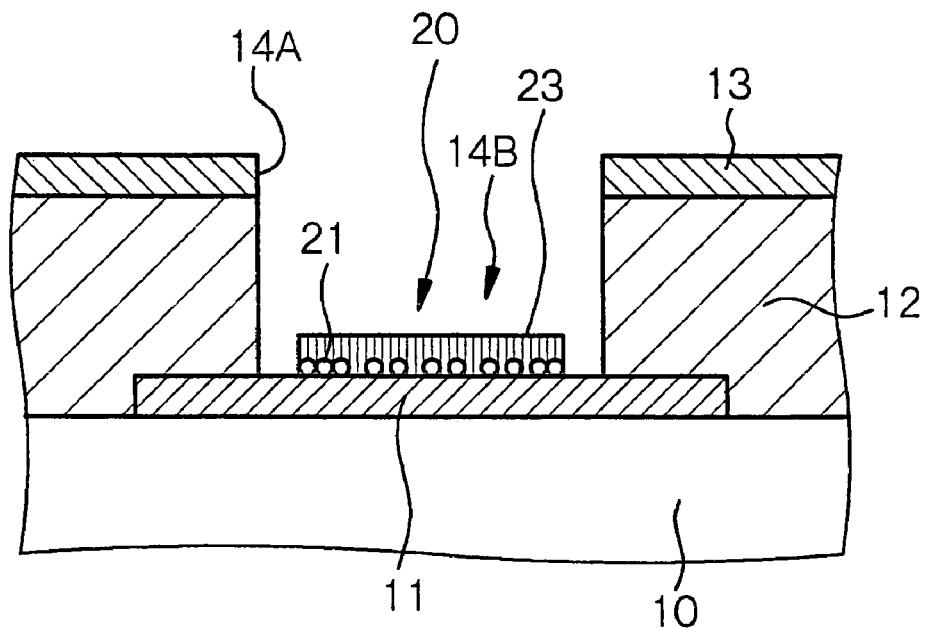
FIGS. 12A and 12B, following FIG. 11BC, are schematic partial end views of the supporting member, etc., for explaining the manufacturing method of the cold cathode field emission device of Example 8.
Figure 12B:
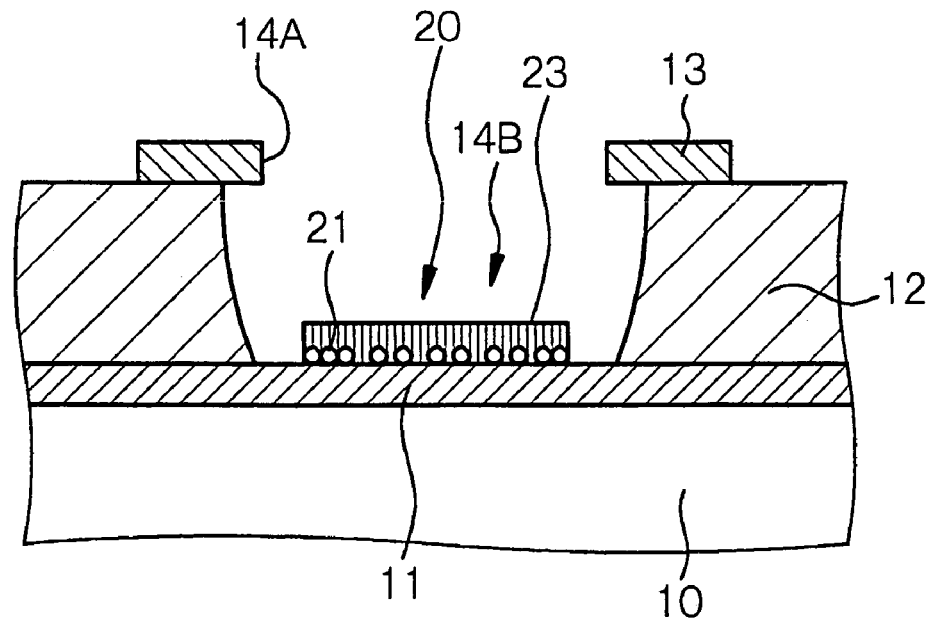

FIG. 12B shows a schematic partial end view of the field emission device or the electron emitting apparatus of Example 8. FIG. 9 shows a schematic partial end view of the display of Example 8. The field emission device or the electron emitting apparatus has a cathode electrode (corresponding to the electrically conductive layer) 11 formed on a supporting member 10 and a gate electrode 13 which is formed above the cathode electrode 11 and has a first opening portion 14A. The field emission device or the electron emitting apparatus further has a selective-growth region 20 formed on a surface of a portion of the cathode electrode 11 which portion is positioned in a bottom portion of the opening portions 14A and 14B, and an electron emitting portion comprising a carbon-group-material layer 23 formed on the selective-growth region 20. In Example 8, the selective-growth region 20 is constituted of metal particles 21 composed of nickel (Ni) adhere on the surface of the cathode electrode.

In the field emission device of Example 8, an insulating layer 12 is formed on the supporting member 10 and the cathode electrode 11, the second opening portion 14B communicating with the first opening portion 14A formed in the gate electrode 13 is formed in the insulating layer 12, and the selective-growth region and the carbon-group-material layer 23 is positioned in the bottom portion of the second opening portion 14B.

FIG. 9 shows a constitution example of the display of Example 8. The display comprises a cathode panel CP having a large number of the electron emitting regions formed in an effective region in the form of a two-dimensional matrix, and an anode panel AP, and the display has a plurality of pixels. Each pixel is constituted of the field emission device, an anode electrode 33 and a phosphor layer 31 formed on a substrate 30 so as to be opposed to the field emission device. The cathode panel CP and the anode panel AP are bonded in their circumferential portions through a frame 34. In the partial end view of FIG. 9, two opening portions (14A and 14B) and two carbon-group-material layers 23 which are electron emitting portions are shown per cathode electrode 11 on the cathode panel CP, for simplifying the drawing. However, the number of each of these members shall not be limited thereto. The basic constitution of the field emission device is as shown in FIG. 12B. Further, a through-hole 36 for vacuuming is provided in an ineffective field of the cathode panel CP, and a tip tube 37 which is sealed after vacuuming is connected to the through-hole 36. FIG. 9 shows a completed state of the display, and the shown tip tube 37 is already sealed.

The anode panel AP can have the same structure as that explained in Example 1, so that a detailed explanation thereof is omitted.

The operation of the display for displaying can be the same as the operation of the display explained in Example 5, so that a detailed explanation thereof is omitted.

The manufacturing method of an electron emitting apparatus, the manufacturing method of a field emission device and the manufacturing method of a display in Example 8 will be explained below with reference to FIGS. 10A to 10C, FIGS. 11A and 11B and FIGS. 12A and 12B. For simplification of drawings, these Figures show one electron emitting portion in an overlapping region of a cathode electrode 11 and a gate electrode 13 or their constituting elements alone.

[Step-800]

Figure 10A:
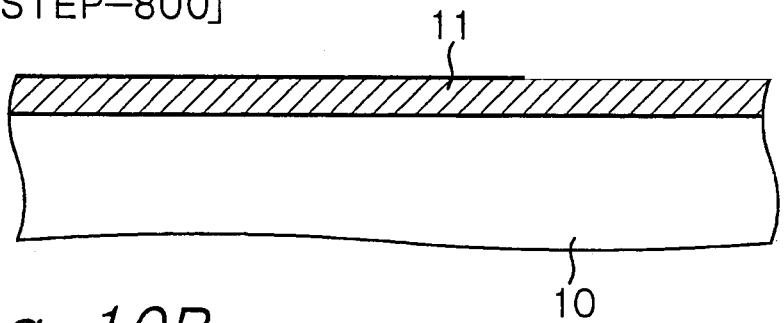
FIGS. 10A to 10C are schematic partial end views of a supporting member, etc., for explaining the manufacturing method of a cold cathode field emission device of Example 8.
Figure 10B:
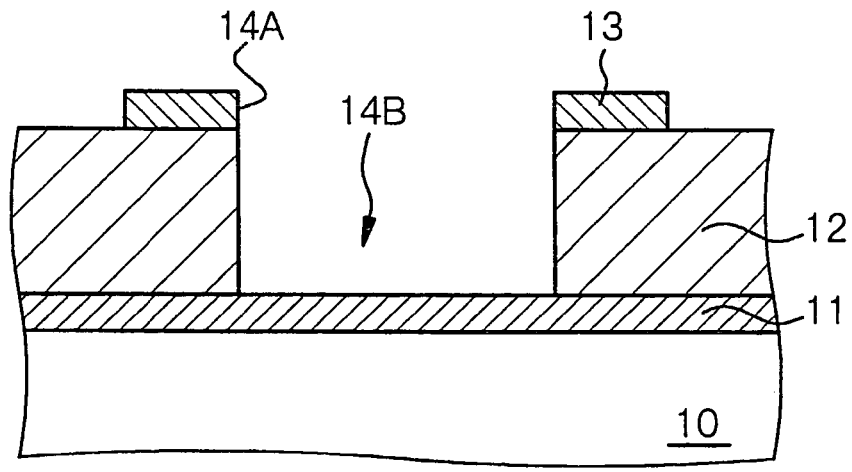
Figure 10C:
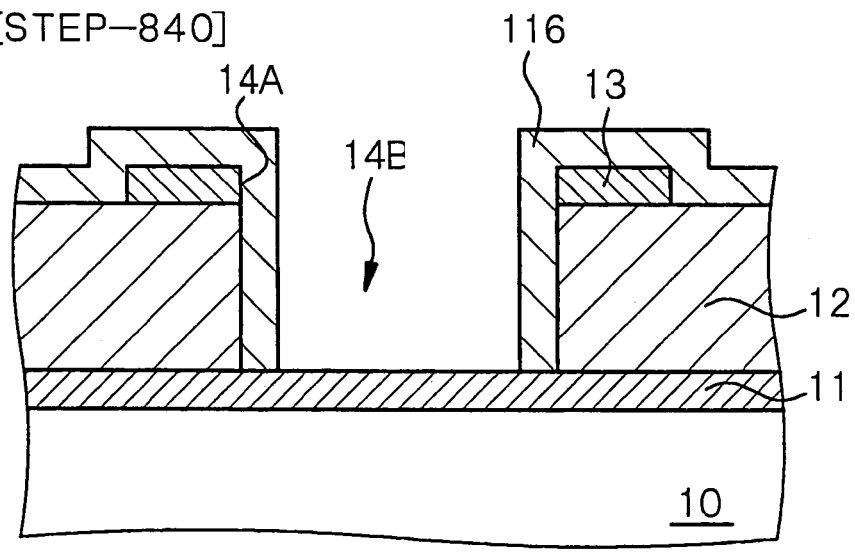

First, an electrically conductive material layer for a cathode electrode is formed on the supporting member 10 made, for example, of a glass substrate, and the electrically conductive material layer is then patterned by known lithography and a known RIE method, to form the cathode electrode (corresponding to the electrically conductive layer) 11 in the form of a stripe on the supporting member 10 (see FIG. 10A). The cathode electrode 11 in the form of a stripe extends leftward and rightward on the paper surface of the drawing. The electrically conductive material layer is composed, for example, of an approximately 0.2 $\mu$m thick aluminum (Al) layer formed by a sputtering method.

[Step-810]

Then, an insulating layer 12 is formed on the supporting member 10 and the cathode electrode 11. Specifically, the insulating layer 12 having a thickness of approximately 1 $\mu$m is formed on the entire surface, for example, by a CVD method using TEOS (tetraethoxysilane) as a source gas. The insulating layer 12 can be formed under the same condition as that shown in Table 7.

[Step-820]

Then, the gate electrode 13 having the first opening portion 14A is formed on the insulating layer 12. Specifically, an electrically conductive material layer composed of aluminum (Al) for a gate electrode is formed on the insulating layer 12 by a sputtering method, and then a patterned first mask material layer (not shown) is formed on the electrically conductive material layer. The electrically conductive material layer is then etched with using the above first mask material layer as an etching mask and patterned in the form of a stripe, and then the first mask material layer is removed. Then, a patterned second mask material layer (not shown) is formed on the electrically conductive material layer and the insulating layer 12, and the electrically conductive material layer is etched with using the above second mask material layer as an etching mask. In this manner, the gate electrode 13 having the first opening portion 14A can be formed on the insulating layer 12. The gate electrode 13 in the form of a stripe extends in a direction (direction perpendicular to the paper surface of the drawing) different from the direction in which the cathode electrode 11 extends.

[Step-830]

Then, the second opening portion 14B communicating with the first opening portion 14A formed in the gate electrode 13 is formed-in the insulating layer 12. Specifically, the insulating layer 12 is etched by an RIE method with using the second mask material layer as an etching mask, and then the second mask material layer is removed. In this manner, a structure shown in FIG. 10B can be obtained. The insulating layer 12 can be etched under the same condition as that shown in Table 8. In Example 8, the first opening portion 14A and the second opening portion 14B have a one-to-one correspondence relationship. That is, one second opening portion 14B is formed per first opening portion 14A. When viewed as a plan view, the first and second opening portions 14A and 14B have the form, for example, of a circle having a diameter of 1 to 30 $\mu$m. It is sufficient to form 1 to approximately 3000 opening portions 14A and 14B per pixel.

[Step-840]

Then, the selective-growth region 20 is formed on the portion of the cathode electrode 11 which portion is positioned in the bottom portion of the second opening portion 14B. For this purpose, first, a mask layer 116 is formed so as to expose the surface of the cathode electrode 11 in a central portion of the bottom portion of the second opening portion 14B (see FIG. 10C). Specifically, a resist material layer is formed on the entire surface including the inner surfaces of the opening portions 14A and 14B by a spin coating method, and then a hole is formed in the resist material layer positioned in the central portion of the bottom portion of the second opening portion 14B by lithography, whereby the mask layer 116 can be obtained. In Example 8, the mask layer 116 covers part of the cathode electrode 11 which part is positioned in the bottom portion of the second opening portion 14B, a side wall of the second opening portion 14B, a side wall of the first opening portion 14A, the gate electrode 13 and the insulating layer 12. While the selective-growth region is to be formed on the portion of the cathode electrode 11 which portion is positioned in the central portion of the bottom portion of the second opening portion 14B in a step to come thereafter, the above mask layer can reliably prevent short-circuiting between the cathode electrode 11 and the gate electrode 13 with metal particles.

Then, metal particles are allowed to adhere onto the mask layer 116 and the exposed surface of the cathode electrode 11. Specifically, a dispersion prepared by dispersing nickel (Ni) fine particles in a polysiloxane solution (using isopropyl alcohol as a solvent) is applied to the entire surface by a spin coating method, to form a layer composed of the solvent and the metal particles on the cathode electrode portion. Then, the mask layer 116 is removed, and the solvent is removed by heating the above layer up to approximately 400° C., to retain the metal particles 21 on the exposed surface of the cathode electrode 11, whereby the selective-growth region 20 can be obtained (see FIG. 11A). The polysiloxane works to fix the metal particles 21 to the exposed surface of the cathode electrode 11 (so-called adhesive function).

[Step-850]

Figure 11A:
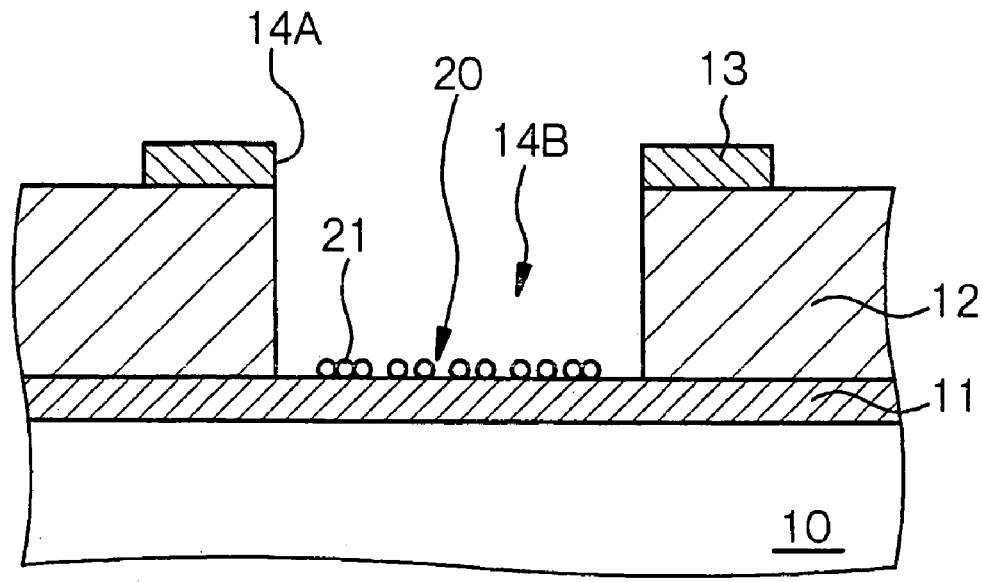
FIGS. 11A and 11B, following
Figure 11B:
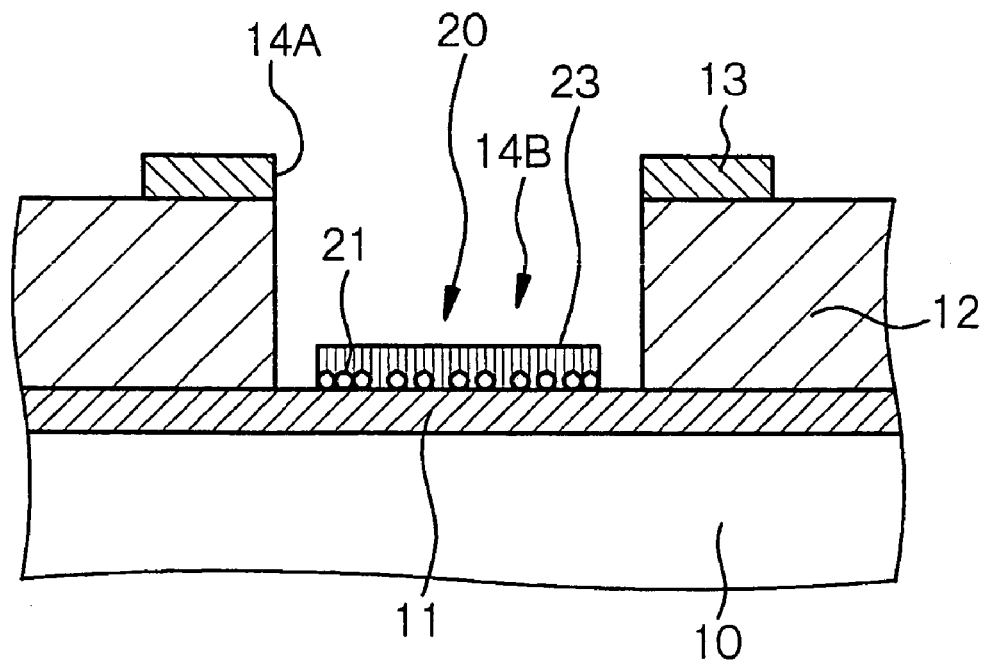

Then, the carbon-group-material layer 23 having a thickness of approximately 0.2 μm is formed on the selective-growth region 20, to obtain an electron emitting portion in the same manner as in [Step-120] in Example 1. FIGS. 11B and 12A show the thus-obtained state. FIG. 11B is a schematic partial end view obtained when the field emission device is viewed from a direction in which the gate electrode 13 extends. FIG. 12A is a schematic partial end view obtained when the field emission device is viewed from a direction in which the cathode electrode 11 extends. A condition of forming the carbon-group-material layer 23 by a microwave plasma CVD method may be the same condition as that shown in Table 1.

[Step-860]

For exposing the opening end portion of the gate electrode 13, preferably, the side wall surface of the second opening portion 14B formed in the insulating layer 12 is allowed to recede by isotropic etching. In this manner, the field emission device shown in FIG. 12B can be completed. Otherwise, there can be obtained an electron emitting apparatus which is constituted of the electrically conductive layer (corresponding to the cathode electrode 11 in Example 8) on the surface of which the selective-growth region 20 is formed, and the electron emitting portion comprising the carbon-group-material layer 23 formed on the selective-growth region 20. The above isotropic etching can be carried out by a dry etching method using a radical as a main etching species such as a chemical dry etching method, or a wet etching method using an etching solution. As an etching solution, for example, there can be used a 49% hydrofluoric acid aqueous solution/pure water mixture having a 49% hydrofluoric acid aqueous solution:pure water mixing ratio of 1:100 (volume ratio).

[Step-870]

Then, a display is assembled in the same manner as in [Step-130] in Example 1.

In the display having the above constitution, the electron emitting portion of the field emission device comprises the flat carbon-group-material layer 23 which is exposed in the bottom portion of the second opening portion 14B and has a low work function, and the fabrication thereof does not require such complicated and advanced fabrication techniques as have been required concerning the conventional Spindt type field emission device. Moreover, the etching of the carbon-group-material layer 23 is no longer required. When the area of the effective field of a display increases and when the number of electron emitting portions to be formed increases accordingly to a great extent, the electron emission efficiency of the electron emitting portions can be rendered uniform throughout the entire region of the effective field, and there can be realized a display which is remarkably free of non-uniformity in brightness and has high image quality.

When [Step-220] and [Step-230] in Example 2 are carried out in [Step-850] or the step of forming a carbon-group-material layer in Examples 9 to 16 to be described later, the electron emitting apparatus having a selective-growth region according to the second aspect of the present invention, the field emission device having a selective-growth region according to the fifth-A aspect of the present invention and the display having a selective-growth region according to the fifth-A aspect of the present invention can be obtained, and it comes to mean that the manufacturing method of a field emission device and the manufacturing method of a display according to the fifth-A aspect/fifth-A(2) aspect of the present invention are carried out.

Alternatively, when [Step-320] and [Step-330] in Example 3 are carried out, the electron emitting apparatus having a selective-growth region according to the third aspect of the present invention, the field emission device having a selective-growth region according to the sixth-A aspect of the present invention and the display having a selective-growth region according to the sixth-A aspect of the present invention can be obtained, and it comes to mean that the manufacturing method of a field emission device and the manufacturing method of a display according to the sixth-A aspect/sixth-A(2) aspect of the present invention are carried out.

EXAMPLE 9

Example 9 is directed to variants of the manufacturing method of a field emission device and the manufacturing method of a display explained in Example 8. In the manufacturing method of a field emission device and the manufacturing method of a display explained in Example 8, if the carbon-group-material layer 23 is not formed immediately after the metal particles 21 are allowed to adhere onto the cathode electrode portion, the surface of the metal particles 21 are naturally oxidized to make it difficult to form the carbon-group-material layer 23 in some cases. In Example 9, after the metal particles 21 are allowed to adhere onto the portion of the cathode electrode 11 in which the selective-growth region 20 is to be formed, a metal oxide (so-called natural oxide film) on the surface of each metal particle 21 is removed. The metal oxide on the surface of each metal particle can be removed by plasma reduction treatment or washing.

The electron emitting apparatus, the field emission device and the display to be produced in Example 9 or any one of Examples 10 to 16 to be explained later are structurally the same as those in Example 8, so that detailed explanations thereof are omitted. The manufacturing method of an electron emitting apparatus, the manufacturing method of a field emission device and the manufacturing method of a display in Example 9 will be explained below.

[Step-900]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-910]

Then, a mask layer 116 is formed so as to expose the surface of the cathode electrode 11 in a central portion of the bottom portion of the second opening portion 14B in the same manner as in [Step-840] in Example 8. Then, metal particles are allowed to adhere onto the mask layer 116 and the exposed surface of the cathode electrode 11. Specifically, a dispersion prepared by dispersing molybdenum (Mo) fine particles in a polysiloxane solution (using isopropyl alcohol as a solvent) is applied to the entire surface by a spin coating method, to form a layer composed of the solvent and the metal particles on the cathode electrode portion. Then, the mask layer 116 is removed, and the solvent is fully removed by heating the above layer up to approximately 400° C., to retain the metal particles 21 on the exposed surface of the cathode electrode 11, whereby the selective-growth region 20 can be obtained.

[Step-920]

Then, the metal oxide (natural oxide film) on the surface of each metal particle 21 is removed by plasma reduction treatment (microwave plasma treatment) under the condition shown in Table 9. Otherwise, the metal oxide (natural oxide film) on the surface of each metal particle 21 can be removed, for example, with a 50% hydrofluoric acid aqueous solution/pure water mixture having a 50% hydrofluoric acid aqueous solution:pure water mixing ratio of 1:49 (volume ratio).

[Step-930]

Then, the carbon-group-material layer 23 having a thickness of approximately 0.2 μm is formed on the selective-growth region 20, to obtain an electron emitting portion in the same manner as in [Step-850] in Example 8. A condition of forming the carbon-group-material layer 23 according to a microwave plasma CVD method may be the same condition as that shown in Table 1.

[Step-940]

Then, a field emission device as shown in FIG. 12B can be obtained in the same manner as in [Step-860] in Example 8. Otherwise, there can be obtained an electron emitting apparatus which is constituted of the electrically conductive layer (corresponding to the cathode electrode 11 in Example 9) on the surface of which the selective-growth region 20 is formed, and the electron emitting portion comprising the carbon-group-material layer 23 formed on the selective-growth region 20. Further, a display is assembled in the same manner as in [Step-130] in Example 1.

EXAMPLE 10

Example 10 is also directed to variants of the manufacturing methods explained in Example 8. In the manufacturing method of a field emission device and the manufacturing method of a display explained in Example 8, the metal particles 21 are allowed to adhere onto the cathode electrode portion. In Example 10, the step of allowing the metal particles to adhere onto the cathode electrode portion comprises the steps of allowing metal compound particles containing a metal atom constituting the metal particles to adhere onto the cathode electrode portion, and then, heating the metal compound particles to decompose them, to obtain the selective-growth region constituted of the surface of the cathode electrode onto which surface the metal particles adhere. Specifically, a layer composed of a solvent and the metal compound particles (copper iodide in Example 10) is formed on the cathode electrode portion, then the solvent is removed to retain the metal compound particles, and the metal compound particles (copper iodide particles) are decomposed by heating, to obtain the selective-growth region constituted of that portion of the cathode electrode which portion has a surface onto which the metal particles (copper particles) adhere. The manufacturing method of an electron emitting apparatus, the manufacturing method of a field emission device and the manufacturing method of a display in Example 9 will be explained below.

[Step-1000]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-1010]

Then, a mask layer 116 is formed so as to expose the surface of the cathode electrode 11 in a central portion of the bottom portion of the second opening portion 14B in the same manner as in [Step-840] in Example 8. Then, metal particles are allowed to adhere onto the exposed surface of the cathode electrode 11. Specifically, a dispersion prepared by dispersing copper iodide fine particles in a polysiloxane solution is applied to the entire surface by a spin coating method in the same manner as in Example 8, to form a layer composed of the solvent and the metal compound particles (copper iodide particles) on the cathode electrode portion. Then, the mask layer 116 is removed, and heat treatment is carried out at 400° C. to fully remove the solvent, to pyrolyze the copper iodide and to precipitate the metal particles (copper particles) 21 on the exposed surface of the cathode electrode 11, whereby the selective-growth region 20 can be obtained.

[Step-1020]

Then, the carbon-group-material layer 23 having a thickness of approximately 0.2 μm is formed on the selective-growth region 20 in the same manner as in [Step-850] in Example 8, to obtain an electron emitting portion. Then, a field emission device as shown in FIG. 12B can be obtained in the same manner as in [Step-860] in Example 8. Otherwise, there can be obtained an electron emitting apparatus which is constituted of the electrically conductive layer (corresponding to the cathode electrode 11 in Example 10) on the surface of which the selective-growth region 20 is formed, and the electron emitting portion comprising the carbon-group-material layer 23 formed on the selective-growth region 20. Further, a display is assembled in the same manner as in [Step-130] in Example 1.

Further, the metal oxide (natural oxide film) on the surface of each metal particle 21 may be removed in the same manner as in [Step-920] in Example 9.

EXAMPLE 11

Example 11 is also directed to variants of the manufacturing methods explained in Example 8. In the manufacturing methods explained in Example 8, the metal particles 21 are allowed to adhere onto the cathode electrode portion. In Example 11, the step of forming the selective-growth region comprises the steps of forming a mask layer so as to expose the surface of the cathode electrode in the bottom portion of the second opening portion and then forming a metal thin layer composed of titanium (Ti) on the mask layer and the exposed surface of the cathode electrode by a sputtering method. The manufacturing method of an electron emitting apparatus, the manufacturing method of a field emission device and the manufacturing method of a display in Example 11 will be explained below.

[Step-1100]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-1110]

Figure 13A:
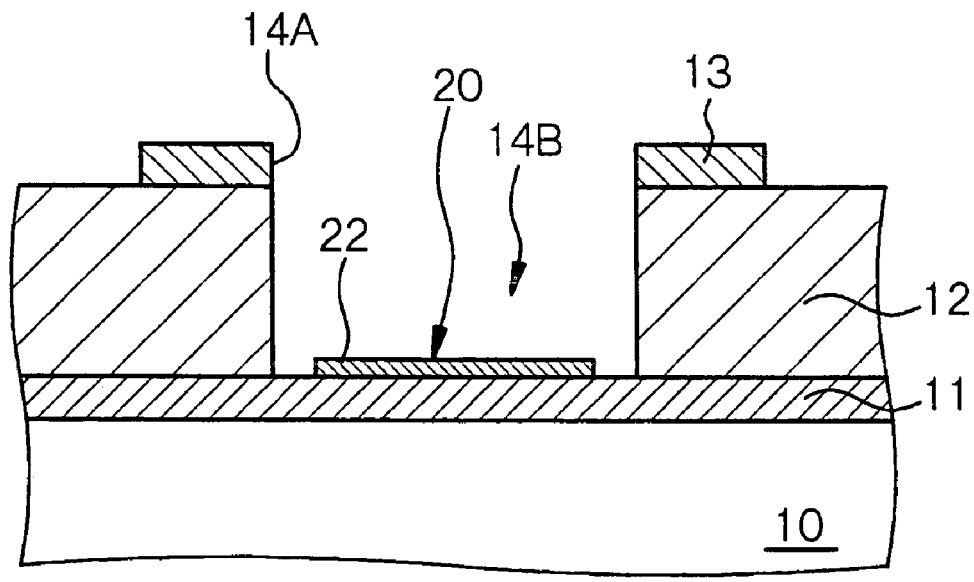
FIGS. 13A and 13B are schematic partial end views of a supporting member, etc., for explaining a cold cathode field emission device of Example 11.

Then, a mask layer 116 is formed so as to expose the surface of the cathode electrode 11 in a central portion of the bottom portion of the second opening portion 14B in the same manner as in [Step-840] in Example 8. Then, a metal thin layer 22 is formed on the mask layer 116 and the exposed surface of the cathode electrode 11 by a sputtering method under the condition shown in Table 6, and then the mask layer 116 is removed (see FIG. 13A). In this manner, there can be obtained the selective-growth region 20 constituted of that portion of the cathode electrode which portion has the surface on which the metal thin layer 22 is formed.

[Step-1120]

Figure 13B:
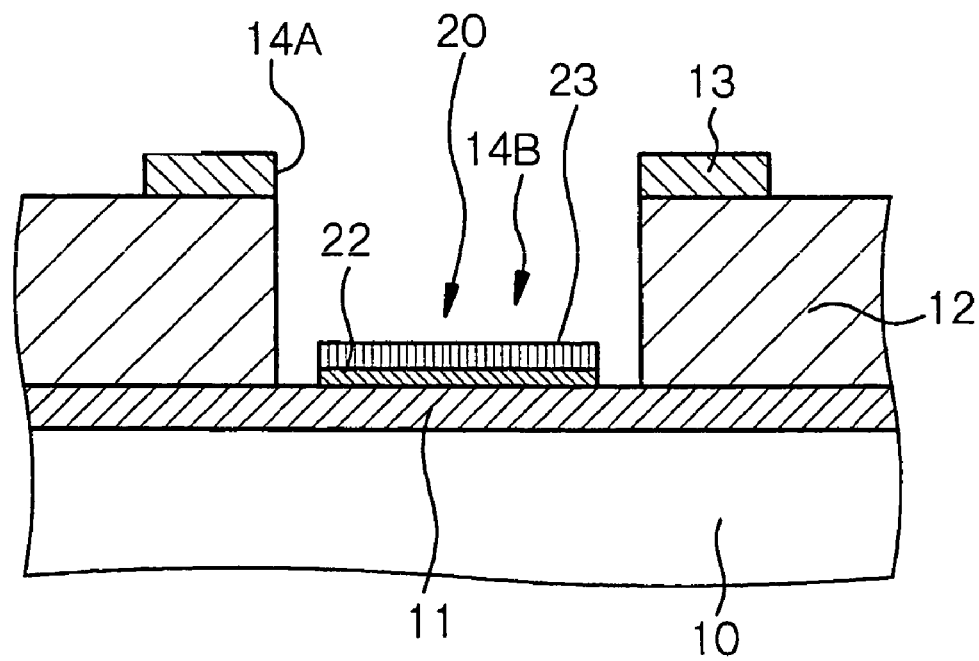

Then, the carbon-group-material layer 23 having a thickness of approximately 0.2 μm is formed on the selective-growth region 20 in the same manner as in [Step-850] in Example 8, to obtain an electron emitting portion (see FIG. 13B). Then, the field emission device can be completed in the same manner as in [Step-860] in Example 8. Otherwise, there can be obtained an electron emitting apparatus which is constituted of the electrically conductive layer (corresponding to the cathode electrode 11 in Example 11) on the surface of which the selective-growth region 20 is formed, and the electron emitting portion comprising the carbon-group-material layer 23 formed on the selective-growth region 20. Further, a display is assembled in the same manner as in [Step-130] in Example 1.

The metal oxide (natural oxide film) on the surface of the metal thin layer 22 may be removed in the same manner as in [Step-920] in Example 9. Further, there may be employed a constitution in which, in the same manner as in Example 10, a metal compound thin layer is formed on the surface of the cathode electrode 11 which portion is positioned in the bottom portion of the second opening portion 14B, by a sputtering method, and the metal compound thin layer is pyrolyzed to form the selective-growth region 20 composed of the metal thin layer formed on the surface of the cathode electrode. Further, the metal thin layer may be formed by an MOCVD method.

EXAMPLE 12

Example 12 is also directed to variants of the manufacturing methods explained in Example 8. In Example 12, the selective-growth region is composed of an organometallic compound thin layer, more specifically, composed of a complex compound of nickel acetylacetonate. In Example 12, further, the step of forming the organometallic compound thin layer on the cathode electrode portion comprises the step of applying an organometallic compound solution onto the cathode electrode. The manufacturing method of an electron emitting apparatus, the manufacturing method of a field emission device and the manufacturing method of a display in Example 12 will be explained below.

[Step-1200]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-1210]

Then, a mask layer 116 is formed so as to expose the surface of the cathode electrode 11 in a central portion of the bottom portion of the second opening portion 14B in the same manner as in [Step-840] in Example 8. Then, a layer composed of an organometallic compound solution containing nickel acetylacetonate is formed on the mask layer 116 and the exposed surface of the cathode electrode 11 by a spin coating method, the applied organometallic compound solution is dried and then the mask layer 116 is removed, whereby there can be obtained the selective-growth region 20 composed of the organometallic compound thin layer which is formed on the portion of the cathode electrode which portion is exposed in the bottom portion of the opening portions 14A and 14B and which is composed of nickel acetylacetonate.

[Step-1220]

Then, the carbon-group-material layer 23 having a thickness of approximately 0.2 μm is formed on the selective-growth region 20 in the same manner as in [Step-850] in Example 8, to obtain an electron emitting portion. Then, the field emission device can be completed in the same manner as in [Step-860] in Example 8. Otherwise, there can be obtained an electron emitting apparatus which is constituted of the electrically conductive layer (corresponding to the cathode electrode 11 in Example 12) on the surface of which the selective-growth region 20 is formed, and the electron emitting portion comprising the carbon-group-material layer 23 formed on the selective-growth region 20. Further, a display is assembled in the same manner as in [Step-130] in Example 1.

In Example 12, after the organometallic compound thin layer is formed, the metal oxide (natural oxide film) on the surface of the organometallic compound thin layer may be also removed in the same manner as in [Step-920] in Example 9.

EXAMPLE 13

Example 13 is also directed to variants of the manufacturing methods explained in Example 8 and further those of Example 12. In Example 13, the selective-growth region is composed of an organometallic compound thin layer, more specifically, is composed of a complex compound of nickel acetylacetonate. In Example 13, the step of forming the organometallic compound thin layer on the cathode electrode portion comprises the steps of sublimating an organometallic compound and then depositing such an organometallic compound on the cathode electrode. The manufacturing method of an electron emitting apparatus, the manufacturing method of a field emission device and the manufacturing method of a display in Example 13 will be explained below.

[Step-1300]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-1310]

Then, a mask layer 116 is formed so as to expose the surface of the cathode electrode 11 in a central portion of the bottom portion of the second opening portion 14B in the same manner as in [Step-840] in Example 8. Then, an organometallic compound thin layer composed of nickel acetylacetonate is formed on the mask layer 116 and the exposed surface of the cathode electrode 11. Specifically, there is provided a film-forming apparatus having a reaction chamber and a sublimating chamber connected to the reaction chamber through a heatable tubing. The supporting member is transported into the reaction chamber, and then the reaction chamber is adjusted to have an inert gas atmosphere. Then, the nickel acetylacetonate is sublimated in the sublimation chamber, and the sublimated nickel acetylacetonate is sent to the reaction chamber together with a carrier gas. In the reaction chamber, an organometallic compound thin layer containing nickel acetylacetonate is deposited on the mask layer 116 and the exposed surface of the cathode electrode 11. The supporting member 10 can have a room temperature. Then, the mask layer 116 is removed to give the selective-growth region 20 composed of the organometallic compound thin layer which is formed on the portion of the cathode electrode 11 which portion is exposed in the bottom portion of the opening portions 14A and 14B and which is composed of nickel acetylacetonate.

[Step-1320]

Then, the carbon-group-material layer 23 having a thickness of approximately 0.2 $\mu$m is formed on the selective-growth region 20 in the same manner as in [Step-850] in Example 8, to obtain an electron emitting portion. Then, the field emission device can be completed in the same manner as in [Step-860] in Example 8. Otherwise, there can be obtained an electron emitting apparatus which is constituted of the electrically conductive layer (corresponding to the cathode electrode 11 in Example 13) on the surface of which the selective-growth region 20 is formed, and the electron emitting portion comprising the carbon-group-material layer 23 formed on the selective-growth region 20. Further, a display is assembled in the same manner as in [Step-130] in Example 1.

In Example 13, after the organometallic compound thin layer is formed, the metal oxide (natural oxide film) on the surface of the organometallic compound thin layer may be also removed in the same manner as in [Step-920] in Example 9.

EXAMPLE 14

Example 14 is also directed to variants of the manufacturing methods explained in Example 8. In Example 14, the selective-growth region composed of a metal thin layer is formed on the surface of the cathode electrode by a plating method. The manufacturing method of an electron emitting apparatus, the manufacturing method of a field emission device and the manufacturing method of a display in Example 14 will be explained below.

[Step-1400]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-1410]

Then, a mask layer 116 is formed so as to expose the surface of the cathode electrode 11 in a central portion of the bottom portion of the second opening portion 14B in the same manner as in [Step-840] in Example 8. Then, the selective-growth region 20 composed of a metal thin layer is formed on the exposed surface of the cathode electrode 11 by a plating method. Specifically, the supporting member is immersed in a zinc plating solution bath, and the selective-growth region 20 constituted of a metal thin layer composed of zinc (Zn) is formed on the exposed surface of the cathode electrode 11 by a zinc plating method in which the cathode electrode 11 is connected to a cathode side and nickel as an anticathode is connected to an anode side. For reliably prevent the deposition of a zinc layer on the gate electrode, it is preferred to connect the gate electrode 13 to the anode side. Then, the mask layer 116 is removed using an organic solvent such as acetone, to give the selective-growth region 20 which is constituted of a metal thin layer composed of zinc (Zn) and is formed on the portion of the cathode electrode 11 which portion is exposed in the bottom portion of the opening portions 14A and 14B. If the zinc plating solution bath is replaced with a tin plating solution bath, there can be obtained a selective-growth region 20 constituted of a metal thin layer composed of tin (Sn).

[Step-1420]

Then, the carbon-group-material layer 23 having a thickness of approximately 0.2 μm is formed on the selective-growth region 20, to obtain an electron emitting portion in the same manner as in [Step-850] in Example 8. A condition of forming the carbon-group-material layer 23 according to a microwave plasma CVD method may be the same condition as that shown in Table 1.

[Step-1430]

Then, the field emission device can be completed in the same manner as in [Step-860] in Example 8. Otherwise, there can be obtained an electron emitting apparatus which is constituted of the electrically conductive layer (corresponding to the cathode electrode 11 in Example 14) on the surface of which the selective-growth region 20 is formed, and the electron emitting portion comprising the carbon-group-material layer 23 formed on the selective-growth region 20. Further, a display is assembled in the same manner as in [Step-130] in Example 1.

In Example 14, after the metal thin layer is formed, the metal oxide (natural oxide film) on the surface of the metal thin layer may be removed in the same manner as in [Step-920] in Example 9.

EXAMPLE 15

Example 15 is a variant of Example 14. In Example 15, a convexo-concave shape is formed in the surface of the selective-growth region formed on the portion of the cathode electrode 11 which portion is exposed in the bottom portion of the opening portions 14A and 14B. As a result, the carbon-group-material layer formed thereon has protrusions, so that a field emission device having high electron emission efficiency can be obtained. The manufacturing method of an electron emitting apparatus, the manufacturing method of a field emission device and the manufacturing method of a display in Example 15 will be explained below.

[Step-1500]

In the same manner as in [Step-1400] to [Step-1410] in Example 14, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12. A mask layer 116 is then formed so as to expose the surface of the cathode electrode 11 in a central portion of the bottom portion of the second opening portion 14B in the same manner as in [Step-840] in Example 8. Then, a selective-growth region 20 constituted of a metal thin layer composed of zinc (Zn) is formed on the exposed surface of the cathode electrode 11 by a plating method.

[Step-1510]

Then, the supporting member 10 is immersed in a 5% sodium hydroxide aqueous solution, to etch the surface of the selective-growth region 20 constituted of the metal thin layer composed of zinc (Zn), whereby a convexo-concave shape is formed in the surface of the selective-growth region 20.

[Step-1520]

Then, the carbon-group-material layer 23 having a thickness of approximately 0.2 μm is formed on the selective-growth region 20, to obtain an electron emitting portion in the same manner as in [Step-850] in Example 8. A condition of forming the carbon-group-material layer 23 according to a microwave plasma CVD method may be the same condition as that shown in Table 1.

[Step-1530]

Then, the field emission device can be completed in the same manner as in [Step-860] in Example 8. Otherwise, there can be obtained an electron emitting apparatus which is constituted of the electrically conductive layer (corresponding to the cathode electrode 11 in Example 15) on the surface of which the selective-growth region 20 is formed, and the electron emitting portion comprising the carbon-group-material layer 23 formed on the selective-growth region 20. Further, a display is assembled in the same manner as in [Step-130] in Example 1.

In Example 15, Further, for forming (etching) the convexo-concave shape in the surface of the selective-growth region 20, not only a sodium hydroxide aqueous solution is used, but also diluted hydrochloric acid, diluted sulfuric acid or diluted nitric acid may be used depending upon materials constituting the selective-growth region 20.

In Example 15, after the metal thin layer is formed, the metal oxide (natural oxide film) on the surface of the metal thin layer may be removed in the same manner as in [step-920] in Example 9.

EXAMPLE 16

Example 16 is also directed to variants of the manufacturing methods explained in Example 8. In Example 16, the selective-growth region composed of a metal thin layer is formed on the surface of the cathode electrode by a method in which an organometallic compound is pyrolyzed. The manufacturing method of an electron emitting apparatus, the manufacturing method of a field emission device and the manufacturing method of a display in Example 16 will be explained below.

[Step-1600]

In the same manner as in [Step-800] to [Step-830] in Example 8, a cathode electrode 11 is formed on a supporting member 10 made, for example, of a glass substrate; then, an insulating layer 12 is formed on the supporting member 10 and the cathode electrode 11; then, a gate electrode 13 having a first opening portion 14A is formed on the insulating layer 12; and then, a second opening portion 14B communicating with the first opening portion 14A formed in the gate electrode 13 is formed in the insulating layer 12.

[Step-1610]

Then, a mask layer 116 is formed so as to expose the surface of the cathode electrode 11 in a central portion of the bottom portion of the second opening portion 14B in the same manner as in [Step-840] in Example 8. Then, the selective-growth region 20 composed of a metal thin layer is formed on the mask layer 116 and the exposed surface of the cathode electrode 11 by a method in which nickel acetylacetonate is pyrolyzed. Specifically, there is provided a film-forming apparatus having a reaction chamber and a sublimating chamber connected to the reaction chamber through a heatable tubing. The supporting member is transported into the reaction chamber, and then the reaction chamber is adjusted to have an inert gas atmosphere. Then, the nickel acetylacetonate is sublimated in the sublimation chamber, and the sublimated nickel acetylacetonate is sent to the reaction chamber together with a carrier gas. The supporting member is maintained at a proper temperature in advance.

The supporting member is preferably heated at 50 to 300° C., preferably at 100 to 200° C. In the reaction chamber, a nickel (Ni) layer obtained by the pyrolysis of nickel acetyulacetonate is deposited on the mask layer 116 and the exposed surface of the cathode electrode 11. Then, the mask layer 116 is removed to give a selective-growth region 20 composed of the metal thin layer which is composed of nickel (N) and is formed on the portion of the cathode electrode 11 which portion is exposed in the bottom portion of the opening portions 14A and 14B.

Alternatively, for example, an organometallic compound solution containing zinc (Zn) is applied, by a spin coating method, to the entire surface of the mask layer 116 and the surface of the cathode electrode 11 which surface is exposed in the central portion of the bottom portion of the second opening portion 14B, and the resultant coating is heat-treated in a reducing gas atmosphere, to pyrolyze the organometallic compound containing zinc and to form a zinc (Zn) layer on the mask layer 116 and the exposed surface of the cathode electrode 11, whereby the selective-growth region 20 constituted of a metal thin layer composed of zinc (Zn) can be also obtained.

[Step-1620]

Then, the carbon-group-material layer having a thickness of approximately 0.2 μm is formed on the selective-growth region 20 in the same manner as in [Step-850] in Example 8, to obtain an electron emitting portion. A condition of forming the carbon material layer 23 according to a microwave plasma CVD method may be the same condition as that shown in Table 1. Then, the field emission device can be completed in the same manner as in [Step-860] in Example 8. Otherwise, there can be obtained an electron emitting apparatus which is constituted of the electrically conductive layer (corresponding to the cathode electrode 11 in Example 16) on the surface of which the selective-growth region 20 is formed, and the electron emitting portion comprising the carbon-group-material layer 23 formed on the selective-growth region 20. Further, a display is assembled in the same manner as in [Step-130] in Example 1.

In Example 16, after the metal thin layer is formed, the metal oxide (natural oxide film) on the surface of the metal thin layer may be removed in the same manner as in [Step-920] in Example 9.

EXAMPLE 17

Example 17 is concerned with the electron emitting apparatus having a selective-growth region according to the first aspect of the present invention, the field emission device having a selective-growth region according to the fourth aspect of the present invention, the display having a selective-growth region according to the fourth aspect of the present invention, the manufacturing method of a field emission device according to the fourth (1) aspect of the present invention including the step of forming a selective-growth region, and the manufacturing method of a display according to the fourth (1) aspect of the present invention including the step of forming a selective-growth region.

Figure 15:
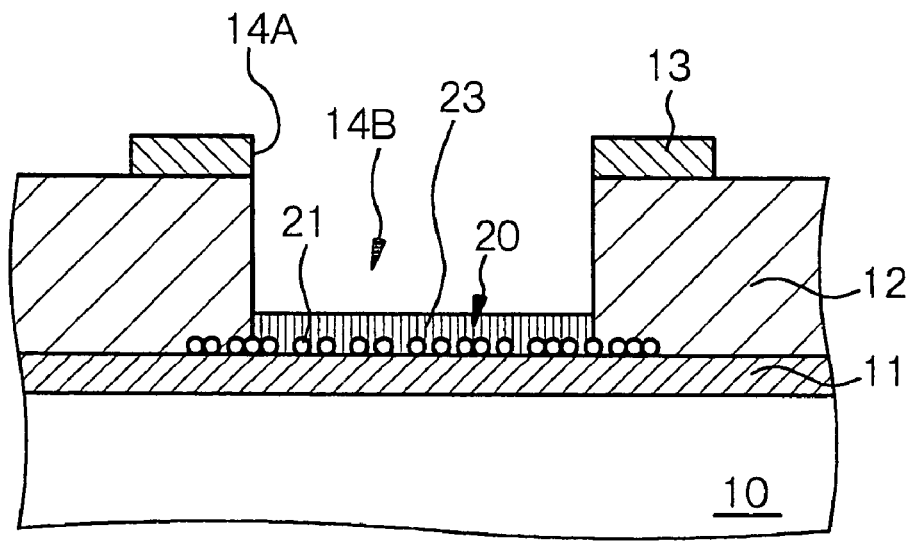
FIG. 15, following

FIG. 15 shows a schematic partial end view of the field emission device or the electron emitting apparatus of Example 17. The field emission device also comprises a cathode electrode 11 formed on a supporting member 10 and a gate electrode 13 which is formed above the cathode electrode 11 and has a first opening portion 14A. The field emission device further has a selective-growth region 20 formed on a portion of the cathode electrode 11 which portion is positioned in a bottom portion of opening portions 14A and 14B, and an electron emitting portion comprising a carbon-group-material layer 23 formed on the selective-growth region 20. In Example 17, the selective-growth region 20 is constituted of metal particles 21 composed of nickel (Ni) which adheres on the surface of the cathode electrode 11. Differing from those of the field emission devices explained in Examples 8 to 16, the selective-growth region 20 extends to reach an interior of an insulating layer 12. In some formation state of the selective-growth region 20, however, the selective-growth region 20 may be formed only on the portion of the cathode electrode 11 which portion is positioned in the bottom of the opening portions 14A and 14B like those of the field emission devices explained in Examples 8 to 16.

In the field emission device of Example 17, the insulating layer 12 is formed on the supporting member 10 and the cathode electrode 11, the second opening portion 14B communicating with the first opening portion 14A formed in the gate electrode 13 is formed in the insulating layer 12, and the carbon-group-material layer 23 is positioned in the bottom portion of the second opening portion 14B.

The display of Example 17 is substantially similar to the display shown in FIG. 9, so that a detailed explanation thereof is omitted.

The manufacturing method of an electron emitting apparatus, the manufacturing method of a field emission device and the manufacturing method of a display in Example 17 will be explained below with reference to FIGS. 14A and 14B and FIG. 15.

[Step-1700]

In the same manner as in [Step-110] in Example 1, an electrically conductive material layer for a cathode electrode is formed on a supporting member 10 made, for example, of a glass substrate, and the electrically conductive material layer is patterned by known lithography and a known RIE method, to form the cathode electrode 11 in the form of a strip on the supporting member 10. The cathode electrode 11 in the form of a stripe extends leftward and rightward on the paper surface of the drawing. The electrically conductive material layer is composed, for example, of an approximately 0.2 μm thick aluminum (Al) layer formed by a sputtering method.

[Step-1710]

Figure 14A:
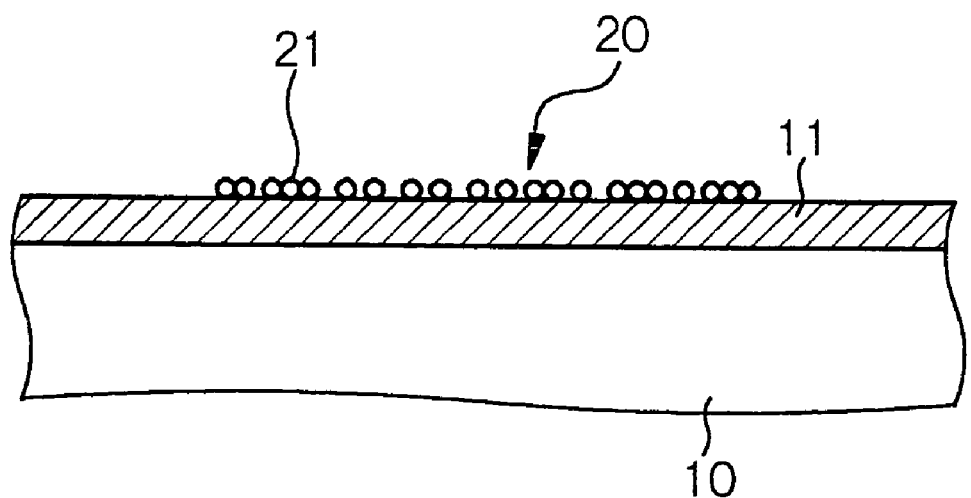
FIGS. 14A and 14B are schematic partial end views of a supporting member, etc., for explaining a cold cathode field emission device of Example 17.
Figure 14B:
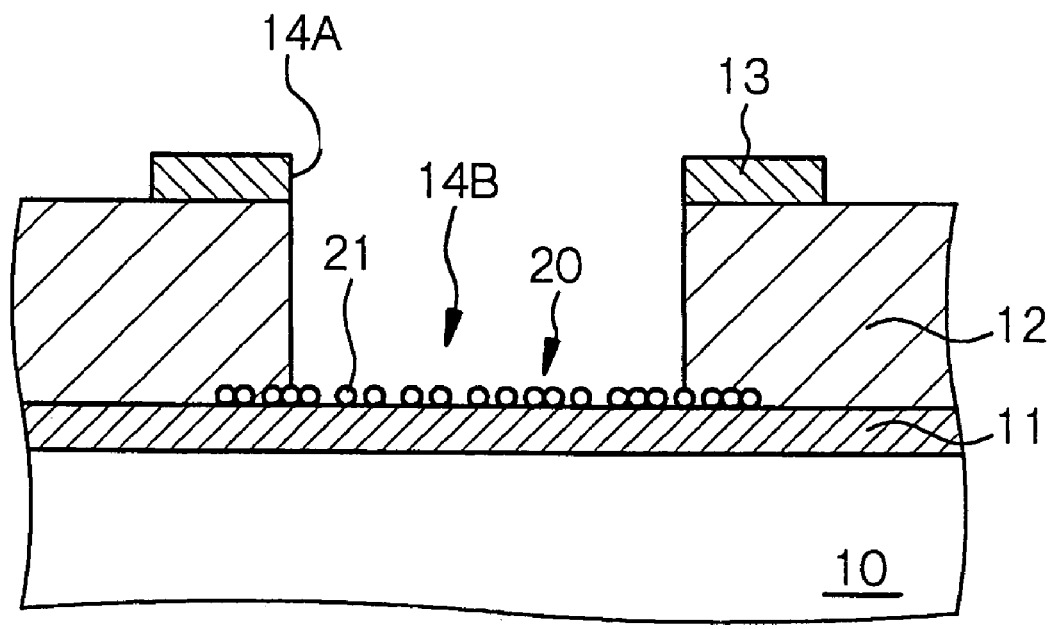

Then, the selective-growth region 20 is formed on the surface of the cathode electrode 11 in the same manner as in [Step-110] in Example 1 (see FIG. 14A).

[Step-1720]

Then, the insulating layer 12 is formed on the supporting member 10, the cathode electrode 11 and the selective-growth region 20. Specifically, the insulating layer 12 is formed on the entire surface in the same manner as in [Step-810] in Example 8, and the gate electrode 13 having the first opening portion 14A is formed on the insulating layer 12 in the same manner as in [Step-820] in Example 8. Then, the second opening portion 14B communicating with the first opening portion 14A formed in the gate electrode 13 is formed in the insulating layer 12 in the same manner as in [Step-830] in Example 8, to expose the selective-growth region 20 in the bottom portion of the second opening portion 14B. In Example 17, the first opening portion 14A and the second opening portion 14B have a one-to-one correspondence relationship as well. That is, one second opening portion 14B is formed per first opening portion 14A. When viewed as a plan view, the first and second opening portions 14A and 14B have the form, for example, of a circle having a diameter of 1 to 30 µm. It is sufficient to form the opening portions 14A and 14B, for example, in the quantity of approximately 1 to 3000 per pixel. In this manner, the structure shown in FIG. 14B can be obtained.

[Step-1730]

Then, the carbon-group-material layer 23 having a thickness of approximately 0.2 µm is formed on the selective-growth region 20 which portion is exposed in the bottom portion of the second opening portion 14B to obtain the electron emitting portion in the same manner as in [Step-120] in Example 1. FIG. 15 shows the thus-obtained state. A condition of forming the carbon-group-material layer 23 according to a microwave plasma CVD method may be the same condition as that shown in Table 1.

[Step-1740]

For exposing an opening end portion of the gate electrode 13, preferably, the side wall surface of the second opening portion 14B formed in the insulating layer 12 is allowed to recede by isotropic etching in the same manner as in [Step-860] in Example 8. Then, a display is assembled in the same manner as in [Step-130] in Example 1.

When [Step-220] and [Step-230] in Example 2 are carried out in [Step-1730], the electron emitting apparatus having a selective-growth region according to the second aspect of the present invention, the field emission device having a selective-growth region according to the fifth-A aspect of the present invention and the display having a selective-growth region according to the fifth-A aspect of the present invention can be obtained, and it comes to mean that the manufacturing method of a field emission device and the manufacturing method of a display according to the fifth-A aspect/fifth-A(1) aspect of the present invention are carried out.

Alternatively, when [Step-320] and [Step-330] in Example 3 are carried out in [Step-1730], the electron emitting apparatus having a selective-growth region according to the third aspect of the present invention, the field emission device having a selective-growth region according to the sixth-A aspect of the present invention and the display having a selective-growth region according to the sixth-A aspect of the present invention can be obtained, and it comes to mean that the manufacturing method of a field emission device and the manufacturing method of a display according to the sixth-A aspect/sixth-A(1) aspect of the present invention are carried out.

EXAMPLE 18

Example 18 is concerned with the electron emitting apparatus having a selective-growth region according to the first aspect of the present invention, the field emission device having a selective-growth region according to the fourth aspect of the present invention, the display having a selective-growth region according to the fourth aspect of the present invention, the manufacturing method of a field emission device according to the seventh (1) aspect of the present invention including the step of forming a selective-growth region, and the manufacturing method of a display according to the seventh (1) aspect of the present invention including the step of forming a selective-growth region.

Figure 16:
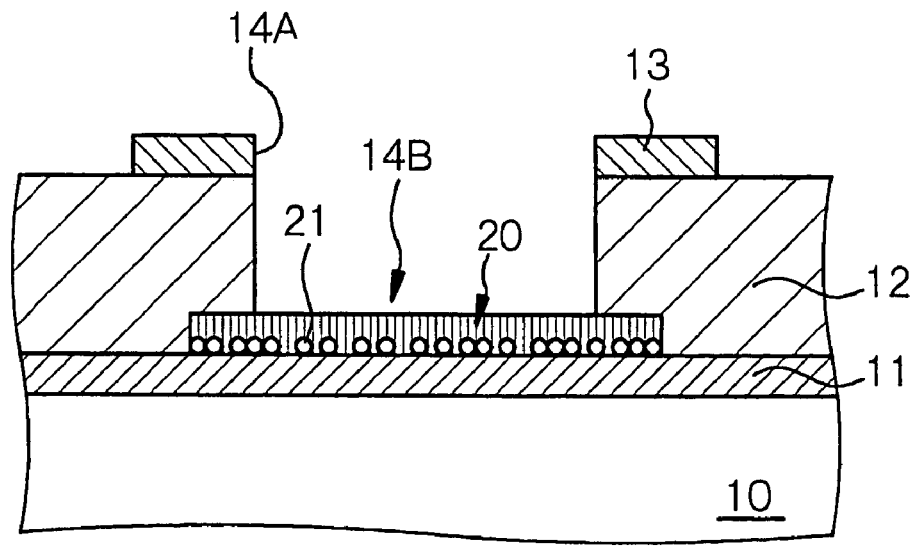
FIG. 16 is a schematic partial end view of a supporting member, etc., for explaining a cold cathode field emission device of Example 18.

FIG. 16 shows a schematic partial end view of the field emission device or electron emitting apparatus of Example 18. Since the field emission device has substantially the same structure as that of the field emission device explained in Example 17, the detailed explanation thereof will be omitted. Further, since the display of Example 18 is substantially the same display as that shown in FIG. 9, the detailed explanation thereof will be omitted. Unlike the field emission devices explained in Examples 8 to 16, a selective-growth region 20 and a carbon-group-material layer 23 formed thereon extend into an insulating layer 12. In some formed state of the selective-growth region 20, the selective-growth region 20 and the carbon-group-material layer 23 formed thereon may be formed only on a portion of the cathode electrode 11 positioned in the bottom portion of opening portions 14A and 14B, like the field emission devices explained in Examples 8 to 16.

The manufacturing method of an electron emitting apparatus, the manufacturing method of a field emission device and the manufacturing method of a display in Example 18 will be explained below with reference to FIGS. 3A, 3D and 16.

[Step-1800]

In the same manner as in [Step-110] in Example 1, an electrically conductive material layer for a cathode electrode is formed on a supporting member 10 made, for example, of a glass substrate, and the electrically conductive material layer is patterned by known lithography and a known RIE method, to form the cathode electrode 11 in the form of a stripe on the supporting member 10 (See FIG. 3A). The cathode electrode 11 in the form of a stripe extends leftward and rightward on the paper surface of the drawing. The electrically conductive material layer is composed, for example, of an approximately 0.2 µm thick aluminum (Al) layer formed by a sputtering method.

[Step-1810]

Then, the selective-growth region 20 is formed on the surface of the cathode electrode 11 in the same manner as in [Step-110] in Example 1.

[Step-1820]

Then, the carbon-group-material layer 23 having a thickness of approximately 0.2 µm is formed on the selective-growth region 20 to obtain the electron emitting portion in the same manner as in [Step-120] in Example 1. FIG. 3D shows the thus-obtained state. A condition of forming the carbon-group-material layer 23 according to a microwave plasma CVD method may be the same condition as that shown in Table 1.

[Step-1830]

Then, the gate electrode 13 having the first opening portion 14A is formed above the carbon-group-material layer 23. Specifically, the insulating layer 12 is formed on the entire surface in the same manner as in [Step-810] in Example 8, and the gate electrode 13 having the first opening portion 14A is formed on the insulating layer 12 in the same manner as in [Step-820] in Example 8. Then, the second opening portion 14B communicating with the first opening portion 14A formed in the gate electrode 13 is formed in the insulating layer 12 in the same manner as in [Step-830] in Example 8, to expose the carbon-group-material layer 23 in the bottom portion of the second opening portion 14B. In Example 18, the first opening portion 14A and the second opening portion 14B have a one-to-one correspondence relationship as well. That is, one second opening portion 14B is formed per first opening portion 14A. When viewed as a plan view, the first and second opening portions 14A and 14B have the form, for example, of a circle having a diameter of 1 to 30 µm. It is sufficient to form the opening portions 14A and 14B, for example, in the quantity of approximately 1 to 3000 per pixel. In this manner, the field emission device shown in FIG. 16 can be obtained.

[Step-1840]

For exposing an opening end portion of the gate electrode 13, preferably, the side wall surface of the second opening portion 14B formed in the insulating layer 12 is allowed to recede by isotropic etching in the same manner as in [Step-860] in Example 8. Then, a display is assembled in the same manner as in [Step-130] in Example 1.

When [Step-220] and [Step-230] in Example 2 are carried out in [Step-1820], or when [Step-220] in Example 2 is carried out in [Step-1820] and [Step-1830] is followed by [Step-230] in Example 2, the electron emitting apparatus having a selective-growth region according to the second aspect of the present invention, the field emission device having a selective-growth region according to the fifth-A aspect of the present invention and the display having a selective-growth region according to the fifth-A aspect of the present invention can be obtained, and it comes to mean that the manufacturing method of a field emission device and the manufacturing method of a display according to the eighth-A/eighth-A(1) aspect of the present invention are carried out.

Alternatively, when [Step-320] and [Step-330] in Example 3 are carried out in [Step-1820], or when [Step-320] in Example 3 is carried out in [Step-1820] and [Step-1830] is followed by [Step-330] in Example 3, the electron emitting apparatus having a selective-growth region according to the third aspect of the present invention, the field emission device having a selective-growth region according to the sixth-A aspect of the present invention and the display having a selective-growth region according to the sixth-A aspect of the present invention can be obtained, and it comes to mean that the manufacturing method of a field emission device and the manufacturing method of a display according to the ninth-A/ninth-A(1) aspect of the present invention are carried out.

In Example 18 or 19, after the formation of the opening portion 14A and 14B, the metal oxide (natural oxide film) on the surface of each metal particle or on the surface of the metal thin layer in the exposed selective-growth region 20 may be removed as described in [Step-920] in Example 9. There may be employed a constitution in which the metallic compound particles are allowed to adhere or the metallic compound thin layer is formed, and then the metallic compound particles or the metallic compound thin layer is pyrolyzed to obtain a selective-growth region 20 composed of the metal particles adhering onto the surface of the cathode electrode or a metal thin layer formed thereon in the same manner as in Example 10.

Further, in Example 17 or 18, the step of forming the selective-growth region may comprise the steps of forming a mask layer so as to expose the surface of the cathode electrode in a central portion of the bottom portion of the second opening portion and forming a metal thin layer on the mask layer and the exposed surface of the cathode electrode by a sputtering method in the same manner as in Example 11. Otherwise, the step of forming the selective-growth region may comprise the step of forming, on the cathode electrode, a layer from an organometallic compound solution, or may comprise the steps of sublimating an organometallic compound and then depositing such an organometallic compound on the cathode electrode in the same manner as in Example 12 or Example 13. Further, the selective-growth region composed of a metal thin layer may be formed on the surface of the cathode electrode by a plating method in the same manner as in Example 14 and Example 15 and the selective-growth region composed of a metal thin layer may be formed on the surface of the cathode electrode by a method in which an organometallic compound is pyrolyzed in the same manner as in Example 16.

EXAMPLE 19

Example 19 is concerned with the electron emitting apparatus according to the second-B aspect of the present invention, the manufacturing method of an electron emitting apparatus according to the second-B aspect of the present invention, the field emission device according to the fifth-B aspect of the present invention, the manufacturing method of a field emission device according to the fifth-B aspect, the display according to the fifth-B aspect and the manufacturing method of a display according to the fifth-B aspect.

The display of Example 19 has substantially the same constitution as that of the display of Example 5 having a schematic partial end view shown in FIG. 7, so that the detailed explanation thereof will be omitted.

Figure 18A:
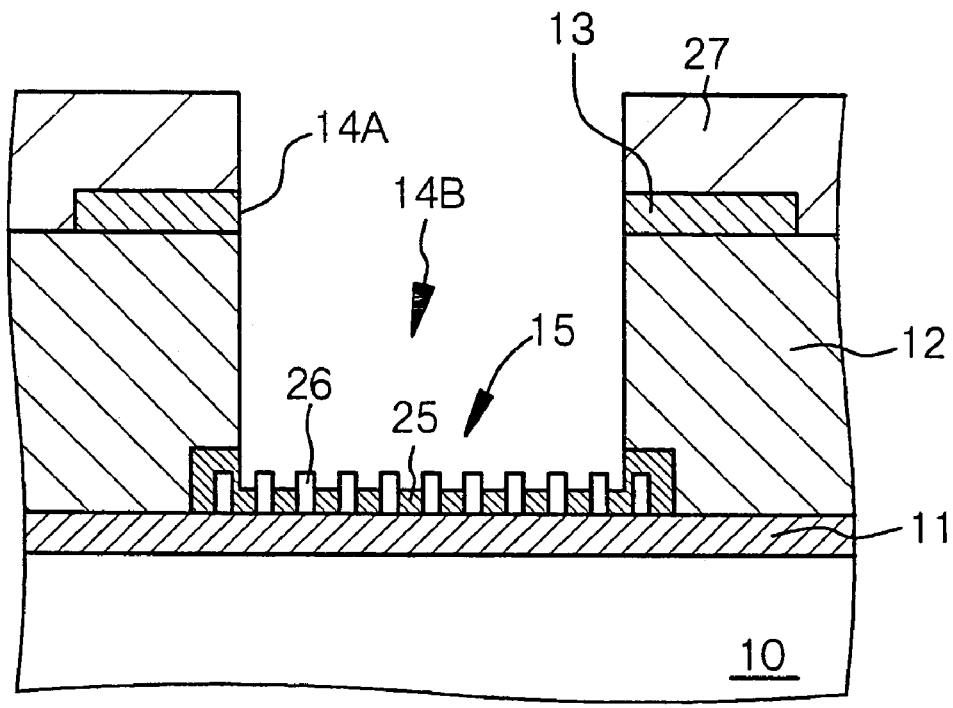
FIGS. 18A and 18B, following
Figure 18B:
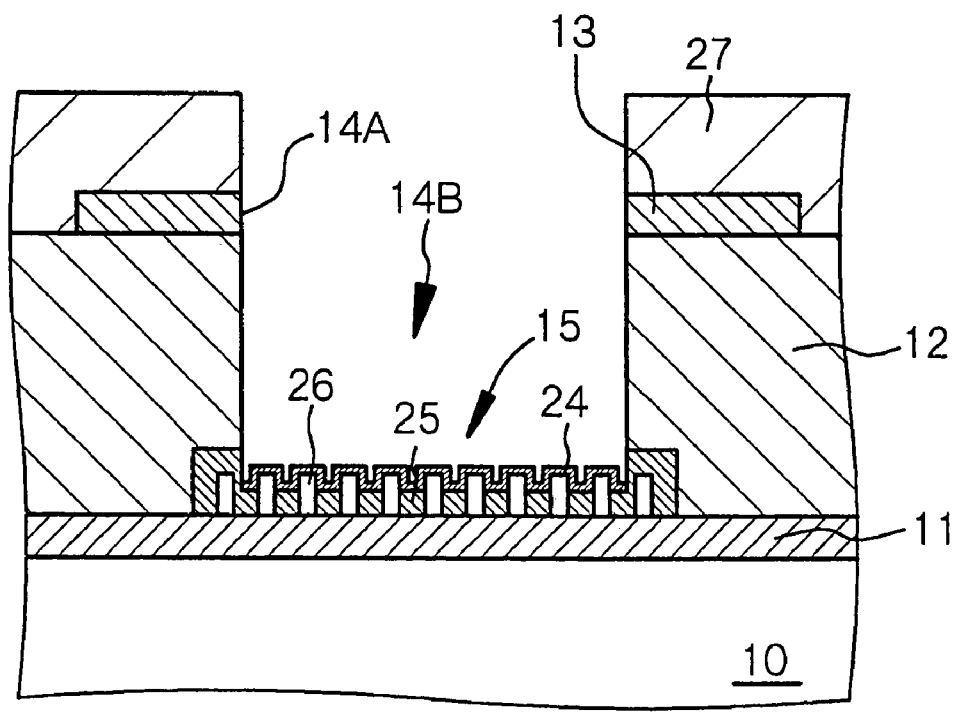

FIG. 18B shows a basic constitution of the field emission device or electron emitting apparatus in Example 19. The field emission device or electron emitting apparatus comprises a cathode electrode (corresponding to an electrically conductive layer) 11 formed on a supporting member 10, and a gate electrode 13 that is formed above the cathode electrode 11 and has an opening portion (first opening portion 14A). The field emission device or electron emitting apparatus further has an electron emitting portion 15 comprising a carbon-group-material layer 23 formed on that portion of the cathode electrode 11 which portion is positioned in the bottom portion of the first opening portion 14A. Further, an insulating layer 12 is formed on the supporting member 10 and the cathode electrode 11, and a second opening portion 14B is formed through the insulating layer 12 and communicates with the first opening portion 14A formed through the gate electrode 13. In Example 19, the electron emitting portion 15 comprises a matrix 25 and carbon nano-tube structures (specifically, carbon-nano-tubes 26) embedded in the matrix 25 such that the top end portions thereof are projected. The matrix 25 is formed of water glass. A fluoride-carbide-containing thin film 24 is formed on the surface of the carbon-group-material layer 23, and the fluoride-carbide-containing thin film 24 is a film formed from a fluorine-containing hydrocarbon gas.

The manufacturing method of the electron emitting apparatus, the manufacturing method of the field emission device and the manufacturing method of the display in Example 19 will be explained below with reference to FIGS. 17A and 17B and FIGS. 18A and 18B.

[Step-1900]

First, a stripe-shaped cathode electrode 11 made of an approximately 0.2 μm thick chromium (Cr) layer is formed on a supporting member 10 made, for example, of a glass substrate, for example, by a sputtering method and an etching technique.

[Step-1910]

Figure 17A:
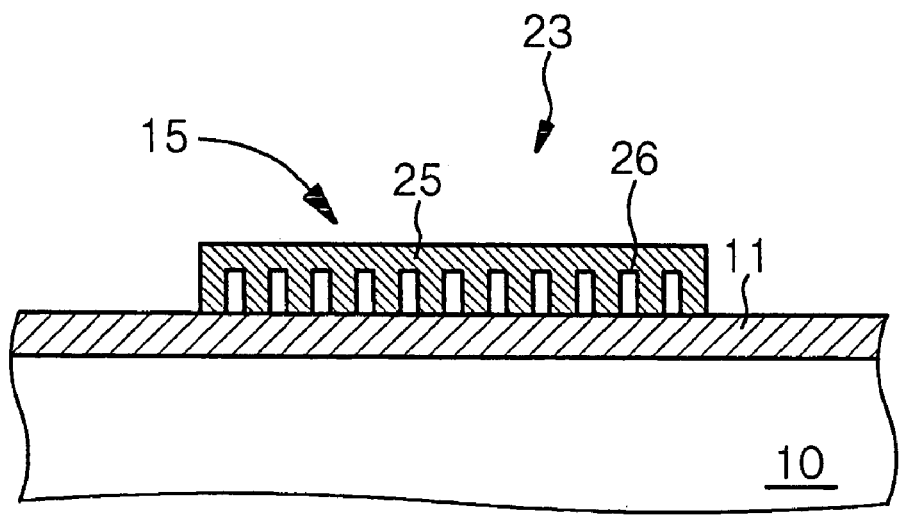
FIGS. 17A and 17B are schematic partial end views of a supporting member, etc., for explaining a cold cathode field emission device of Example 19 or 20.
Figure 17B:
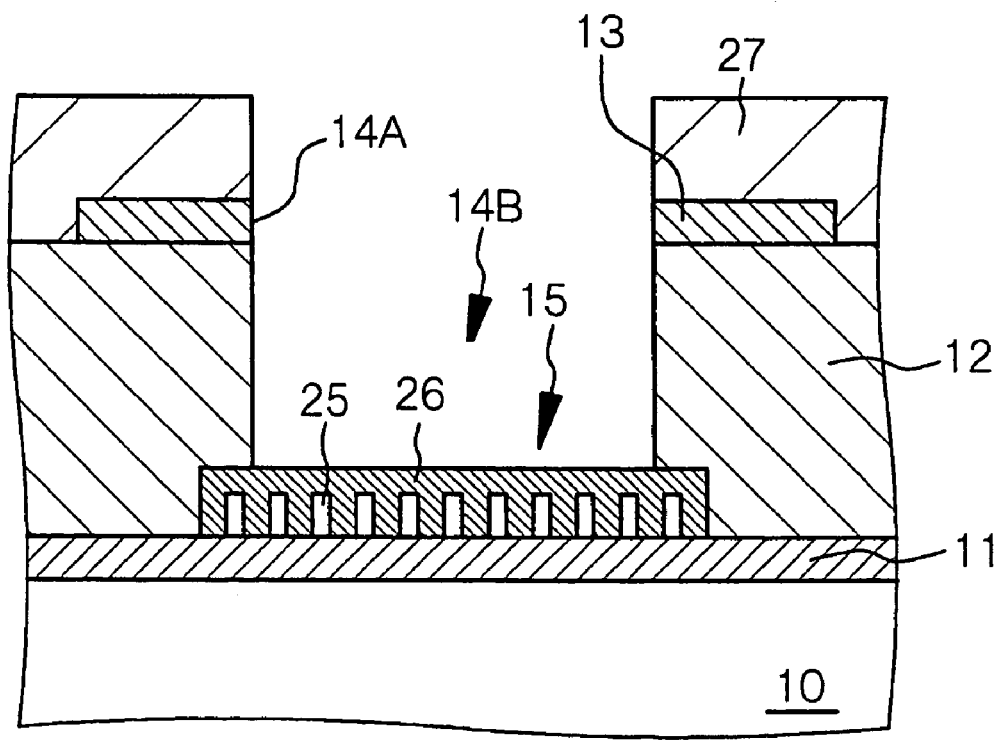

Then, a dispersion of carbon nano-tube structures in an inorganic binder material made of water glass is applied to a predetermined region of the cathode electrode 11 by a screen printing method, the solvent is removed, and the binder material is fired, whereby the electron emitting portion 15 can be obtained (see FIG. 17A). As a firing condition, the firing can be carried out, for example, in dry atmosphere at 400° C. for 30 minutes. The carbon-nano-tubes are prepared by an arc discharge method and have an average diameter of 30 nm and an average length of 1 μm.

[Step-1920]

Then, an insulating layer 12 is formed on the supporting member 10, the cathode electrode 11 and the electron emitting portion 15. Specifically, the insulating layer 12 having a thickness of approximately 1 μm is formed on the entire surface, for example, by a CVD method using TEOS (tetraethoxysilane) as a source gas. The insulating layer 12 can be formed under the same condition as that shown in Table 7.

[Step-1930]

Then, a stripe-shaped gate electrode 13 is formed on the insulating layer 12, and further, a mask layer 27 is formed on the insulating layer 12 and the gate electrode 13. Then, a first opening portion 14A is formed through the gate electrode 13, and further, a second opening portion 14B communicating with the first opening portion 14A formed through the gate electrode 13 is formed through the insulating layer 12 (see FIG. 17B). When the matrix 25 is constituted of a water glass 25, for example, the insulating layer 12 can be etched without etching the matrix 25. That is, the etching selection ratio between the insulating layer 12 and the matrix 25 is approximately infinite. The carbon nano-tubes 26 are therefore not damaged when the insulating layer 12 is etched.

[Step-1940]

Then, part of the matrix 25 formed of the water glass is preferably removed with a sodium hydroxide (NaOH) aqueous solution, to obtain the carbon-nano-tubes 26 in a state where the top end portions thereof are projected from the matrix 25. In this manner, the electron emitting portion 15 having a structure shown in FIG. 18A can be obtained.

Some or all of the carbon nano-tubes 26 may change in their surface state due to the etching of the matrix 25 (for example, oxygen atoms or oxygen molecules are adsorbed to their surfaces), and the carbon nano-tubes 26 are deactivated with respect of electric field emission in some cases. Therefore, it is preferred to subject the electron-emitting portion 15 to a plasma treatment in a hydrogen gas atmosphere. By the plasma treatment, the electron-emitting portion 15 is activated, and the efficiency of emission of electrons from the electron-emitting portion 15 is further improved. Table 11 shows an example of a plasma treatment condition.

TABLE 11

| | |
|---|---|
| Gas to be used | $H_2$ = 100 sccm |
| Source power | 1000 W |
| Power to be applied to supporting member | 50 V |
| Reaction pressure | 0.1 Pa |
| Substrate temperature | 300° C. |

[Step-1950]

Then, in the same manner as in [Step-230] in Example 2, a fluoride-carbide-containing thin film ($CF_x$ thin film) 24 is formed on the surface of the carbon-group-material layer 23 comprising the carbon nano-tubes 26, from a fluorine-containing hydrocarbon gas, thereby to obtain an electron emitting portion 15 comprising the carbon-group-material layer 23 and the fluoride-carbide-containing thin film 24 formed on the surface of the carbon-group-material layer 23 (see FIG. 18B).

[Step-1960]

For exposing an opening end portion of the gate electrode 13, preferably, the side wall surface of the second opening portion 14B formed in the insulating layer 12 is allowed to recede by isotropic etching in the same manner as in [Step-860] in Example 8. Then, the mask layer 27 is removed.

[Step-1970]

Then, a display is assembled in the same manner as in [Step-130] in Example 1.

When [Step-330] in Example 3 is carried out in [Step-1950], the electron emitting apparatus according to the third-B aspect of the present invention and the manufacturing method thereof, the field emission device according the sixth-B aspect of the present invention and the display according to the sixth-B aspect of the present invention can be obtained, and it comes to mean that the manufacturing method of a field emission device and the manufacturing method of a display according to the sixth-B aspect of the present invention are carried out.

Alternatively, when [Step-1900], [Step-1910], [Step-1940], [Step-1950] and [Step-1970] are carried out, there are obtained the electron emitting apparatus according to the second-B aspect of the present invention and the manufacturing method thereof, the field emission device according to the second-B aspect of the present invention and the manufacturing method thereof, and the display according to the second-B aspect of the present invention and the manufacturing method thereof.

Alternatively, when [Step-1900], [Step-1910], [Step-1940], [Step-330] and [Step-1970] are carried out, there can be obtained the electron emitting apparatus according to the third-B aspect of the present invention and the manufacturing method thereof, the field emission device according to the third-B aspect of the present invention and the manufacturing method thereof, and the display according to the third-B aspect of the present invention and the manufacturing method thereof.

Alternatively, when [Step-1800], [Step-1910], [Step-1830], [Step-1940], [Step-1950] and [Step-1840] are carried out, the electron emitting apparatus and the display according to the fifth-B aspect of the present invention can be obtained, and it comes to mean that the manufacturing method of a field emission device according to the eighth-B aspect of the present invention and the manufacturing method of a display according to the eighth-B aspect of the present invention are carried out.

Alternatively, when [Step-1800], [Step-1910], [Step-1830], [Step-1940], [Step-330] and [Step-1840] are carried out, the electron emitting apparatus and the display according to the sixth-B aspect of the present invention can be obtained, and it comes to mean that the manufacturing method of a field emission device according to the ninth-B aspect of the present invention and the manufacturing method of a display according to the ninth-B aspect of the present invention are carried out.

EXAMPLE 20

Example 20 is concerned with the electron emitting apparatus according to the second-B aspect of the present invention, the manufacturing method of an electron emitting apparatus according to the second-C aspect of the present invention, the field emission device according to the fifth-B aspect of the present invention, the manufacturing method of a field emission device according to the fifth-C aspect of the present invention, the display according to the fifth-B aspect of the present invention, and the manufacturing method of a display according to the fifth-C aspect of the present invention.

The electron emitting apparatus, the field emission device and the display in Example 20 have substantially the same structures as those of the electron emitting apparatus and the field emission device having a schematic partial end view shown in FIG. 18B in Example 19 and of the display having a schematic partial end view shown in FIG. 7 in Example 5, so that the detailed explanations thereof will be omitted. In Example 20, the electron emitting portion 15 comprises a matrix 25 and carbon nano-tube structures (specifically, carbon-nano-tubes 26) embedded in the matrix 25 in a state where the top end portions thereof are projected, and the matrix 25 is made of a metal oxide having electrical conductivity (specifically, indium-tin oxide, ITO). A fluoride-carbide-containing thin film 24 is formed on the surface of a carbon-group-material layer 23, and the fluoride-carbide-containing thin film 24 is a film formed from a fluorine-containing hydrocarbon gas.

The manufacturing method of the field emission device will be explained below with reference again to FIGS. 17A and 17B and FIGS. 18A and 18B.

[Step-2000]

First, a stripe-shaped cathode electrode 11 made of an approximately 0.2 μm thick chromium (Cr) layer is formed on a supporting member 10 made, for example, of a glass substrate, for example, by a sputtering method and an etching technique.

[Step-2010]

Then, a metal compound solution consisting of an organic acid metal compound in which the carbon nano-tube structures are dispersed is applied onto the cathode electrode 11, for example, by a spray method. Specifically, a metal compound solution shown in Table 12 is used. In the metal compound solution, the organic tin compound and the organic indium compound are in a state where they are dissolved in an acid (for example, hydrochloric acid, nitric acid or sulfuric acid). The carbon nano-tube is produced by an arc discharge method and has an average diameter of 30 nm and an average length of 1 μm. In the application, the supporting member is heated to 70–150° C. Atmospheric atmosphere is employed as an application atmosphere. After the application, the supporting member is heated for 5 to 30 minutes to fully evaporate butyl acetate off. When the supporting member is heated during the application as described above, the applied solution begins to dry before the carbon nano-tubes are self-leveled toward a horizontal direction of the surface of the cathode electrode. As a result, the carbon nano-tube can be arranged on the surface of the cathode electrode in a state where the carbon nano-tube is not in a level position. That is, the carbon nano-tube can be aligned in the direction in which the top portion of the carbon nano-tube faces the anode electrode, in other words, the carbon nano-tube comes close to the normal direction of the supporting member. The metal compound solution having a composition shown in Table 12 may be prepared beforehand, or a metal compound solution containing no carbon nano-tubes may be prepared beforehand and the carbon nano-tubes and the metal compound solution may be mixed before the application. For improving dispersibility of the carbon nano-tubes, ultrasonic wave may be applied when the metal compound solution is prepared.

TABLE 12

| | |
|---|---|
| Organic tin compound and organic indium compound | 0.1–10 parts by weight |
| Dispersing agent (sodium dodecylsulfate) | 0.1–5 parts by weight |
| Carbon nano-tubes | 0.1–20 parts by weight |
| Butyl acetate | Balance |

When a solution of an organic tin compound dissolved in an acid is used as an organic acid metal compound solution, tin oxide is obtained as a matrix. When a solution of an organic indium compound dissolved in an acid is used, indium oxide is obtained as a matrix. When a solution of an organic zinc compound dissolved in an acid is used, zinc oxide is obtained as a matrix. When a solution of an organic antimony compound dissolved in an acid is used, antimony oxide is obtained as a matrix. When a solution of an organic antimony compound and an organic tin compound dissolved in an acid is used, antimony-tin oxide is obtained as a matrix. Further, when an organic tin compound is used as an organic metal compound solution, tin oxide is obtained as a matrix. When an organic indium compound is used, indium oxide is obtained as a matrix. When an organic zinc compound is used, zinc oxide is obtained as a matrix. When an organic antimony compound is used, antimony oxide is obtained as a matrix. When an organic antimony compound and an organic tin compound are used, antimony-tin oxide is obtained as a matrix. Alternatively, a solution of metal chloride (for example, tin chloride or indium chloride) may be used.

After the metal compound solution is dried, salient convexo-concave shapes may be formed on the surface of the metal compound layer in some cases. In such cases, it is desirable to apply the metal compound solution again on the metal compound layer without heating the supporting member.

[Step-2020]

Then, the metal compound constituted of the organic acid metal compound is fired, to give an electron emitting portion 15 having the carbon nano-tubes 26 fixed onto the surface of the cathode electrode 11 with the matrix 25 (which is specifically a metal oxide, and more specifically, ITO) containing metal atoms (specifically, In and Sn) constituting the organic acid metal compound. The firing is carried out in an atmospheric atmosphere at 350° C. for 20 minutes. The thus-obtained matrix 25 had a volume resistivity of $5 \times 10^{-7}$ ω·m. When the organic acid metal compound is used as a starting material, the matrix 25 made of ITO can be formed at a low firing temperature of as low as 350° C. The organic acid metal compound solution may be replaced with an organic metal compound solution. When a solution of metal chloride (for example, tin chloride and indium chloride) is used, the matrix 25 made of ITO is formed while the tin chloride and indium chloride are oxidized by the firing.

[Step-2030]

Then, a resist layer is formed on the entire surface, and the circular resist layer having a diameter, for example, of 10 μm is retained above a desired region of the cathode electrode 11. The matrix 25 is etched with hydrochloric acid having a temperature of 10 to 60° C. for 1 to 30 minutes, to remove an unnecessary portion of the electron emitting portion. Further, when the carbon nano-tubes still remain in a region different from the desired region, the carbon nano-tubes are etched by an oxygen plasma etching treatment under a condition shown in Table 13. A bias power may be 0 W, i.e., direct current, while it is desirable to apply the bias power. The supporting member may be heated, for example, to approximately 80° C.

TABLE 13

| Apparatus to be used | RIE apparatus |
| --- | --- |
| Gas to be introduced | Gas containing oxygen |
| Plasma exciting power | 500 W |
| Bias power | 0–150 W |
| Treatment time period | at least 10 seconds |

Alternatively, the carbon nano-tubes can be etched by a wet etching treatment under a condition shown in Table 14.

TABLE 14

| Solution to be used | $KMnO_4$ |
| --- | --- |
| Temperature | 20–120° C. |
| Treatment time period | 10 seconds–20 minutes |

Then, the resist layer is removed, whereby a structure shown in FIG. 17A can be obtained. It is not necessarily required to retain a circular electron emitting portion having a diameter of 10 μm. For example, the electron-emitting portion may be retained on the cathode electrode 11.

The process may be carried out in the order of [Step-2010], [Step-2030] and [Step-2020]. [Step-2040]

Then, an insulating layer 12 is formed on the supporting member 10, the cathode electrode 11 and the electron emitting portion 15. Specifically, the insulating layer 12 having a thickness of approximately 1 μm is formed on the entire surface, for example, by a CVD method using TEOS (tetraethoxysilane) as a source gas. The insulating layer 12 can be formed under the same condition as that shown in Table 7.

[Step-2050]

Then, a stripe-shaped gate electrode 13 is formed on the insulating layer 12, and further, a mask layer 27 is formed on the insulating layer 12 and the gate electrode 13. Then, a first opening portion 14A is formed through the gate electrode 13, and further, a second opening portion 14B communicating with the first opening portion 14A formed through the gate electrode 13 is formed through the insulating layer 12 (see FIG. 17B). When the matrix 25 is constituted of a metal oxide, for example, ITO, the insulating layer 12 can be etched without etching the matrix 25. That is, the etching selection ratio between the insulating layer 12 and the matrix 25 is approximately infinite. The carbon nano-tubes 26 are therefore not damaged when the insulating layer 12 is etched.

[Step-2060]

Then, preferably, part of the matrix 25 is removed under a condition shown in Table 15, to obtain the carbon nano-tubes 26 in a state where top portions thereof are projected from the matrix 25. In this manner, the electron emitting portion 15 having a structure shown in FIG. 18A can be obtained.

TABLE 15

| Etching solution | Hydrochloric acid |
| --- | --- |
| Etching time period | 10 seconds–30 seconds |
| Etching temperature | 10–60° C. |

Some or all of the carbon nano-tubes 26 may change in their surface state due to the etching of the matrix 25 (for example, oxygen atoms or oxygen molecules or fluorine atoms are adsorbed to their surfaces), and the carbon nano-tubes 26 are deactivated with respect of electric field emission in some cases. Therefore, it is preferred to subject the electron emitting portion 15 to a plasma treatment in a hydrogen gas atmosphere. By the plasma treatment, the electron emitting portion 15 is activated, and the efficiency of emission of electrons from the electron emitting portion 15 is further improved. A condition of the plasma treatment may be the same condition as those shown in Table 11.

[Step-2070]

Then, in the same manner as in [Step-230] in Example 2, a fluoride-carbide-containing thin film ($CF_x$ thin film) 24 is formed on the surface of the carbon-group-material layer 23 comprising the carbon nano-tubes 26, from a fluorine-containing hydrocarbon gas, thereby to obtain an electron emitting portion 15 comprising the carbon-group-material layer 23 and the fluoride-carbide-containing thin film 24 formed on the surface of the carbon-group-material layer 23.

[Step-2080]

For exposing an opening end portion of the gate electrode 13, preferably, the side wall surface of the second opening portion 14B formed in the insulating layer 12 is allowed to recede by isotropic etching in the same manner as in [Step-860] in Example 8. Then, the mask layer 27 is removed. In this manner, the field emission device shown in FIG. 18B can be completed.

[Step-2090]

Then, a display is assembled in the same manner as in [Step-130] in Example 1.

When [Step-330] in Example 3 is carried out in [Step-2070], the electron emitting apparatus according to the third-C aspect of the present invention and the manufacturing method thereof, the field emission device according to the sixth-B aspect of the present invention, and the display according to the sixth-B aspect of the present invention can be obtained, and it comes to mean that the manufacturing method of a field emission device and the manufacturing method of a display according to the sixth-C aspect of the present invention are carried out.

Alternatively, when [Step-2000] to [Step-2030], [Step-2060], [Step-2070] and [Step-2090] are carried out, the electron emitting apparatus according to the second-B aspect of the present invention, the field emission device according to the second-B aspect of the present invention and the display according to the second-B aspect of the present invention can be obtained, and it comes to mean that the manufacturing method of an electron emitting apparatus according to the second-C aspect of the present invention, the manufacturing method of a field emission device according to the second-C aspect of the present invention and the manufacturing method of a display according to the second-C aspect of the present invention are carried out.

Alternatively, when [Step-2000] to [Step-2030], [Step-2060], [Step-330] and [Step-2090] are carried out, the electron emitting apparatus according to the third-B aspect of the present invention, the field emission device according to the third-B aspect of the present invention and the display according to the third-B aspect of the present invention can be obtained, it comes to mean that the manufacturing method of an electron emitting apparatus according to the third-C aspect of the present invention, the manufacturing method of a field emission device according to the third-C aspect of the present invention and the manufacturing method of a display according to the third-C aspect of the present invention are carried out.

Alternatively, when [Step-1800], [Step-2010] to [Step-2030], [Step-1830], [Step-2060], [Step-2070] and [Step-1840] are carried out, the electron emitting apparatus according to the second-B aspect of the present invention, the field emission device according to the fifth-B aspect of the present invention and the display according to the fifth-B aspect of the present invention can be obtained, and it comes to mean that the manufacturing method of an electron emitting apparatus according to the second-C aspect of the present invention, the manufacturing method of a field emission device according to the eighth-C aspect of the present invention and the manufacturing method of a display according to the eighth-C aspect of the present invention are carried out.

Alternatively, when [Step-1800], [Step-2010] to [Step-2030], [Step-1830], [Step-2060], [Step-330] and [Step-1840] are carried out, the electron emitting apparatus according to the third-B aspect of the present invention, the field emission device according to the sixth-B aspect of the present invention and the display according to the sixth-B aspect of the present invention can be obtained, and it comes to mean that the manufacturing method of an electron emitting apparatus according to the third-C aspect of the present invention, the manufacturing method of a field emission device according to the ninth-C aspect of the present invention and the manufacturing method of a display according to the ninth-C aspect of the present invention are carried out.

While the present invention has been explained on the basis of Examples, the present invention shall not be limited thereto. The constitutions and structures explained with regard to the anode panel, the cathode panel, the displays and the field emission devices in Examples are given as examples and may be modified as required. The manufacturing method, various conditions and materials explained with regard to the anode panel, the cathode panel, the displays and the field emission devices are given as examples and may be modified as required. Further, the various materials used in the manufacture of the anode panels and the cathode panels are also given as examples and may be changed as required. With regard to the display, color displays are explained as examples, while the display may be a monochromatic display.

A variant of the "two-electrodes" type display explained in Examples 1 to 4 will be explained below. This display variant has a schematic partial cross-sectional view as shown in FIG. 1. In the display variant, a cathode electrode 11 and an anode electrode 33 have the form of a stripe and have a structure in which the projection image of the stripe-shaped cathode electrode 11 and the projection image of the stripe-shaped anode electrode 33 cross each other at right angles. Specifically, the cathode electrode 11 extends in the direction perpendicular to the paper surface of FIG. 1, and the anode electrode 33 extends rightward and leftward on the paper surface of the drawing. In a cathode panel CP of the above display variant, a great number of electron emitting portions constituted of a plurality of the above field emission devices each are formed in an effective field in the form of a two-dimensional matrix. It is not required to provide a switching element between the cathode electrode and a cathode-electrode control circuit 40A.

In the above display variant, an electric field formed by the anode electrode 33 causes the electron emitting portion 15 to emit electrons on the basis of a quantum tunnel effect, and the electrons are drawn to the anode electrode 33 to collide with a phosphor layer 31. That is, the display is driven by a so-called simple matrix method in which electrons are emitted from the electron emitting portion 15 positioned in an overlap region where the projection images of the anode electrode 33 and the cathode electrode 11 overlap (a cathode electrode/anode electrode overlap region). Specifically, a relatively negative voltage is applied to the cathode electrode 11 from the cathode-electrode control circuit 40A, and a relatively positive voltage is applied to the anode electrode 33 from an anode-electrode control circuit 42. As a result, electrons are selectively emitted into a vacuum space from the electron emitting portion 15 positioned in the anode electrode/cathode electrode overlap region of a row-selected cathode electrode 11 and a column-selected anode electrode 33 (or a column-selected cathode electrode 11 and a row-selected anode electrode 33). The electrons are drawn to the anode electrode 33, collide with the phosphor layer 31 constituting the anode panel AP, excite the phosphor layer 31, and cause the phosphor layer 31 to emit light.

For forming the gate electrode, there may be employed other method in which a metal layer which is in the form of a band and has a plurality of opening portions formed therein is provided in advance, a gate electrode supporting members composed of an insulating material in the form of, for example, a band are formed on the supporting member 10 in advance, and the metal layer is arranged above the carbon-group-material layer or the selective-growth region such that the metal layer is in contact with the top surfaces of the gate electrode supporting members. In this case, the selective-growth region and the carbon-group-material layer may be formed before the arrangement of the gate electrode, or the selective-growth region and the carbon-group-material layer may be formed after the arrangement of the gate electrode. Otherwise, the selective-growth region may be formed before the arrangement of the gate electrode, and the carbon-group-material layer may be formed after the arrangement of the gate electrode. In these cases, the selective-growth region 20 may not be formed right below the first opening portion 14A. In these case, the field emission device or the display according to any one of the fourth to sixth aspects of the present invention can be obtained, and it comes to mean that the manufacturing method of a field emission device and the manufacturing method of a display according to any one of the seventh to ninth aspects of the present invention are carried out.

Figure 19:
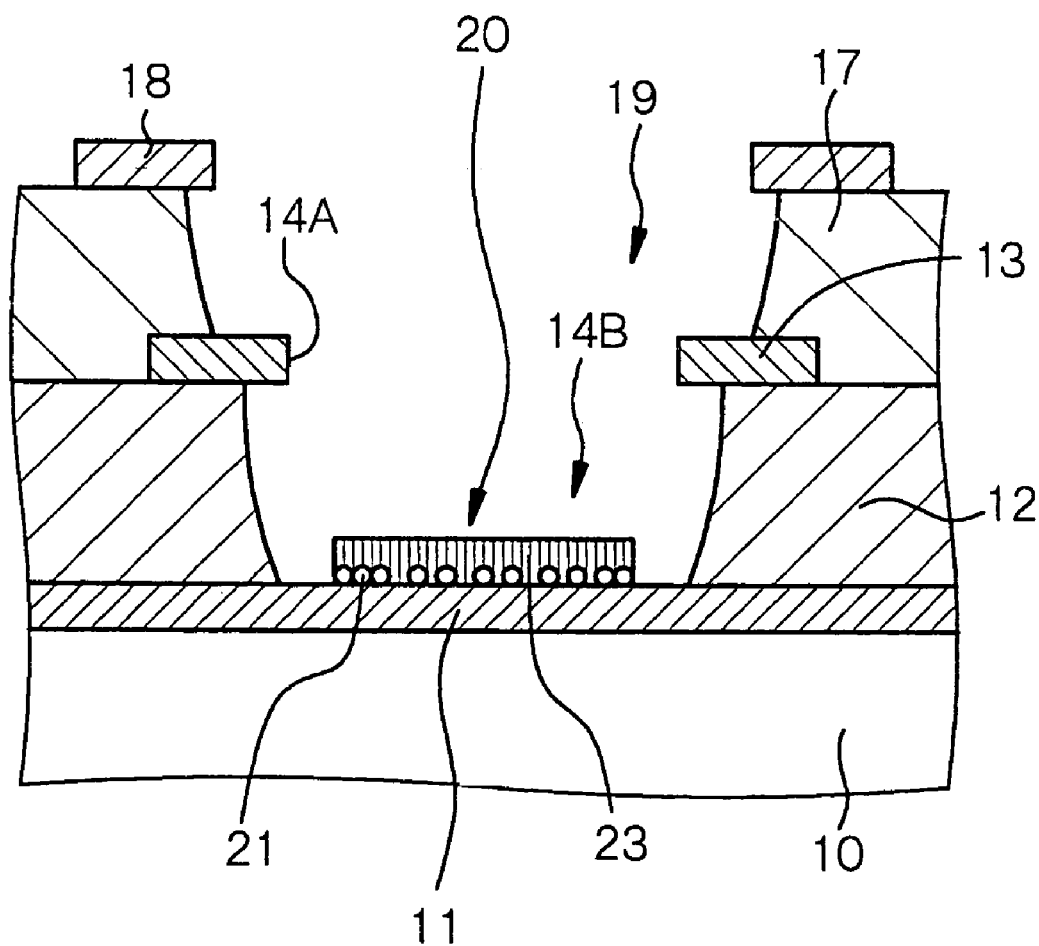
FIG. 19 is a schematic partial end view of a cold cathode field emission device having a focus electrode in the present invention.
Figure 20:
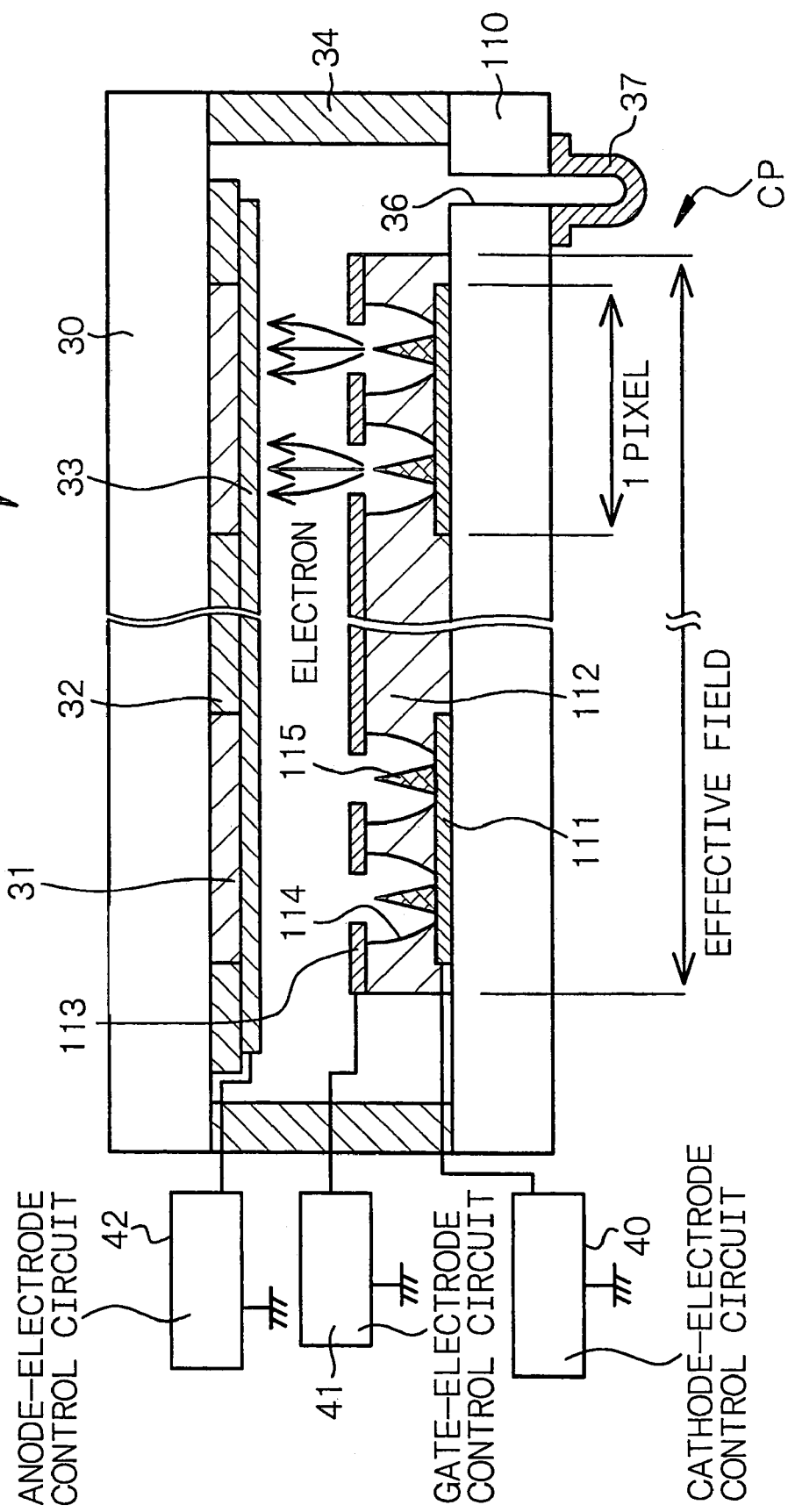
FIG. 20 is a schematic partial end view of a conventional cold cathode field emission display having a Spindt type cold cathode field emission device.

The field emission device of the present invention may have a constitution in which a second insulating layer 17 is further formed in the gate electrode 13 and the insulating layer 12, and a focus electrode 18 is formed on the second insulating layer 17. FIG. 19 shows a schematic partial end view of the thus-constituted field emission device. The second insulating layer 17 has a third opening portion 19 communicating with the first opening portion 14A. The focus electrode 18 may be formed as follows. For example, in [Step-810] in Example 8, the gate electrode 13 in the form of a stripe is formed on the insulating layer 12, then, the second insulating layer 17 is formed, then, a patterned focus electrode 18 is formed on the second insulating layer 17, the third opening portion 19 is formed in the focus electrode 18 and the second insulating layer 17, and further, the first opening portion 14A is formed in the gate electrode 13.

Not only the focus electrode is formed by the above method, but also the focus electrode can be formed by forming an insulating film made, for example, of $SiO_2$ on each surface of a metal sheet made, for example, of 42% Ni—Fe alloy having a thickness of several tens micrometers, and then forming the opening portions in regions corresponding to pixels by punching or etching. And, the cathode panel, the metal sheet and the anode panel are stacked, a frame is arranged in circumferential portions of the two panels, and a heat treatment is carried out to bond the insulating film formed on one surface of the metal sheet and the insulating layer 12 and to bond the insulating film formed on the other surface of the metal sheet and the anode panel, whereby these members are integrated, followed by evacuating and sealing. Whereby, the display can be also completed.

The gate electrode can be formed so as to have a form in which the effective field is covered with one sheet of an electrically conductive material (having a first opening portion). In this case, a positive voltage is applied to the gate electrode. And, a switching element constituted, for example, of TFT is provided between the cathode electrode constituting a pixel and the cathode-electrode control circuit, and the voltage application state to the cathode electrode constituting the pixel is controlled by the operation of the above switching element, to control the light emission state of the pixel.

Alternatively, the cathode electrode can be formed so as to have a form in which the effective filed is covered with one sheet of an electrically conductive material. In this case, a voltage is applied to the cathode electrode. And, a switching element constituted, for example, of TFT is provided between the gate electrode constituting a pixel and the gate-electrode control circuit, and the voltage application state to the gate electrode constituting the pixel is controlled by the operation of the switching element, to control the light emission state of the pixel.

The anode electrode may be an anode electrode having a form in which the effective field is covered with one sheet-shaped electrically conductive material or may be an anode electrode having a form in which anode electrode units each of which corresponds to one or a plurality of electron emitting portions or one or a plurality of pixels are gathered. When the anode electrode has the former constitution, the anode electrode can be connected to the anode-electrode control circuit. When the anode electrode has the latter constitution, for example, each anode electrode unit can be connected to the anode-electrode control circuit.

The electron emitting apparatus of the present invention can be applied to a device generally called a surface-conduction-type electron emitting apparatus. The surface-conduction-type electron emitting apparatus comprises a supporting member made, for example, of glass and pairs of electrodes formed on the supporting member. The electrode is composed of an electrically conductive material such as tin oxide ($SnO_2$), gold (Au), indium oxide ($In_2O_3$)/tin oxide ($SnO_2$), carbon, palladium oxide (Pod), etc. The pair of the electrodes has a very small area and is arranged at a predetermined interval (gap). The pairs of the electrodes are formed in the form of a matrix. And, the surface-conduction-type electron emitting apparatus has a constitution in which a wiring in the row direction is connected to one of each pair of the electrodes and a wiring in the column direction is connected to the other of each pair of the electrodes. In the surface-conduction-type electron emitting apparatus, a selective-growth region is formed on the surface of each pair of the electrodes (corresponding to the electrically conductive layer), and the electron emitting portion comprising the carbon-group-material layer is formed on the selective-growth region. When a voltage is applied to a pair of the electrodes, an electric field is exerted on the carbon-group-material layers opposed to each other through the gap, and electrons are emitted from the carbon-group-material layer. Such electrons are attracted toward the anode panel to collide with the phosphor layer on the anode panel, so that the phosphor layer is excited to emit light and gives a desired image.

In the present invention, the electron emitting portion or the carbon-group-material layer exhibits a kind of water repellency. As a result, it is made possible to inhibit the adherence and adsorption of a gas or gaseous substance released from various members constituting the cathode electrode and the display, particularly water, to/on the electron emitting portion (specifically, the carbon-group-material layer). Therefore, the deterioration of properties of the electron emitting portion can be reliably prevented.

Further, since the electron emitting portion comprises the carbon-group-material layer, there can be obtained a cold cathode field emission device or electron emitting apparatus having a low threshold voltage and high electron emission efficiency, and there can be also obtained a cold cathode field emission display that performs with a low power consumption and accomplishes high-quality images. Further, even when the number of cold cathode field emission devices to be formed is increased to a great extent due to an increase in the area of the effective field, the electron emitting portions of the cold cathode field emission devices can be highly accurately formed, so that the electron emission efficiency of the electron emitting portions can be made uniform over the entire area of the effective field, and there can be manufactured a cold cathode field emission display that has almost no non-uniformity in luminescence efficiency and accomplishes high-quality images. Further, since the carbon-group-material layer can be formed at a relatively low temperature, a glass substrate can be used as a supporting member, and the production cost can be decreased.

In the present invention, further, when the selective-growth region is formed, the electron emitting portion comprising the carbon-group-material layer can be formed in a predetermined portion of the electrically conductive layer or the cathode electrode, and that it is no longer necessary to pattern the carbon-group-material layer for adjusting the carbon-group-material layer to a predetermined form. Further, when the carbon nano-tube structures are employed to constitute the electron emitting portion, the electron emitting portion can be easily formed.

The invention claimed is:

1. A manufacturing method of an electron emitting apparatus comprising the steps of;
   (A) forming a carbon-group-material layer on an electrically conductive layer, and
   (B) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer,
   in which a dispersion of carbon-nano-tube structures in a binder material is applied onto the electrically conductive layer and then the binder material is fired or cured to form the carbon-group-material layer in the step (A), and
   in which a metal compound solution in which carbon-nano-tube structures are dispersed is applied onto the electrically conductive layer, and then the metal compound is fired, to form the carbon-group-material layer in the step (A).

2. The manufacturing method of an electron emitting apparatus according to claim 1, in which the carbon-group-material layer is formed on the electrically conductive layer from a hydrocarbon gas in the step (A).

3. The manufacturing method of an electron emitting apparatus according to claim 2, in which further provided is the step of forming a selective-growth region on the electrically conductive layer before the formation of the carbon-group-material layer.

4. A manufacturing method of an electron emitting apparatus comprising the steps of;
  (A) forming a carbon-group-material layer on an electrically conductive layer, and
  (B) terminating the surface of the carbon-group-material layer with a fluorine-containing hydrocarbon gas, thereby to obtain an electron emitting portion comprising the carbon-group-material layer whose surface is terminated with fluorine atoms,
  in which a dispersion of carbon-nano-tube structures in a binder material is applied onto the electrically conductive layer and then the binder material is fired or cured to form the carbon-group-material layer in the step (A), and
  in which a metal compound solution in which carbon-nano-tube structures are dispersed is applied onto the electrically conductive layer, and then the metal compound is fired, to form the carbon-group-material layer in the step (A).

5. The manufacturing method of an electron emitting apparatus according to claim 4, in which the carbon-group-material layer is formed on the electrically conductive layer from a hydrocarbon gas in the step (A).

6. The manufacturing method of an electron emitting apparatus according to claim 5, in which further provided is the step of forming a selective-growth region on the electrically conductive layer before the formation of the carbon-group-material layer.

7. A manufacturing method of a cold cathode field emission device comprising the steps of;
  (A) forming a cathode electrode on a supporting member,
  (B) forming a carbon-group-material layer on the cathode electrode, and
  (C) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer,
  in which a dispersion of carbon nano-tube structures in a binder material is applied onto the cathode electrode and the binder material is fired or cured to form the carbon-group-material layer in the step of forming the electron emitting portion, and
  in which a metal compound solution in which carbon nano-tube structures are dispersed is applied onto the cathode electrode and then the metal compound is fired, to form the carbon-group-material layer in the step of forming the electron emitting portion.

8. The manufacturing method of a cold cathode field emission device according to claim 7, in which the carbon-group-material layer is formed on the cathode electrode from a hydrocarbon gas in the step (B).

9. The manufacturing method of a cold cathode field emission device according to claim 8, in which interposed between the steps (A) and (B) is the step of forming a selective-growth region on the cathode electrode, and in the (B), the electron emitting portion is formed on the selective-growth region in place of forming the electron emitting portion on the cathode electrode.

10. A manufacturing method of a cold cathode field emission device comprising the steps of;
  (A) forming a cathode electrode on a supporting member,
  (B) forming a carbon-group-material layer on the cathode electrode, and
  (C) terminating the surface of the carbon-group-material layer with a fluorine-containing hydrocarbon gas, thereby to obtain an electron emitting portion comprising the carbon-group-material layer having the surface terminated with fluorine atoms,
  in which a dispersion of carbon nano-tube structures in a binder material is applied onto the cathode electrode and the binder material is fired or cured to form the carbon-group-material layer in the step of forming the electron emitting portion, and
  in which a metal compound solution in which carbon nano-tube structures are dispersed is applied onto the cathode electrode and then the metal compound is fired, to form the carbon-group-material layer in the step of forming the electron emitting portion.

11. The manufacturing method of a cold cathode field emission device according to claim 10, in which the carbon-group-material layer is formed on the cathode electrode from a hydrocarbon gas in the step (B).

12. The manufacturing method of a cold cathode field emission device according to claim 11, in which interposed between the steps (A) and (B) is the step of forming a selective-growth region on the cathode electrode, and in the (B), the electron emitting portion is formed on the selective-growth region in place of forming the electron emitting portion on the cathode electrode.

13. A manufacturing method of a cold cathode field emission device comprising the steps of;
  (A) forming a cathode electrode on a supporting member,
  (A-1) forming a selective-growth region on the cathode electrode,
  (B) forming an insulating layer on the supporting member and the cathode electrode, an insulating layer being formed on the supporting member, the selective-growth region and the cathode electrode,
  (C) forming a gate electrode having an opening portion on the insulating layer,
  (D) forming a second opening portion through the insulating layer, said second opening portion communicating with the opening portion formed through the gate electrode, thereby to expose the cathode electrode in a bottom portion of the second opening portions, a second opening portion being formed through the insulating layer, said second opening portion communicating with the opening portion formed through the gate electrode, thereby to expose the selective-growth region in the bottom portion of the second opening portion, and
  (E) forming an electron emitting portion on the cathode electrode exposed in the bottom portion of the second opening portion, the electron emitting portion being formed on the selective-growth region exposed in the bottom portion of the second opening portion,
  in which the electron emitting portion comprises a carbon-group-material layer, and the step of forming the electron emitting portion comprises the step of forming the carbon-group-material layer from a hydrocarbon gas and a fluorine-containing hydrocarbon gas.

14. The manufacturing method of a cold cathode field emission device according to claim 13, in which
interposed between the step (D) and the step (E) is the step of forming a selective-growth region on the cathode electrode exposed in the bottom portion of the second opening portion, and
the electron emitting portion is formed on the selective-growth region in the step (E) in place of forming the electron emitting portion on the cathode electrode exposed in the bottom portion of the second opening portion.

15. A manufacturing method of a cold cathode field emission device comprising the steps of;
(A) forming a cathode electrode on a supporting member,
(A-1) forming a selective-growth region on the cathode electrode,
(B) forming an insulating layer on the supporting member and the cathode electrode, an insulating layer being formed on the supporting member, the selective-growth region and the cathode electrode,
(C) forming a gate electrode having an opening portion on the insulating layer,
(D) forming a second opening portion through the insulating layer, said second opening portion communicating with the opening portion formed through the gate electrode, thereby to expose the cathode electrode in a bottom portion of the second opening portions, a second opening portion being formed through the insulating layer, said second opening portion communicating with the opening portion formed through the gate electrode, thereby to expose the selective-growth region in the bottom portion of the second opening portion, and
(E) forming an electron emitting portion on the cathode electrode exposed in the bottom portion of the second opening portion, a carbon-group-material layer being formed from a hydrocarbon gas, the electron emitting portion being formed on the selective-growth region exposed in the bottom portion of the second opening portion,
in which the electron emitting portion comprises a carbon-group-material layer and a fluoride-carbide-containing thin film formed on the surface of the carbon-group-material layer, and the step of forming the electron emitting portion comprises the step of forming the fluoride-carbide-containing thin film on the surface of the formed carbon-group-material layer from a fluorine-containing hydrocarbon gas.

16. The manufacturing method of a cold cathode field emission device according to claim 15, in which
interposed between the step (D) and the step (E) is the step of forming a selective-growth region on the cathode electrode exposed in the bottom portion of the second opening portion, and
the electron emitting portion is formed on the selective-growth region in the step (E) in place of forming the electron emitting portion on the cathode electrode exposed in the bottom portion of the second opening portion.

17. The manufacturing method of a cold cathode field emission device according to claim 15, in which a dispersion of carbon nano-tube structures in a binder material is applied onto the cathode electrode and the binder material is fired or cured to form the carbon-group-material layer in the step of forming the electron emitting portion.

18. The manufacturing method of a cold cathode field emission device according to claim 15, in which a metal compound solution in which carbon nano-tube structures are dispersed is applied onto the cathode electrode and then the metal compound is fired, to form the carbon-group-material layer in the step of forming the electron emitting portion.

19. A manufacturing method of a cold cathode field emission device comprising the steps of;
(A) forming a cathode electrode on a supporting member,
(A-1) forming a selective-growth region on the cathode electrode,
(B) forming an insulating layer on the supporting member and the cathode electrodes, an insulating layer being formed on the supporting member, the selective-growth region and the cathode electrode,
(C) forming a gate electrode having an opening portion on the insulating layer,
(D) forming a second opening portion through the insulating layer, said second opening portion communicating with the opening portion formed through the gate electrode, thereby to expose the cathode electrode in a bottom portion of the second opening portion, a second opening portion being formed through the insulating layer, said second opening portion communicating with the opening portion formed through the gate electrode, thereby to expose the selective-growth region in the bottom portion of the second opening portion, and
(E) forming an electron emitting portion on the cathode electrode exposed in the bottom portion of the second opening portion, a carbon-group-material layer being formed from a hydrocarbon gas, the electron emitting portion is formed on the selective-growth region exposed in the bottom portion of the second opening portion,
in which the electron emitting portion comprises a carbon-group-material layer, and the step of forming the electron emitting portion comprises the step of terminating the surface of the formed carbon-group-material layer with a fluorine-containing hydrocarbon gas.

20. The manufacturing method of a cold cathode field emission device according to claim 19, in which
interposed between the step (D) and the step (E) is the step of forming a selective-growth region on the cathode electrode exposed in the bottom portion of the second opening portion, and
the electron emitting portion is formed on the selective-growth region in the step (E) in place of forming the electron emitting portion on the cathode electrode exposed in the bottom portion of the second opening portion.

21. The manufacturing method of a cold cathode field emission device according to claim 19, in which a dispersion of carbon nano-tube structures in a binder material is applied onto the cathode electrode and the binder material is fired or cured to form the carbon-group-material layer in the step of forming the electron emitting portion.

22. The manufacturing method of a cold cathode field emission device according to claim 19, in which a metal compound solution in which carbon nano-tube structures are dispersed is applied onto the cathode electrode and then the metal compound is fired, to form the carbon-group-material layer in the step of forming the electron emitting portion.

23. A manufacturing method of a cold cathode field emission device comprising the steps of;
(A) forming a cathode electrode on a supporting member,
(B) forming an electron emitting portion on the cathode electrode, and
(C) forming a gate electrode having an opening portion above the electron emitting portion, in which the electron emitting portion comprises a carbon-group-material layer and a fluoride-carbide-containing thin film formed on the surface of the carbon-group-material layer, and the step of forming the electron emitting portion comprises the step of forming the fluoride-carbide-containing thin film on the surface of the formed carbon-group-material layer from a fluorine-containing hydrocarbon gas, in which a dispersion of carbon nano-tube structures in a binder material is applied onto the cathode electrode and the binder material is fired or cured to form the carbon-group-material layer in the step of forming the electron emitting portion, and in which a metal compound solution in which carbon nano-tube structures are dispersed is applied onto the cathode electrode and then the metal compound is fired, to form the carbon-group-material layer in the step of forming the electron emitting portion.

24. The manufacturing method of a cold cathode field emission device according to claim 23, in which the step (B) is followed by forming an insulating layer on the entire surface, and the step (C) is followed by forming a second opening portion through the insulating layer, said second opening portion communicating with the opening portion formed through the gate electrode, thereby to expose the carbon-group-material layer in a bottom portion of the second opening portion.

25. The manufacturing method of a cold cathode field emission device according to claim 23, in which the carbon-group-material layer is formed from a hydrocarbon gas in the step of forming the electron emitting portion.

26. The manufacturing method of a cold cathode field emission device according to claim 25, in which interposed between the step (A) and the step (B) is the step of forming a selective-growth region on the cathode electrode, and the electron emitting portion is formed on the selective-growth region in the step (B) in place of forming the electron emitting portion on the cathode electrode.

27. A manufacturing method of a cold cathode field emission device comprising the steps of;

(A) forming a cathode electrode on a supporting member, (B) forming an electron emitting portion on the cathode electrode, and (C) forming a gate electrode having an opening portion above the electron emitting portion, in which the electron emitting portion comprises a carbon-group-material layer, and the step of forming the electron emitting portion comprises the step of terminating the surface of the formed carbon-group-material layer with a fluorine-containing hydrocarbon gas, in which a dispersion of carbon nano-tube structures in a binder material is applied onto the cathode electrode and the binder material is fired or cured to form the carbon-group-material layer in the step of forming the electron emitting portion, and in which a metal compound solution in which carbon nano-tube structures are dispersed is applied onto the cathode electrode and then the metal compound is fired, to form the carbon-group-material layer in the step of forming the electron emitting portion.

28. The manufacturing method of a cold cathode field emission device according to claim 27, in which the step (B) is followed by forming an insulating layer on the entire surface, and the step (C) is followed by forming a second opening portion through the insulating layer, said second opening portion communicating with the opening portion formed through the gate electrode, thereby to expose the carbon-group-material layer in a bottom portion of the second opening portion.

29. The manufacturing method of a cold cathode field emission device according to claim 27, in which the carbon-group-material layer is formed from a hydrocarbon gas in the step of forming the electron emitting portion.

30. The manufacturing method of a cold cathode field emission device according to claim 29, in which interposed between the step (A) and the step (B) is the step of forming a selective-growth region on the cathode electrode, and the electron emitting portion is formed on the selective-growth region in the step (B) in place of forming the electron emitting portion on the cathode electrode.

31. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming a carbon-group-material layer on the cathode electrode, and (C) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer, whereby the cold cathode field emission device is formed, in which a dispersion of carbon nano-tube structures in a binder material is applied onto the cathode electrode and the binder material is fired or cured to form the carbon-group-material layer in the step of forming the electron emitting portion, and in which a metal compound solution in which carbon nano-tube structures are dispersed is applied onto the cathode electrode and then the metal compound is fired, to form the carbon-group-material layer in the step of forming the electron emitting portion.

32. The manufacturing method of a cold cathode field emission display according to claim 31, in which the carbon-group-material layer is formed on the cathode electrode from a hydrocarbon gas in the step (B).

33. The manufacturing method of a cold cathode field emission display according to claim 32, in which interposed between the steps (A) and (B) is the step of forming a selective-growth region on the cathode electrode, and in the (B), the electron emitting portion is formed on the selective-growth region in place of forming the electron emitting portion on the cathode electrode.

34. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of
(A) forming a cathode electrode on the supporting member,
(B) forming a carbon-group-material layer on the cathode electrode, and
(C) terminating the surface of the carbon-group-material layer with a fluorine-containing hydrocarbon gas, thereby to obtain an electron emitting portion comprising the carbon-group-material layer having the surface terminated with fluorine atoms, whereby the cold cathode field emission device is formed,
in which a dispersion of carbon nano-tube structures in a binder material is applied onto the cathode electrode and the binder material is fired or cured to form the carbon-group-material layer in the step of forming the electron emitting portion, and
in which a metal compound solution in which carbon nano-tube structures are dispersed is applied onto the cathode electrode and then the metal compound is fired, to form the carbon-group-material layer in the step of forming the electron emitting portion.

35. The manufacturing method of a cold cathode field emission display according to claim 34, in which the carbon-group-material layer is formed on the cathode electrode from a hydrocarbon gas in the step (B).

36. The manufacturing method of a cold cathode field emission display according to claim 35, in which interposed between the steps (A) and (B) is the step of forming a selective-growth region on the cathode electrode, and in the (B), the electron emitting portion is formed on the selective-growth region in place of forming the electron emitting portion on the cathode electrode.

37. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;
(A) forming a cathode electrode on the supporting member,
(A-1) forming a selective-growth region on the cathode electrode,
(B) forming an insulating layer on the supporting member and the cathode electrode, an insulating layer is formed on the supporting member, the selective-growth region and the cathode electrode,
(C) forming a gate electrode having an opening portion on the insulating layer,
(D) forming a second opening portion through the insulating layer, said second opening portion communicating with the opening portion formed through the gate electrode, thereby to expose the cathode electrode in a bottom portion of the second opening portion, a second opening portion is formed through the insulating layer, said second opening portion communicating with the opening portion formed through the gate electrode, thereby to expose the selective-growth region in the bottom portion of the second opening portion, and
(E) forming an electron emitting portion on the cathode electrode exposed in the bottom portion of the second opening portion, whereby the cold cathode field emission device is formed, the electron emitting portion is formed on the selective-growth region exposed in the bottom portion of the second opening portion,
in which the electron emitting portion comprises a carbon-group-material layer, and the step of forming the electron emitting portion comprises the step of forming the carbon-group-material layer from a hydrocarbon gas and a fluorine-containing hydrocarbon gas.

38. The manufacturing method of a cold cathode field emission display according to claim 37, in which
interposed between the step (D) and the step (E) is the step of forming a selective-growth region on the cathode electrode exposed in the bottom portion of the second opening portion, and
the electron emitting portion is formed on the selective-growth region in the step (E) in place of forming the electron emitting portion on the cathode electrode exposed in the bottom portion of the second opening portion.

39. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;
(A) forming a cathode electrode on the supporting member,
(A-1) forming a selective-growth region on the cathode electrode,
(B) forming an insulating layer on the supporting member and the cathode electrode, an insulating layer being formed on the supporting member, the selective-growth region and the cathode electrode,
(C) forming a gate electrode having an opening portion on the insulating layer,
(D) forming a second opening portion through the insulating layer, said second opening portion communicating with the opening portion formed through the gate electrode, thereby to expose the cathode electrode in a bottom portion of the second opening portion. a second opening portion is formed through the insulating layer, said second opening portion communicating with the opening portion formed through the gate electrode, thereby to expose the selective-growth region in the bottom portion of the second opening portion, and
(E) forming an electron emitting portion on the cathode electrode exposed in the bottom portion of the second opening portion, whereby the cold cathode field emission device is formed, a carbon-group-material layer is formed from a hydrocarbon gas, the electron emitting portion being formed on the selective-growth region exposed in the bottom portion of the second opening portion,
in which the electron emitting portion comprises a carbon-group-material layer and a fluoride-carbide-containing thin film formed on the surface of the carbon-group-material layer, and the step of forming the electron emitting portion comprises the step of forming the fluoride-carbide-containing thin film on the surface of the formed carbon-group-material layer from a fluorine-containing hydrocarbon gas.

40. The manufacturing method of a cold cathode field emission display according to claim 39, in which interposed between the step (D) and the step (E) is the step of forming a selective-growth region on the cathode electrode exposed in the bottom portion of the second opening portion, and the electron emitting portion is formed on the selective-growth region in the step (E) in place of forming the electron emitting portion on the cathode electrode exposed in the bottom portion of the second opening portion.

41. The manufacturing method of a cold cathode field emission display according to claim 39, in which a dispersion of carbon nano-tube structures in a binder material is applied onto the cathode electrode and the binder material is fired or cured to form the carbon-group-material layer in the step of forming the electron emitting portion.

42. The manufacturing method of a cold cathode field emission display according to claim 39, in which a metal compound solution in which carbon nano-tube structures are dispersed is applied onto the cathode electrode and then the metal compound is fired, to form the carbon-group-material layer in the step of forming the electron emitting portion.

43. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (A-1) forming a selective-growth region on the cathode electrode (B) forming an insulating layer on the supporting member and the cathode electrode, an insulating layer being formed on the supporting member, the selective-growth region and the cathode electrode, (C) forming a gate electrode having an opening portion on the insulating layer, (D) forming a second opening portion through the insulating layer, said second opening portion communicating with the opening portion formed through the gate electrode, thereby to expose the cathode electrode in a bottom portion of the second opening portion, a second opening portion being formed through the insulating layer, said second opening portion communicating with the opening portion formed through the gate electrode, thereby to expose the selective-growth region in the bottom portion of the second opening portion, and (E) forming an electron emitting portion on the cathode electrode exposed in the bottom portion of the second opening portion, whereby the cold cathode field emission device is formed, a carbon-group-material layer is formed from a hydrocarbon gas, the electron emitting portion is formed on the selective-growth region exposed in the bottom portion of the second opening portion, in which the electron emitting portion comprises a carbon-group-material layer, and the step of forming the electron emitting portion comprises the step of terminating the surface of the formed carbon-group-material layer with a fluorine-containing hydrocarbon gas.

44. The manufacturing method of a cold cathode field emission display according to claim 43, in which interposed between the step (D) and the step (E) is the step of forming a selective-growth region on the cathode electrode exposed in the bottom portion of the second opening portion, and the electron emitting portion is formed on the selective-growth region in the step (E) in place of forming the electron emitting portion on the cathode electrode exposed in the bottom portion of the second opening portion.

45. The manufacturing method of a cold cathode field emission display according to claim 43, in which a dispersion of carbon nano-tube structures in a binder material is applied onto the cathode electrode and the binder material is fired or cured to form the carbon-group-material layer in the step of forming the electron emitting portion.

46. The manufacturing method of a cold cathode field emission display according to claim 43, in which a metal compound solution in which carbon nano-tube structures are dispersed is applied onto the cathode electrode and then the metal compound is fired, to form the carbon-group-material layer in the step of forming the electron emitting portion.

47. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming an electron emitting portion on the cathode electrode, and (C) forming a gate electrode having an opening portion above the electron emitting portion, whereby the cold cathode field emission device is formed, in which the electron emitting portion comprises a carbon-group-material layer and a fluoride-carbide-containing thin film formed on the surface of the carbon-group-material layer, and the step of forming the electron emitting portion comprises the step of forming the fluoride-carbide-containing thin film on the surface of the formed carbon-group-material layer from a fluorine-containing hydrocarbon gas, in which a dispersion of carbon nano-tube structures in a binder material is applied onto the cathode electrode and the binder material is fired or cured to form the carbon-group-material layer in the step of forming the electron emitting portion, and in which a metal compound solution in which carbon nano-tube structures are dispersed is applied onto the cathode electrode and then the metal compound is fired, to form the carbon-group-material layer in the step of forming the electron emitting portion.

48. The manufacturing method of a cold cathode field emission display according to claim 47, in which the step (B) is followed by forming an insulating layer on the entire surface, and the step (C) is followed by forming a second opening portion through the insulating layer, said second opening portion communicating with the opening portion formed through the gate electrode, thereby to expose the carbon-group-material layer in a bottom portion of the second opening portion.

49. The manufacturing method of a cold cathode field emission display according to claim 47, in which the carbongroup-material layer is formed from a hydrocarbon gas in the step of forming the electron emitting portion.

50. The manufacturing method of a cold cathode field emission display according to claim 49, in which
interposed between the step (A) and the step (B) is the step of forming a selective-growth region on the cathode electrode, and
the electron emitting portion is formed on the selective-growth region in the step (B) in place of forming the electron emitting portion on the cathode electrode.

51. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions,
the method including the steps of;
(A) forming a cathode electrode on the supporting member,
(B) forming an electron emitting portion on the cathode electrode, and
(C) forming a gate electrode having an opening portion above the electron emitting portion, whereby the cold cathode field emission device is formed,
in which the electron emitting portion comprises a carbon-group-material layer, and the step of forming the electron emitting portion comprises the step of terminating the surface of the formed carbon-group-material layer with a fluorine-containing hydrocarbon gas.
in which a dispersion of carbon nano-tube structurees in a binder materials is applied onto the cathode electrode and the binder material is fired or cured to form the carbon-group-material layer in the step of forming the electron emitting portion, and
in which a metal compound solution in which carbon nano-tube structures are dispersed is applied onto the cathode electrode and then the metal compound is fired, to form the carbon-group-material layer in the step of forming the electron emitting portion.

52. The manufacturing method of a cold cathode field emission display according to claim 51, in which the step (B) is followed by forming an insulating layer on the entire surface, and
the step (C) is followed by forming a second opening portion through the insulating layer, said second opening portion communicating with the opening portion formed through the gate electrode, thereby to expose the carbon-group-material layer in a bottom portion of the second opening portion.

53. The manufacturing method of a cold cathode field emission display according to claim 51, in which the carbon-group-material layer is formed from a hydrocarbon gas in the step of forming the electron emitting portion.

54. The manufacturing method of a cold cathode field emission display according to claim 53, in which
interposed between the step (A) and the step (B) is the step of forming a selective-growth region on the cathode electrode, and
the electron emitting portion is formed on the selective-growth region in the step (B) in place of forming the electron emitting portion on the cathode electrode.

55. A manufacturing method of an electron emitting apparatus comprising the steps of;
(A) forming a carbon-group-material layer on an electrically conductive layer, and (B) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer,
in which a metal compound solution, in which carbon-nano-tube structures are dispersed, is applied onto the electrically conductive layer, and then the metal compound is fired,
to form the carbon-group-material layer in the step (A).

56. A manufacturing method of an electron emitting apparatus comprising the steps of;
(A) forming a carbon-group-material layer on an electrically conductive layer, and
(B) terminating the surface of the carbon-group-material layer with a fluorine-containing hydrocarbon gas, thereby to obtain an electron emitting portion comprising the carbon-group-material layer whose surface is terminated with fluorine atoms,
in which a metal compound solution, in which carbon-nano-tube structures are dispersed, is applied onto the electrically conductive layer, and then the metal compound is fired, to form the carbon-group-material layer in the step (A).

57. A manufacturing method of a cold cathode field emission device comprising the steps of;
(A) forming a cathode electrode on a supporting member,
(B) forming a carbon-group-material layer on the cathode electrode, and
(C) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer,
in which a metal compound solution, in which carbon nano-tube structures are dispersed, is applied onto the cathode electrode and then the metal compound is fired, to form the carbon-group-material layer in the step (B).

58. A manufacturing method of a cold cathode field emission device comprising the steps of;
(A) forming a cathode electrode on a supporting member,
(B) forming a carbon-group-material layer on the cathode electrode, and
(C) terminating the surface of the carbon-group-material layer with a fluorine-containing hydrocarbon gas, thereby to obtain an electron emitting portion comprising the carbon-group-material layer having the surface terminated with fluorine atoms,
in which a metal compound solution, in which carbon nano-tube structures are dispersed, is applied onto the cathode electrode and then the metal compound is fired, to form the carbon-group-material layer in the step (B).

59. A manufacturing method of a cold cathode field emission device comprising the steps of;
(A) forming a cathode electrode on a supporting member,
(B) forming an insulating layer on the supporting member and the cathode electrode,
(C) forming a gate electrode having an opening portion on the insulating layer, (D) forming a second opening portion through the insulating layer, said second opening portion communicating with the opening portion formed through the gate electrode, thereby to expose the cathode electrode in a bottom portion of the second opening portion, and (E) forming an electron portion on the cathode electrode exposed in the bottom portion of the second opening portion, in which the electron emitting portion comprises a carbon-group-material layer and a fluoride-carbide-containing thin film formed on the surface of the carbon-group-material layer, and the step of forming the electron emitting portion comprises the steps of applying a metal compound solution, in which carbon nano-tube structures are dispersed, onto the cathode electrode and then firing the metal compound, thereby to form the carbon-group-material layer, and then, forming the fluoride-carbide-containing thin film on the surface of the formed carbon-group-material layer from a fluorine-containing hydrocarbon gas.

60. A manufacturing method of a cold cathode field emission device comprising the steps of;

(A) forming a cathode electrode on a supporting member, (B) forming an insulating layer on the supporting member and the cathode electrode, (C) forming a gate electrode having an opening portion on the insulating layer, (D) forming a second opening portion through the insulating layer, said second opening portion communicating with the opening portion formed through the gate electrode, thereby to expose the cathode electrode in a bottom portion of the second opening portion, and (E) forming an electron emitting portion on the cathode electrode exposed in the bottom portion of the second opening portion, in which the electron emitting portion comprises a carbon-group-material layer, and the step of forming the electron emitting portion comprises the steps of applying a metal compound solution, in which carbon nano-tube structures are dispersed, onto the cathode electrode and then firing the metal compound, thereby to form the carbon-group-material layer, and then, terminating the surface of the formed carbon-group-material layer with a fluorine-containing hydrocarbon gas.

61. A manufacturing method of a cold cathode field emission device comprising the steps of;

(A) forming a cathode electrode on a supporting member, (B) forming an electron emitting portion on the cathode electrode, and (C) forming a gate electrode having an opening portion above the electron emitting portion, in which the electron emitting portion comprises a carbon-group-material layer and a fluoride-carbide-containing thin film formed on the surface of the carbon-group-material layer, and the step of forming the electron emitting portion comprises the steps of applying a metal compound solution, in which carbon nano-tube structures are dispersed, onto the cathode electrode and then firing the metal compound, thereby to form the carbon-group-material layer, and then, forming the fluoride-carbide-containing thin film on the surface of the formed carbon-group-material layer from a fluorine-containing hydrocarbon gas.

62. A manufacturing method of a cold cathode field emission device comprising the steps of;

(A) forming a cathode electrode on a supporting member, (B) forming an electron emitting portion on the cathode electrode, and (C) forming a gate electrode having an opening portion above the electron emitting portion, in which the electron emitting portion comprises a carbon-group-material layer, and the step of forming the electron emitting portion comprises the steps of applying a metal compound solution, in which carbon nano-tube structures are dispersed, onto the cathode electrode and then firing the metal compound, thereby to form the carbon-group-material layer, and then, terminating the surface of the formed carbon-group-material layer with a fluorine-containing hydrocarbon gas.

63. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming a carbon-group-material layer on the cathode electrode, and (C) forming a fluoride-carbide-containing thin film on the surface of the carbon-group-material layer from a fluorine-containing hydrocarbon gas, thereby to obtain an electron emitting portion comprising the carbon-group-material layer and the fluoride-carbide-containing thin film formed on the surface of the carbon-group-material layer, whereby the cold cathode field emission device is formed, in which a metal compound solution, in which carbon nano-tube structures are dispersed, is applied onto the cathode electrode and then the metal compound is fired, to form the carbon-group-material layer in the step (B).

64. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;

(A) forming a cathode electrode on the supporting member, (B) forming a carbon-group-material layer on the cathode electrode, and (C) terminating the surface of the carbon-group-material layer with a fluorine-containing hydrocarbon gas, thereby to obtain an electron emitting portion comprising the carbon-group-material layer having the surface terminated with fluorine atoms, whereby the cold cathode field emission device is formed, in which a metal compound solution, in which carbon nano-tube structures are dispersed, is applied onto the cathode electrode and then the metal compound is fired, to form the carbon-group-material layer in the step (B).

65. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;
(A) forming a cathode electrode on the supporting member,
(B) forming an insulating layer on the supporting member and the cathode electrode,
(C) forming a gate electrode having an opening portion on the insulating layer,
(D) forming a second opening portion through the insulating layer, said second opening portion communicating with the opening portion formed through the gate electrode, thereby to expose the cathode electrode in a bottom portion of the second opening portion, and
(E) forming an electron emitting portion on the cathode electrode exposed in the bottom portion of the second opening portion, whereby the cold cathode field emission device is formed,
in which the electron emitting portion comprises a carbon-group-material layer and a fluoride-carbide-containing thin film formed on the surface of the carbon-group-material layer, and
the step of forming the electron emitting portion comprises the steps of applying a metal compound solution, in which carbon nano-tube structures are dispersed, onto the cathode electrode and then firing the metal compound, thereby to form the carbon-group-material layer, and then, forming the fluoride-carbide-containing thin film on the surface of the formed carbon-group-material layer from a fluorine-containing hydrocarbon gas.

66. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;
(A) forming a cathode electrode on the supporting member,
(B) forming an insulating layer on the supporting member and the cathode electrode,
(C) forming a gate electrode having an opening portion on the insulating layer,
(D) forming a second opening portion through the insulating layer, said second opening portion communicating with the opening portion formed through the gate electrode, thereby to expose the cathode electrode in a bottom portion of the second opening portion, and
(E) forming an electron emitting portion on the cathode electrode exposed in the bottom portion of the second opening portion, whereby the cold cathode field emission device is formed,
in which the electron emitting portion comprises a carbon-group-material layer, and
the step of forming the electron emitting portion comprises the steps of applying a metal compound solution, in which carbon nano-tube structures are dispersed, onto the cathode electrode and then firing the metal compound, thereby to form the carbon-group-material layer, and then, terminating the surface of the formed carbon-group-material layer with a fluorine-containing hydrocarbon gas.

67. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;
(A) forming a cathode electrode on the supporting member,
(B) forming an electron emitting portion on the cathode electrode, and
(C) forming a gate electrode having an opening portion above the electron emitting portion, whereby the cold cathode field emission device is formed,
in which the electron emitting portion comprises a carbon-group-material layer and a fluoride-carbide-containing thin film formed on the surface of the carbon-group-material layer, and
the step of forming the electron emitting portion comprises the steps of applying a metal compound solution, in which carbon nano-tube structures are dispersed, onto the cathode electrode and then firing the metal compound, thereby to form the carbon-group-material layer, and then, forming the fluoride-carbide-containing thin film on the surface of the formed carbon-group-material layer from a fluorine-containing hydrocarbon gas.

68. A manufacturing method of a cold cathode field emission display, in which a substrate having an anode electrode and a phosphor layer formed thereon and a supporting member having a cold cathode field emission device formed thereon are arranged such that the phosphor layer and the cold cathode field emission device face each other, and the substrate and the supporting member are bonded to each other in their circumferential portions, the method including the steps of;
(A) forming a cathode electrode on the supporting member,
(B) forming an electron emitting portion on the cathode electrode, and
(C) forming a gate electrode having an opening portion above the electron emitting portion, whereby the cold cathode field emission device is formed,
in which the electron emitting portion comprises a carbon-group-material layer, and
the step of forming the electron emitting portion comprises the steps of applying a metal compound solution, in which carbon nano-tube structures are dispersed, onto the cathode electrode and then firing the metal compound, thereby to form the carbon-group-material layer, and then, terminating the surface of the formed carbon-group-material layer with a fluorine-containing hydrocarbon gas.

* * * * *

UNITED STATES PATENT AND TRADEMARK OFFICE
CERTIFICATE OF CORRECTION

PATENT NO. : 6,991,949 B2
APPLICATION NO. : 10/475586
DATED : January 31, 2006
INVENTOR(S) : Muroyama et al.

It is certified that error appears in the above-identified patent and that said Letters Patent is hereby corrected as shown below:

Column 72:
Line 51, "opening portions" should be read as -- opening portion --.

Column 73:
Line 27, "opening portions" should be read as --opening portion --.

Column 77:
Line 3, "the steps of" should be read as -- the step of; --

Column 81:
Line 31, "hydrocarbon gas." should read as -- hydrocarbon gas, --.
Line 32, "a blinder materials" should read as -- a binder material --.

Column 83:
Line 6, "electron portion" should be read as -- electron emitting portion--.

Signed and Sealed this

Fifteenth Day of August, 2006

JON W. DUDAS
*Director of the United States Patent and Trademark Office*